United States Patent
Lee et al.

(10) Patent No.: US 10,469,352 B2
(45) Date of Patent: Nov. 5, 2019

(54) METHOD AND APPARATUS FOR AVAILABLE BANDWIDTH MEASUREMENT

(71) Applicant: FUJITSU LIMITED, Kawasaki-shi, Kanagawa (JP)

(72) Inventors: Chunghan Lee, Yokohama (JP); Naoki Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 15/654,761

(22) Filed: Jul. 20, 2017

(65) Prior Publication Data
US 2018/0048551 A1 Feb. 15, 2018

(30) Foreign Application Priority Data
Aug. 15, 2016 (JP) .................. 2016-159276

(51) Int. Cl.
| | |
|---|---|
| *H04L 12/26* | (2006.01) |
| *G06F 9/455* | (2018.01) |
| *H04L 12/24* | (2006.01) |
| *H04L 12/915* | (2013.01) |
| *H04L 12/801* | (2013.01) |

(52) U.S. Cl.
CPC ...... *H04L 43/0882* (2013.01); *G06F 9/45558* (2013.01); *H04L 41/0896* (2013.01); *H04L 43/04* (2013.01); *H04L 43/06* (2013.01); *H04L 43/0894* (2013.01); *H04L 43/10* (2013.01); *H04L 47/787* (2013.01); *G06F 2009/45591* (2013.01); *G06F 2009/45595* (2013.01); *H04L 43/0805* (2013.01); *H04L 43/0888* (2013.01); *H04L 43/16* (2013.01); *H04L 47/10* (2013.01)

(58) Field of Classification Search
CPC .... H04L 43/0882; H04L 47/787; H04L 43/10
See application file for complete search history.

(56) References Cited

U.S. PATENT DOCUMENTS

2015/0222561 A1\* 8/2015 Okuno .................. H04L 47/522
370/235

FOREIGN PATENT DOCUMENTS

| JP | 2008-131100 | 6/2008 |
|---|---|---|
| JP | 2013-74494 | 4/2013 |
| WO | 2015/162753 | 10/2015 |

\* cited by examiner

*Primary Examiner* — Davoud A Zand
*Assistant Examiner* — Kristoffer L S Sayoc
(74) *Attorney, Agent, or Firm* — Fujitsu Patent Center

(57) ABSTRACT

An available bandwidth measuring apparatus classifies, into one group, a plurality of virtual machines communicating with a physical node. Then, the available bandwidth measuring apparatus obtains available bandwidth measurements with respect to the virtual machines belonging to the same group by transmitting, to the physical node, measuring packets emulating each of the virtual machines. The available bandwidth measurements represent available bandwidth available when each of the virtual machines performs data transmission in a different time slot. Based on the available bandwidth measurements, the available bandwidth measuring apparatus determines actual available bandwidth of each of the virtual machines, to be used when the virtual machines perform data transmission to the physical node in the same time slot, and notifies each of the virtual machines of the actual available bandwidth determined for the virtual machine.

7 Claims, 39 Drawing Sheets

321 NODE MANAGEMENT TABLE

| PHYSICAL NODE A 321a | PHYSICAL NODE B 321b | ... | PHYSICAL NODE n 321n | | | | |
|---|---|---|---|---|---|---|---|
| ID | TYPE | S_IP | R_IP | S_PORT | R_PORT | PROTOCOL | FLAG |
| 00-00 | PHY | 1.10.1.10/24 | 1.2.3.5/24 | 35832 | 5001 | 17 | – |
| ... | ... | ... | ... | ... | ... | ... | ... |
| 31-12 | VNF | 2.10.1.3/24 | 3.5.10.15/24 | 25291 | 5001 | 17 | U |

FIG. 18

151 PHYSICAL FLOW TABLE

| PHY_ID | PHY_S_IP | PHY_R_IP | PHY_S_PORT | PHY_R_PORT | PHY_PROTOCOL |
|---|---|---|---|---|---|
| 00-00 | 1.10.1.10/24 | 1.2.3.5/24 | 35832 | 5001 | 17 |
| 31-12 | 2.10.1.3/24 | 3.5.10.120/24 | 45231 | 5001 | 17 |

FIG. 19

152 GROUP MANAGEMENT TABLE

| Group_ID | VNF_ID | PHY_ID | Actual_BW | VNF_S_IP | VNF_R_IP | VNF_S_PORT | VNF_R_PORT | VNF_PROTOCOL |
|---|---|---|---|---|---|---|---|---|
| 0 | 00-01 | 00-00 | 80 | 2.10.10.5/24 | 13.5.50.3/24 | 56311 | 5001 | 17 |
| 1 | 01-02 | 01-00 | 50 | 4.10.10.7/24 | 23.5.50.10/24 | 50314 | 5001 | 17 |
| 1 | 01-03 | 01-00 | 50 | 20.10.10.7/24 | 30.5.50.10/24 | 50314 | 5001 | 17 |

FIG. 20

153 BANDWIDTH OBSERVATION TABLE

| Time slot | Time | FLOW_ID | PACKET_ID (CoS or DSCP) | ABW [Mbps] |
|---|---|---|---|---|
| 0 | 2016/03/13 19:36:30.000023 | 00-00 | 1 (DSCP) | 700 |
| 1 | 2016/03/13 19:46:30.001387 | 00-01 | 4 (DSCP) | 695 |
| ... | ... | ... | ... | ... |
| n | 2016/03/13 19:36:30.540892 | 01-02 | 20 (DSCP) | 50 |

FIG. 21

31 TRANSMISSION SCHEDULE

| Group _ID | DSCP (CoS) | VNF_S_IP | VNF_R_IP | VNF_S_PORT | VNF_R_PORT | VNF_PROTOCOL |
|---|---|---|---|---|---|---|
| 1 | 8 | 4.10.10.7 /24 | 23.5.50.10 /24 | 50314 | 5001 | 17 |
| 1 | 16 | 20.10.10.7/24 | 30.5.50.10/24 | 34115 | 5001 | 17 |
| 1 | 24 | 19.16.10.10/24 | 17.9.15.20 /24 | 23161 | 5001 | 17 |

FIG. 24

METHOD AND APPARATUS FOR AVAILABLE BANDWIDTH MEASUREMENT

CROSS-REFERENCE TO RELATED APPLICATION

This application is based upon and claims the benefit of priority of the prior Japanese Patent Application No. 2016-159276, filed on Aug. 15, 2016, the entire contents of which are incorporated herein by reference.

FIELD

The embodiments discussed herein are related to a method and apparatus for available bandwidth measurement.

BACKGROUND

In recent years, network functions are deployed on a general-purpose computer with the use of virtualization technology. This is called network functions virtualization (NFV). In the NFV, network functions that are conventionally carried out by firewalls, load balancers, and the like are virtualized. Virtual machines that virtualize network functions are referred to as virtualized network functions (VNFs). In the case where a physical node with a plurality of VNFs is connected to a wide area network (WAN), each of the VNFs implements communication via the WAN. A WAN is a network that exists, for example, across a plurality of countries and is supported by a plurality of communication carriers. Such a WAN includes wired and wireless networks.

In the case where each VNF implements communication via a WAN, knowing the bandwidth of the communication channel enhances communication efficiency. For example, VNFs transmit data at a communication speed according to bottleneck bandwidth of the communication channel to thereby achieve communication with the efficient use of available bandwidth. In view of this, each VNF performs available bandwidth measuring in order to increase transmission efficiency of the communication via the WAN. The available bandwidth of the communication via the WAN is the least remaining communication capacity across the communication channel via the WAN. The remaining communication capacity across the communication channel is a difference between the maximum communication speed of, for example, a link connecting devices and the actual communication speed of data currently transferred on the link. In the available bandwidth measuring, communication is repeated with changing, for example, the data transmission speed (transmission rate). Then, the maximum transmission rate enabling data reception at a speed comparable to the transmission rate is determined as the available bandwidth.

As for useful technology for understanding the state of a virtual network, there is provided, for example, a network state estimation apparatus capable of gaining an accurate understanding of the network states of individual virtual networks even over which a network control function is exercised to limit resources available to each of the virtual networks. There is also provided a bandwidth measuring method for a packet communication network, to reduce load on the communication network due to bandwidth measuring by eliminating unwanted bandwidth measuring operations. Further, there is provided a bandwidth control apparatus capable of improving bandwidth use efficiency by controlling bandwidths according to actual usage status while reducing computer resources needed for monitoring communication sessions.

Japanese Laid-open Patent Publication No. 2013-074494
Japanese Laid-open Patent Publication No. 2008-131100
International Publication Pamphlet No. WO 2015162753

In the case where, on one single physical node, a plurality of VNFs that communicate with a different particular physical node are deployed, if the VNFs individually make available bandwidth measuring, the VNFs are not able to share information of each other's measuring results, which therefore leads to creating extra communication load.

SUMMARY

According to an aspect, there is provided a non-transitory computer-readable storage medium storing a computer program that causes a computer to perform a procedure including classifying a plurality of virtual machines deployed on the computer into one group, the virtual machines communicating with a physical node connected to the computer via a network; obtaining available bandwidth measurements with respect to the virtual machines by transmitting, to the physical node, measuring packets emulating each of the virtual machines, the available bandwidth measurements representing available bandwidth of a communication channel opened with the physical node, available when each of the virtual machines performs data transmission to the physical node in a different time slot; determining, based on the obtained available bandwidth measurements, actual available bandwidth of each of the virtual machines, to be used when the virtual machines perform data transmission to the physical node in a same time slot; and notifying each of the virtual machines of the actual available bandwidth determined for the virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 illustrates an example of a node management table;

FIG. 19 illustrates an example of a physical flow table;

FIG. 20 illustrates an example of a group management table;

FIG. 21 illustrates an example of a bandwidth observation table;

FIG. 24 illustrates an example of a transmission schedule;

DESCRIPTION OF EMBODIMENTS

Figure 1:
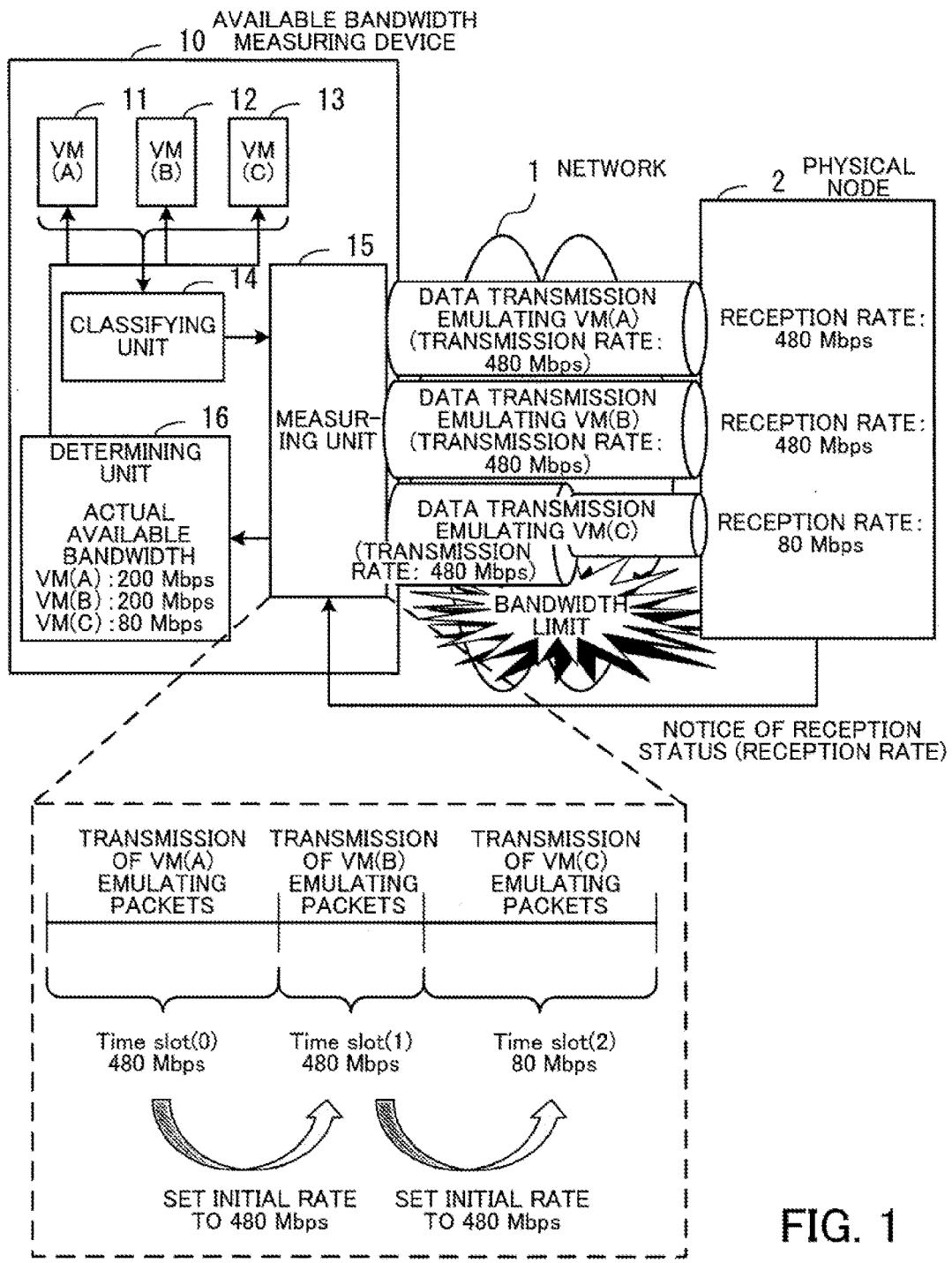
FIG. 1 illustrates a configuration example of a system according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

FIG. 1 illustrates a configuration example of a system according to a first embodiment. According to the first embodiment, an available bandwidth measuring device 10 is connected to a physical node 2 via a network 1. The network 1 is, for example, a WAN supported by a plurality of communication carriers. The available bandwidth measuring device 10 is, for example, a physical node having a function of measuring available bandwidth of a communication channel between the available bandwidth measuring device 10 and the physical node 2.

The available bandwidth measuring device 10 includes a plurality of virtual machines (VMs) 11 to 13, a classifying unit 14, a measuring unit 15, and a determining unit 16. The virtual machines 11 to 13 are deployed on the available bandwidth measuring device 10, for example, by a hypervisor. Upon receiving notification of its actual available bandwidth for communication with the physical node 2, each of the virtual machines 11 to 13 establishes efficient communication with the physical node within the actual available bandwidth. The virtual machines 11 to 13 do not communicate with the physical node 2 while the measuring unit 15 is conducting available bandwidth measuring with respect to any of the virtual machines 11 to 13. This prevents communication of the virtual machines 11 to 13 from having an influence on the available bandwidth measuring results yielded by the measuring unit 15.

The classifying unit 14 classifies the plurality of virtual machines 11 to 13 communicating with the physical node 2 into one group. The measuring unit 15 transmits, to the physical node 2, measuring packets emulating each of the virtual machines 11 to 13 belonging to the same group. Then, based on the receiving status of the measuring packets at the physical node 2, the measuring unit 15 obtains available bandwidth measurements representing available bandwidth of the communication channel opened with the physical node 2, available when each of the virtual machines 11 to 13 performs data transmission to the physical node 2 in a different time slot. The available bandwidth measuring is made for each of the virtual machines 11 to 13. For example, the measuring unit 15 acquires, from the physical node 2, the reception rate (the amount of data received per unit time) at the physical node 2 as the receiving status. Based on the receiving status, the measuring unit 15 obtains the available bandwidth measurements representing available bandwidth of the communication channel, available when each of the virtual machines 11 to 13 performs data transmission to the physical node 2 in a different time slot. The measuring unit 15 uses, for example, a binary search for the available bandwidth measuring. Details of the binary search are described later (see FIG. 7).

The measuring unit 15 facilitates efficient available bandwidth measuring by employing information on an available bandwidth measurement of the communication channel opened with the physical node 2, already obtained with respect to a virtual machine, to obtain an available bandwidth measurement with respect to a different virtual machine by emulating the different virtual machine. For example, the measuring unit 15 uses an available bandwidth measurement obtained with respect to a particular virtual machine as an initial value of the transmission rate in obtaining an available bandwidth measurement with respect to a different virtual machine by a binary search.

Based on the available bandwidth measurements obtained with respect to the individual virtual machines 11 to 13, the determining unit 16 determines, for each of the virtual machines 11 to 13, actual available bandwidth to be used when the virtual machines 11 to 13 perform data transmission to the physical node 2 in the same time slot. Then, the determining unit 16 notifies each of the virtual machines 11 to 13 of the actual available bandwidth determined for the virtual machine. For example, if the available bandwidth measurements obtained with respect to the virtual machines 11 to 13 indicate the same available bandwidth (i.e., the available bandwidth measurements are all the same), the determining unit 16 sets a value obtained by dividing the same available bandwidth by the number of virtual machines 11 to 13 as the actual available bandwidth of each of the virtual machines 11 to 13. There is, however, sometimes a low-bandwidth virtual machine whose available bandwidth measurement is smaller than a value obtained by dividing the maximum amongst the available bandwidth measurements with respect to the individual virtual machines 11 to 13 by the number of virtual machines 11 to 13. In this case, the determining unit 16 sets the available bandwidth measurement obtained with respect to the low-bandwidth virtual machine as the actual available bandwidth of this virtual machine. Then, the determining unit 16 subtracts the available bandwidth measurement obtained with respect to the low-bandwidth virtual machine from the maximum and then divides the subtraction result by the number of remaining virtual machines. The determining unit 16 sets the division result as the actual available bandwidth of each of the virtual machines except for the low-bandwidth virtual machine.

According to the above-described system, in the available bandwidth measuring device 10, the measuring unit 15 is able to measure the available bandwidth present when each of the virtual machines 11 to 13 separately communicates with the physical node 2. Herewith, it is possible to efficiently measure the available bandwidth with respect to a virtual machine by making effective use of information on the available bandwidth already measured with respect to a different virtual machine.

It may be considered reasonable to reduce load involved in available bandwidth measuring by causing one of the plurality of VNFs to conduct the available bandwidth measuring and share the measuring results with the remaining VNFs. However, some communication carriers supporting a WAN system may exercise virtual machine-specific bandwidth limits. For this reason, a virtual machine is not necessarily able to use bandwidth corresponding to available bandwidth measured by a different virtual machine. That is, when available communication speed of a particular VNF is lower than the available bandwidth measured by a different VNF because the particular VNF is subject to a bandwidth limit, the particular VNF is not able to communicate at a communication speed corresponding to the available bandwidth. Therefore, as for communication via a WAN where virtual machine-specific bandwidth limits are implemented, the available bandwidth measuring needs to be made with respect to each of a plurality of virtual machines. According to the first embodiment, the measuring unit 15 conducts the available bandwidth measuring with respect to each of the virtual machines 11 to 13, thus achieving efficient and accurate available bandwidth measuring in consideration of bandwidth limits.

In the example of FIG. 1, the available bandwidth measuring with respect to each of the virtual machines 11, 12, and 13 is conducted in the stated order. Assume that, on the transmission channel of the network 1, the virtual machines 11 and 12 are free from bandwidth limits while the virtual machine 13 is subject to a bandwidth limit. An available bandwidth of 480 Mbps is obtained in the available bandwidth measuring using communication that emulates the virtual machine 11. This indicates that, when the transmission rate is 480 Mbps, the reception rate is also 480 Mbps; however, if the transmission rate exceeds 480 Mbps, the reception rate falls below the transmission rate.

In the available bandwidth measuring with respect to the virtual machine 12, the measuring unit 15 sets, for example, the initial transmission rate for communication emulating the virtual machine 12 to 480 Mbps, which is the available bandwidth measurement obtained with respect to the virtual machine 11. If, in this case, the reception rate is determined to be 480 Mbps, the measuring unit 15 then carries on the data transmission emulating the virtual machine 12 at a transmission rate slightly increased from 480 Mbps. Assume that the increment of the transmission rate in this case is set in advance. Then, if the reception rate obtained for the slightly increased transmission rate falls below the transmission rate, the available bandwidth with respect to the virtual machine 12 is determined to be 480 Mbps. That is, the available bandwidth with respect to the virtual machine 12 is found after repeating data transmission only twice with changing the transmission rate.

Next, in the available bandwidth measuring with respect to the virtual machine 13, the measuring unit 15 sets, for example, the initial transmission rate for communication emulating the virtual machine 13 to 480 Mbps, which is the available bandwidth measurement obtained with respect to the virtual machine 12. In the example of FIG. 1, the virtual machine 13 is subject to a bandwidth limit and the reception rate is therefore below 480 Mbps. In this case, the measuring unit 15 repeats data transmission with changing the transmission rate, as in a common binary search, and measures the available bandwidth with respect to the virtual machine 13. In the example of FIG. 1, the available bandwidth with respect to the virtual machine 13 is 80 Mbps.

Thus, according to the first embodiment, in the case where there are a plurality of virtual machines not subject to bandwidth limits, the available bandwidth measuring with respect to one of these virtual machines facilitates efficient available bandwidth measuring with respect to each of the remaining virtual machines. In addition, according to the first embodiment, the available bandwidth measuring is conducted using communication that emulates each of all the virtual machines 11 to 13. Therefore, if there is a virtual machine subject to a bandwidth limit, it is possible to obtain an available bandwidth measurement with respect to the virtual machine, into which the bandwidth limit on the virtual machine has been reflected.

Each available bandwidth measurement obtained according to the first embodiment represents the available bandwidth of the transmission channel opened with the physical node 2, available to one of the virtual machines 11 to 13 when only the one of the virtual machines 11 to 13 performs communication while the remaining virtual machines perform no communication. In actual operation, the individual virtual machines 11 to 13 concurrently communicate with the physical node 2. Therefore, the determining unit 16 determines the actual available bandwidth of each of the virtual machines 11 to 13 by sharing the maximum measured available bandwidth (i.e., available bandwidth obtained when no bandwidth limit is imposed) among the virtual machines 11 to 13. In this regard, as for the virtual machine 13 subject to a bandwidth limit, the determining unit 16 sets the actual available bandwidth of the virtual machine 13 in such a manner as not to exceed its bandwidth limit. This allows allocation of larger actual available bandwidth to each of the virtual machines 11 and 12 not subject to bandwidth limits compared to when the maximum available bandwidth is evenly allocated among the virtual machines 11 to 13 as their actual available bandwidth.

In the example of FIG. 1, the available bandwidth measured with respect to the virtual machine 13 is 80 Mbps due to a bandwidth limit. Therefore, the determining unit 16 sets the actual available bandwidth of the virtual machine 13 to 80 Mbps. Then, the determining unit 16 allocates 400 Mbps, which is obtained by subtracting 80 Mbps (the bandwidth already allocated to the virtual machine 13) from 480 Mbps (the maximum measured available bandwidth), evenly between the remaining two virtual machines 11 and 12. As a result, the actual available bandwidth of each of the virtual machines 11 and 12 is 200 Mbps. This enables communication making the best use of the performance of the network 1.

For example, in the case of transmitting a large volume of data to the physical node 2, each of the virtual machines 11 to 13 engages in data transmission at a transmission rate equal to its actual available bandwidth, to thereby achieve efficient communication. That is, the virtual machines 11 to 13 transmitting data at a rate higher than their actual available bandwidth results in packet loss. The occurrence of packet loss entails additional processing, such as retransmission of packets, thus decreases data transmission efficiency. In view of this, each of the virtual machines 11 to 13 transmitting data at a transmission rate corresponding to its actual available bandwidth enables the maximum data transfer speed without causing packet loss.

Note that the classifying unit 14, the measuring unit 15, and the determining unit 16 may be implemented, for example, by a processor of the available bandwidth measuring device 10. In FIG. 1, lines connecting the individual components represent a part of communication paths, and communication paths other than those illustrated in FIG. 1 are also configurable.

(b) Second Embodiment

Figure 2:
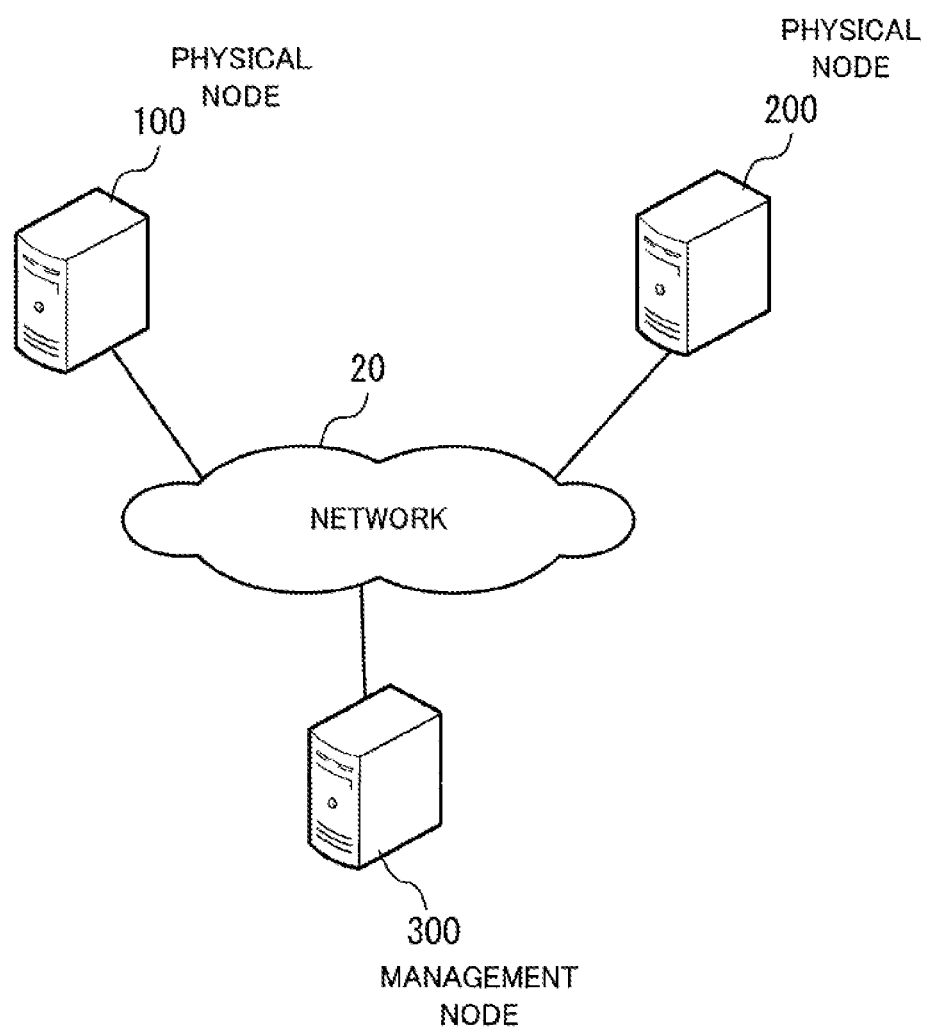
FIG. 2 illustrates a configuration example of a system according to a second embodiment.

A second embodiment is directed to a technique for efficiently measuring the available bandwidth of communication among VNFs deployed on NFV infrastructure. FIG. 2 illustrates a configuration example of a system according to the second embodiment. In the example of FIG. 2, two physical nodes 100 and 200 are connected via a network 20. The network 20 is, for example, a WAN and includes networks of a plurality of communication carriers. The physical nodes 100 and 200 are, for example, computers each internally hosting a plurality of VNFs by virtualization technology. A management node 300 is also connected to the network 20. The management node 300 is a computer for managing the VNFs deployed on the physical nodes 100 and 200.

Figure 3:
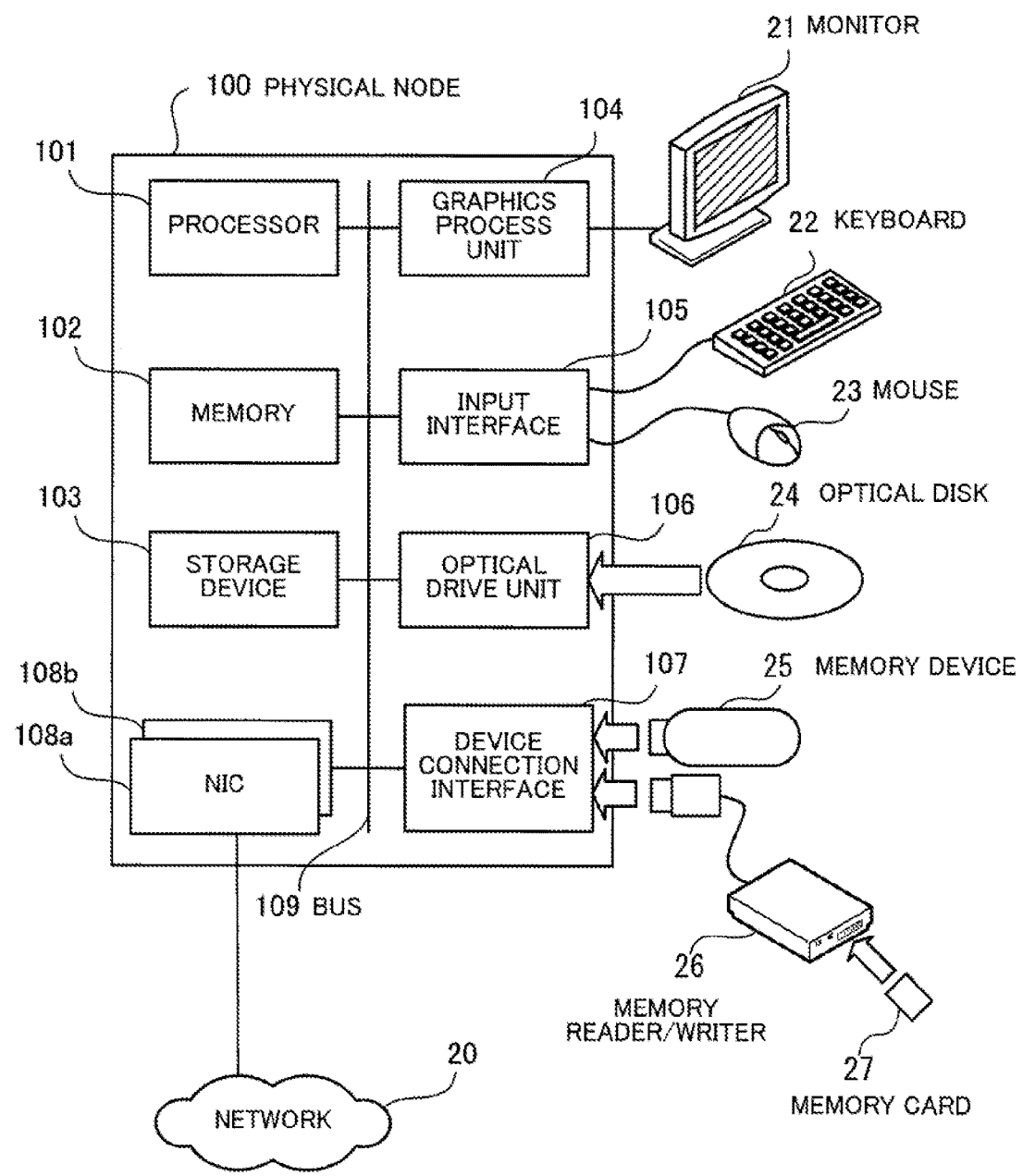
FIG. 3 illustrates an example of a hardware configuration of a physical node according to the second embodiment.

FIG. 3 illustrates an example of the hardware configuration of a physical node according to the second embodiment. Overall control of the physical node 100 is exercised by a processor 101. To the processor 101, memory 102 and a plurality of peripherals are connected via a bus 109. The processor 101 may be a multi-processor. The processor 101 is, for example, a central processing unit (CPU), a micro processing unit (MPU), or a digital signal processor (DSP). At least part of the functions implemented by executing a program by the processor 101 may be implemented by an electronic circuit, such as an application specific integrated circuit (ASIC) and a programmable logic device (PLD).

The memory 102 is used as a main memory device of the physical node 100. The memory 102 temporarily stores at least part of an operating system (OS) program and application programs to be executed by the processor 101. The memory 102 also stores therein various types of data to be used by the processor 101 for its processing. As the memory 102, a volatile semiconductor storage device such as random access memory (RAM) may be used.

The peripherals connected to the bus 109 include a storage device 103, a graphics process unit 104, an input interface 105, an optical drive unit 106, a device connection interface 107, and network interface cards (NICs) 108a and 108b. The storage device 103 electrically or magnetically writes and reads data to and from a built-in storage medium, and is used as a secondary storage device of the physical node 100. The storage device 103 stores therein the OS program, application programs, and various types of data. A hard disk drive (HDD) or solid state drive (SSD), for example, may be used as the storage device 103.

To the graphics process unit 104, a monitor 21 is connected. According to an instruction from the processor 101, the graphics process unit 104 displays an image on a screen of the monitor 21. A cathode ray tube (CRT) display or a liquid crystal display, for example, may be used as the monitor 21. To the input interface 105, a keyboard 22 and a mouse 23 are connected. The input interface 105 transmits signals sent from the keyboard 22 and the mouse 23 to the processor 101. Note that the mouse 23 is just an example of pointing devices, and a different pointing device such as a touch panel, a tablet, a touch-pad, and a track ball, may be used instead. The optical drive unit 106 reads data recorded on an optical disk 24 using, for example, laser light. The optical disk 24 is a portable storage medium on which data is recorded in such a manner as to be read by reflection of light. Examples of the optical disk 24 include a digital versatile disc (DVD), a DVD-RAM, a compact disc read only memory (CD-ROM), a CD recordable (CD-R), and a CD-rewritable (CD-RW).

The device connection interface 107 is a communication interface for connecting peripherals to the physical node 100. To the device connection interface 107, for example, a memory device 25 and a memory reader/writer 26 may be connected. The memory device 25 is a storage medium having a function for communicating with the device connection interface 107. The memory reader/writer 26 is a device for writing and reading data to and from a memory card 27 which is a card-type storage medium. The NICs 108a and 108b are connected to the network 20. Via the network 20, the NICs 108a and 108b transmit and receive data to and from the different physical node 200 and the management node 300.

The hardware configuration described above achieves the processing functions of the physical node 100 according to the second embodiment. Note that the physical node 200 and the management node 300 may also be built with the same hardware configuration as the physical node 100. In addition, the device of the first embodiment may also be built with the same hardware configuration as the physical node 100 of FIG. 3.

The physical node 100 achieves its processing functions according to the second embodiment, for example, by executing a program stored in a computer-readable storage medium. The program describing processing content to be implemented by the physical node 100 may be stored in various types of storage media. For example, the program to be executed by the physical node 100 may be stored in the storage device 103. The processor 101 loads at least part of the program stored in the storage device 103 into the memory 102 and then runs the program. In addition, the program to be executed by the physical node 100 may be stored in a portable storage medium, such as the optical disk 24, the memory device 25, and the memory card 27. The program stored in the portable storage medium becomes executable after being installed on the storage device 103, for example, under the control of the processor 101. Alternatively, the processor 101 may run the program by directly reading it from the portable storage medium. In like fashion, the physical node 200 and the management node 300 are able to achieve the processing functions of the second embodiment by executing a program stored in a computer-readable storage medium.

Figure 4:
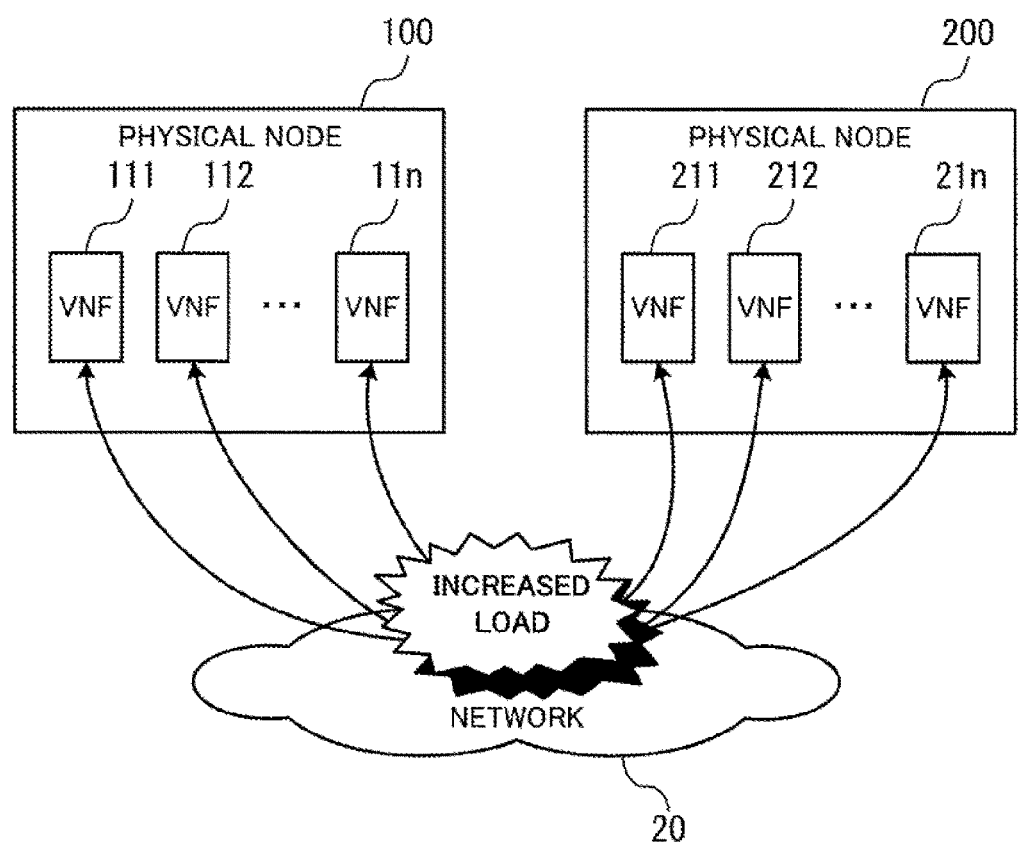
FIG. 4 illustrates an example of a communication situation in which each VNF conducts available bandwidth measuring.

In the above-described system, in transmitting data from a VNF on the physical node 100 to a VNF on the physical node 200, if the VNF on the transmitting-end physical node 100 knows the available bandwidth, it is possible to implement the data transmission by making efficient use of the available bandwidth. In view of this, measuring of the available bandwidth is conducted between the physical nodes 100 and 200. In this regard, if a plurality of VNFs individually carry out available bandwidth measuring, communication associated with the available bandwidth measuring puts extra load on the network. FIG. 4 illustrates an example of a communication situation in which each VNF conducts available bandwidth measuring. Let us consider a case where VNFs 111, 112, . . . , and 11n on the physical node 100 make available bandwidth measuring for the purpose of speeding up WAN communications supported by NVF. Each of the VNFs 111, 112, . . . , and 11n tries data transmission directed to one of VNFs 211, 212, . . . , and 21n on the receiving-end physical node 200, and determines the available bandwidth based on the data reception speed at the receiving end. In this regard, if the VNFs 111, 112, . . . , and 11n individually implement the available bandwidth measuring, an extra load is placed on the network 20.

Figure 5:
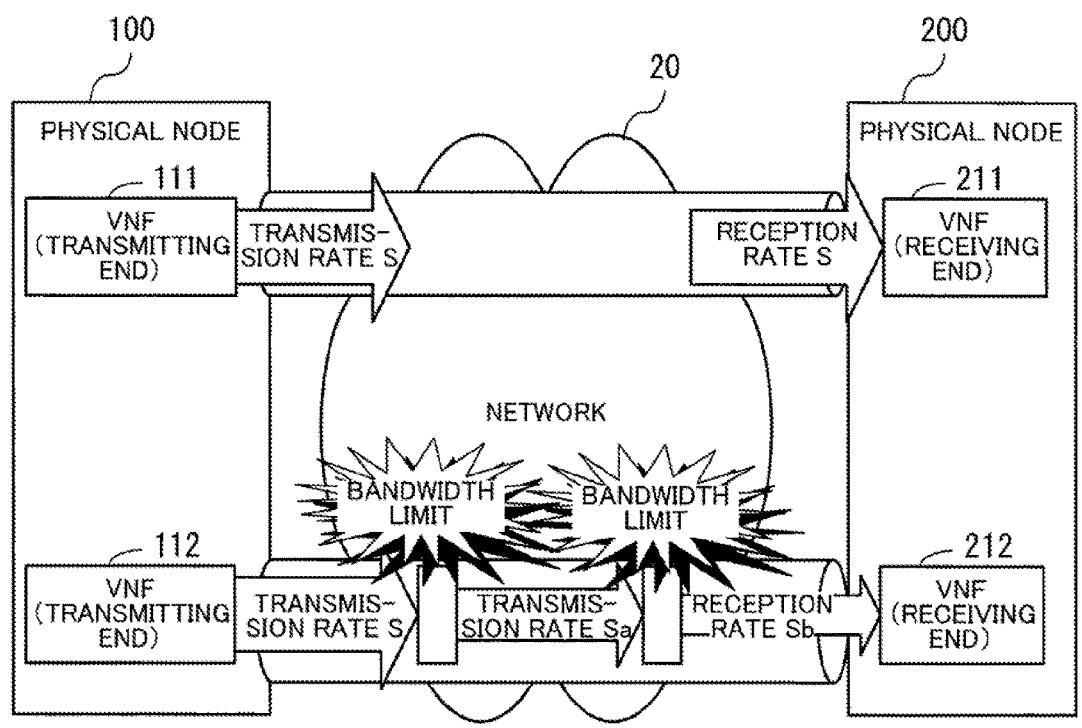
FIG. 5 illustrates an example of a bandwidth limit mechanism.

In view of this, it may be considered appropriate, for example, to cause the single VNF 111 to be in charge of searching for the available bandwidth and share information on the available bandwidth with the remaining VNFs 112, . . . , and 11n on the physical node 100. However, there is a possibility that, within the network 20, a limit has been set on bandwidth available to each VNF. FIG. 5 illustrates an example of a bandwidth limit mechanism. In the example of FIG. 5, no limit has been set on bandwidth available to the VNF 111 while a bandwidth limit has been set for the VNF 112.

Assume that when the VNF 111 transmits data to the VNF 211 on the physical node 200 at a transmission rate of S (bps) (S is a positive real number), the VNF 211 is able to receive the data at a reception rate of S. The maximum value of such a transmission rate S is regarded as the available bandwidth to be measured by the VNF 111.

The same channel used for communication between the VNFs 111 and 211 is assumed to be used for the VNF 112 to transmit data to the VNF 212 on the physical node 200. If there is no limit imposed on the bandwidth available to the VNF 112, the VNF 212 is supposed to receive, at the reception rate S, the data transmitted from the VNF 112 at the transmission rate S. However, if, within the network 20, a limit has been set on the bandwidth available to the VNF 112 by a bandwidth limit mechanism, the speed of the data transmitted from the VNF 112 at the transmission rate S is reduced, for example, to a transmission rate of Sa (Sa is a positive real number less than S). If a bandwidth limit is set at a plurality of points along the communication channel, the speed of the data transmitted from the VNF 112 is further reduced, for example, to a transmission rate of Sb (Sb is a positive real number less than Sa). Then, the VNF 212 at the receiving end receives the data at the reception rate Sb. In this case, the available bandwidth for the VNF 112 is determined to be Sb.

Thus, in the case where the bandwidth limit mechanism is present, it is not possible to use the available bandwidth measured by the VNF 111 as the bandwidth available to the VNF 112. The second embodiment overcomes the foregoing problem by providing a representative measuring unit for each of the physical nodes 100 and 200 and causing the representative measuring units to perform communication emulating a plurality of VNFs, to thereby measure the available bandwidth available to each of the VNFs. In this regard, each representative measuring unit makes effective use of information on the available bandwidth measured by emulating one VNF, to thereby implement efficient measuring of the available bandwidth for a different VNF. This reduces load of the available bandwidth measuring on the network 20.

Note that the bandwidth limit mechanism determines whether the source of a packet being transmitted is a bandwidth limit target, for example, based on the source address or source port number of the packet. Therefore, by transmitting a packet using the IP address or port number of a VNF as the identifier of the source, even a component other than the VNF is able to measure the available bandwidth for the VNF.

Figure 6:
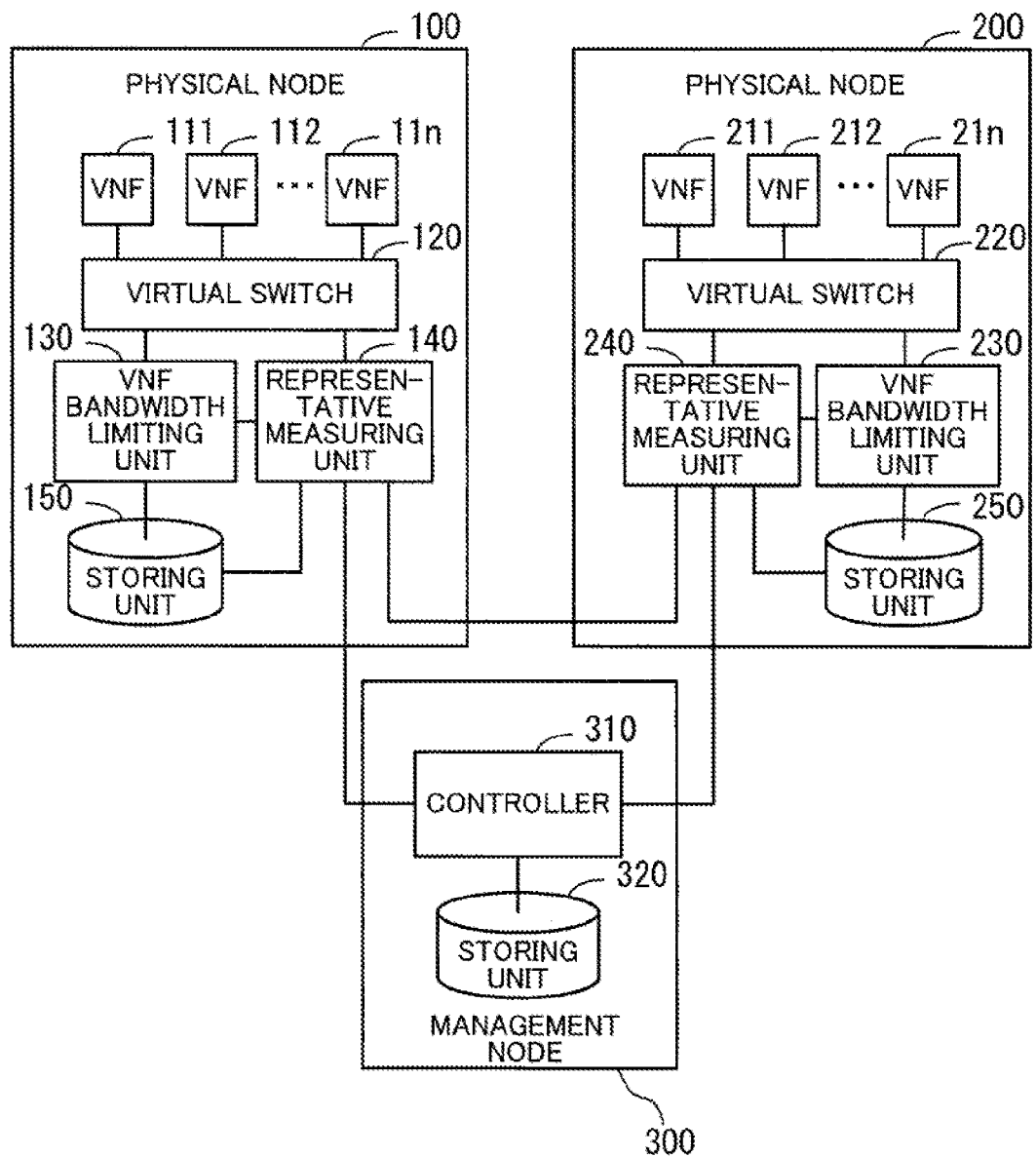
FIG. 6 is a block diagram illustrating functions of individual nodes.

FIG. 6 is a block diagram illustrating functions of individual nodes. The physical node 100 includes the plurality of VNFs 111, 112, . . . , and 11n, a virtual switch 120, a VNF bandwidth limiting unit 130, a representative measuring unit 140, and a storing unit 150. The plurality of VNFs 111, 112, . . . , and 11n are connected to the virtual switch 120. Then, to the virtual switch 120, the VNF bandwidth limiting unit 130 and the representative measuring unit 140 are connected. The VNF bandwidth limiting unit 130 determines the maximum bandwidth available to each of the VNFs 111, 112, . . . , and 11n based on available bandwidth measurements obtained by the representative measuring unit 140 with respect to the individual VNFs 111, 112, . . . , and 11n. Subsequently, the VNF bandwidth limiting unit 130 notifies each of the VNFs 111, 112, . . . , and 11n of the determined bandwidth as the actual available bandwidth of the VNF.

In cooperation with the representative measuring unit 240 of the physical node 200, the representative measuring unit 140 measures the available bandwidth with respect to each of the VNFs 111, 112, . . . , and 11n by using communication emulating the VNF. After measuring the available bandwidth with respect to one VNF, the representative measuring unit 140 makes effective use of the measuring result to thereby implement efficient measuring of the available bandwidth for a different VNF. For example, after obtaining an available bandwidth measurement for one VNF, the representative measuring unit 140 starts the available bandwidth measuring for the next VNF with data transmission at a transmission rate indicated by the already obtained available bandwidth measurement. This allows the available bandwidth measuring for the next VNF to be completed in a short amount of time.

In addition, the representative measuring unit 140 acquires, from a controller 310 of the management node 300, information on the different physical node 200 connected to the network 20 and VNFs 211, 212, . . . , and 21n running on the physical node 200. Then, the representative measuring unit 140 stores the information acquired from the controller 310 in the storing unit 150. The storing unit 150 stores therein the relation of VNF-to-VNF connections via the network 20 and available bandwidth measuring results. The storing unit 150 is implemented, for example, using a storage area secured in the memory 102 or the storage device 103.

The physical node 200 includes the plurality of VNFs 211, 212, . . . , and 21n, a virtual switch 220, a VNF bandwidth limiting unit 230, a representative measuring unit 240, and a storing unit 250. The individual components of the physical node 200 have the same functions as those with the same names of the physical node 100. The management node 300 includes the controller 310 and a storing unit 320. The controller 310 manages the states of the physical nodes 100 and 200 and the VNFs 111, 112, . . . , 11n, 211, 212, . . . , and 21n running on the individual physical nodes 100 and 200. Then, the management node 300 notifies the latest states to the representative measuring units 140 and 240 of the physical nodes 100 and 200, respectively. The storing unit 320 stores information managed by the controller 310. In FIG. 6, lines connecting the individual components represent a part of communication paths, and communication paths other than those illustrated in FIG. 6 are also configurable. Note that the function of each component illustrated in FIG. 6 is implemented, for example, by causing a computer to execute a program module corresponding to the component.

According to the system having the configuration illustrated in FIG. 6, the available bandwidth measuring is implemented by the representative measuring units 140 and 240 of the physical nodes 100 and 200, respectively. In the available bandwidth measuring, data is repeatedly transmitted, for example, from the representative measuring unit 140 to the representative measuring unit 240 with changing the transmission rate. Then, the representative measuring unit 140 compares the transmission rate and the reception rate of the data to thereby measure the available bandwidth using a binary search. The available bandwidth measuring by a binary search is implemented, for example, using software called "Pathload".

Figure 7:
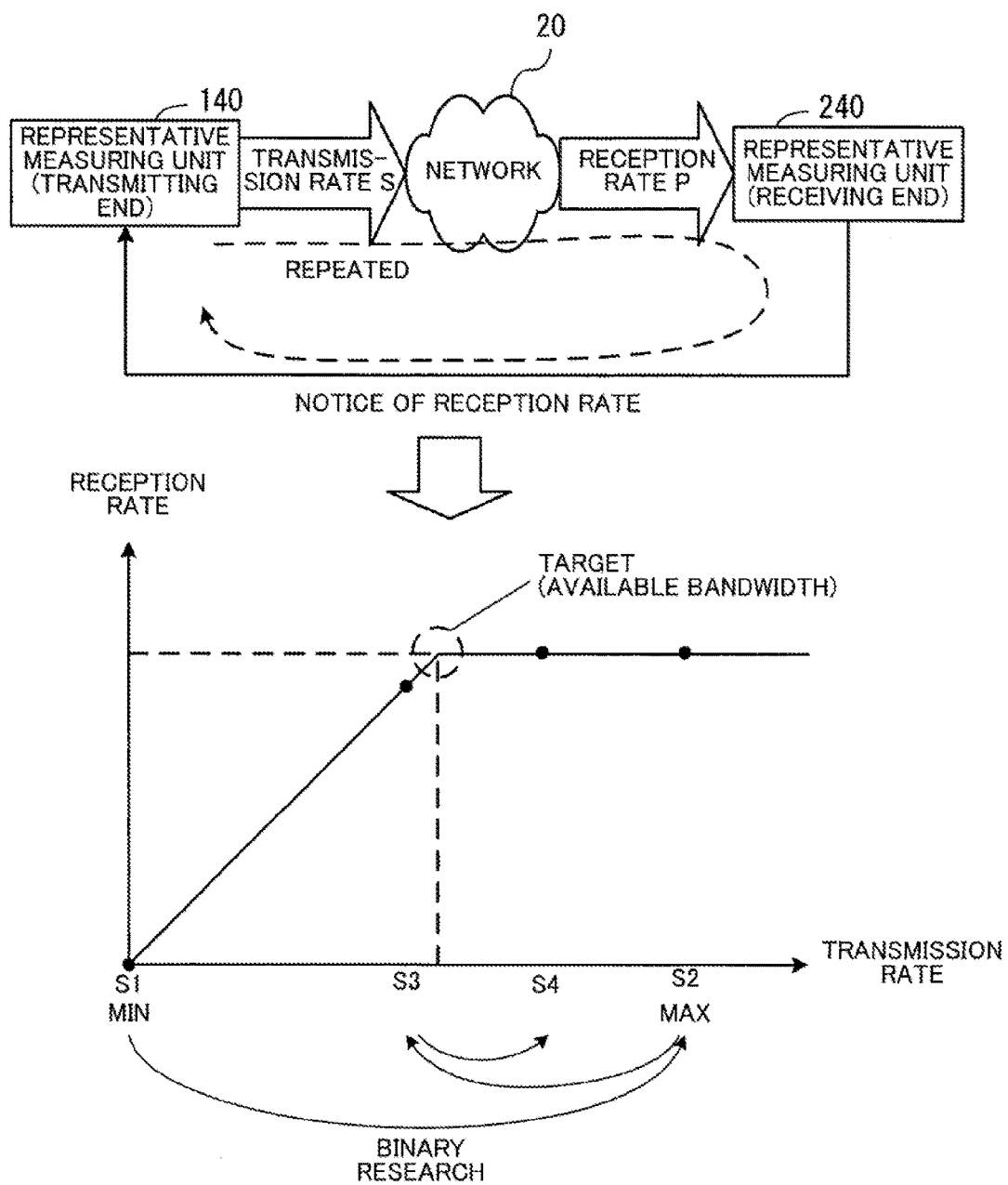
FIG. 7 illustrates an example of an available bandwidth search method.

FIG. 7 illustrates an example of an available bandwidth search method. As illustrated in FIG. 7, when the representative measuring unit 140 transmits data at the transmission rate S, the data is then received by the representative measuring unit 240 via the network 20. Assume that the rate of the data received by the representative measuring unit 240 ("reception rate") here is "P" (P is a real number greater than or equal to 0 and less than or equal to S). The representative measuring unit 240 notifies the representative measuring unit 140 of the reception rate P. Based on the reception rate, the representative measuring unit 140 determines the transmission rate S for the next data transmission. For example, the representative measuring unit 140 uses a binary search to determine the transmission rate S. The following describes a specific procedure to search for the available bandwidth by employing a binary search.

The representative measuring unit 140 randomly determines the transmission rate S for the first data transmission. Then, the representative measuring unit 140 transmits data at the determined data transmission rate S. In response, the representative measuring unit 240 at the receiving end measures the reception rate P. The representative measuring unit 240 notifies the representative measuring unit 140 at the transmitting end of the measured reception rate P.

The representative measuring unit 140 checks the magnitude relationship between the transmission rate S and the reception rate P, and determines the transmission rate for the next data transmission. The transmission rate for the next data transmission is determined within an unsearched range of a binary search range. The unsearched range is a segment of the binary search range, for which inclusion of the available bandwidth has yet to be confirmed. Assume, for example, that the binary search range has predetermined search minimum and maximum values. The unsearched range within the binary search range is defined as the interval between the following two transmission rate values: amongst transmission rate values used for preceding data transmission, the maximum of transmission rate values observed to be less than or equal to their corresponding reception rate values (i.e., "transmission rate≤reception rate"), and the minimum of transmission rate values observed to be greater than their corresponding reception rate values ("transmission rate>reception rate").

If "transmission rate>reception rate", the representative measuring unit 140 sets, for the next data transmission, a transmission rate value lower than the transmission rate S used for the last data transmission. For example, the representative measuring unit 140 uses the middle value (the average) between the maximum value of the unsearched range and the transmission rate used for the last data transmission as the transmission rate for the next data transmission. If "transmission rate reception rate", the representative measuring unit 140 sets, for the next data transmission, a transmission rate value higher than the transmission rate S used for the last data transmission. For example, the representative measuring unit 140 uses the middle value (the average) between the minimum of the unsearched range and the transmission rate used for the last data transmission as the transmission rate for the next data transmission.

The representative measuring unit 140 repeats data transmission with changing the transmission rate, and then ends the search, for example, when the width of the unsearched range falls below a search termination threshold. The representative measuring unit 140 determines the minimum value of the unsearched range obtained at the end of the search as the available bandwidth.

Assume here that a transmission rate value indicated as "TARGET" in the graph of FIG. 7 is the available bandwidth. If the transmission rate is less than or equal to the available bandwidth, the data transmission results in "transmission rate≤reception rate". If the transmission rate is greater than the available bandwidth, the data transmission results in "transmission rate>reception rate". For example, the representative measuring unit 140 first performs data transmission at a transmission rate of S1, which is the minimum value of the binary search range. The first data transmission results in "transmission rate≤reception rate". Next, the representative measuring unit 140 performs data transmission at a transmission rate of S2, which is the maximum value of the binary search range. This data transmission results in "transmission rate>reception rate". Then, the representative measuring unit 140 performs data transmission at a transmission rate of S3, which is the average of the minimum and maximum values of the binary search range. This data transmission results in "transmission rate≤reception rate". Now it turns out that the available bandwidth value is not included in the range greater than or equal to the transmission rate S1 and below the transmission rate S3. As a result, the unsearched range is identified to lie between the transmission rates S3 (inclusive) and S2 (exclusive).

Subsequently, the representative measuring unit 140 performs data transmission at a transmission rate of S4, which is the middle value (the average) between the minimum value and the maximum value of the unsearched range. This data transmission results in "transmission rate>reception rate". Now it turns out that the available bandwidth value is not included in the range greater than or equal to the transmission rate S4 and less than or equal to the transmission rate S2. As a result, the unsearched range is identified to lie between the transmission rates S3 (inclusive) and S4 (exclusive). In this manner, according to the binary search strategy, the unsearched range is narrowed down at each step in the search with a different transmission rate value. Eventually, when the unsearched range has been sufficiently narrowed down and falls below the search termination threshold, the minimum value of the unsearched range is determined to be the available bandwidth.

The representative measuring unit 140 implements the available bandwidth search illustrated in FIG. 7 by emulating each of the VNFs 111, 112, . . . , and 11n on the physical node 100. For example, in the case of emulating the VNF 111, the representative measuring unit 140 uses the Internet Protocol (IP) address and the port number of the VNF 111 as the source address and the source port number, respectively, of packets to be transmitted. Subsequently, after completing the available bandwidth measuring by emulating the VNF 111, the representative measuring unit 140 starts available bandwidth measuring by emulating, for example, VNF 112. In this regard, the representative measuring unit 140 makes effective use of the result of the available bandwidth measuring with emulation of the VNF 111, to thereby efficiently implement the available bandwidth measuring with emulation of VNF 112.

Figure 8:
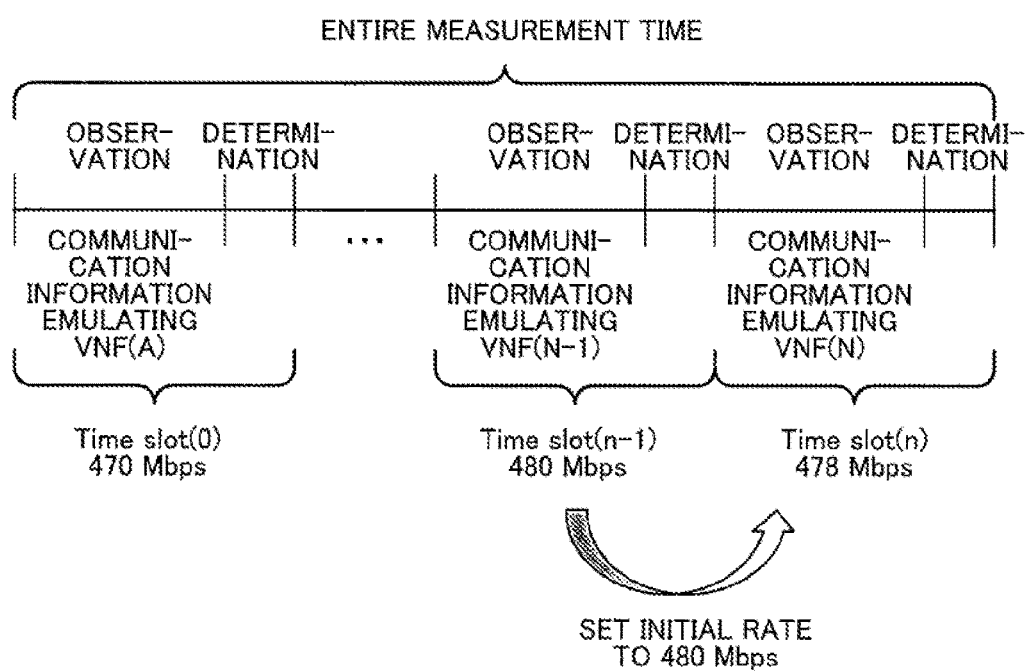
FIG. 8 illustrates an example of effective use of previous measuring results.

FIG. 8 illustrates an example of effective use of previous measuring results. For example, the representative measuring unit 140 divides the entire available bandwidth measurement time into as many time slots as the number of measuring target VNFs. Then, in each time slot, the representative measuring unit 140 performs data transmission using packets each emulating a communication information set (the IP address and port number) of a particular VNF to thereby measure the available bandwidth for the VNF.

In the case of conducting the available bandwidth measuring for n VNFs (n is an integer greater than or equal to 2), for example, the representative measuring unit 140 divides the entire measurement time into n time slots. Subsequently, in "Time slot(0)" which is the first time slot, the representative measuring unit 140 measures the available bandwidth for VNF(A) by emulating the communication information set of VNF(A). In the available bandwidth measuring for VNF(A), reception rate observation and available bandwidth determination are conducted within the time slot. The reception rate observation is observation of the rate of receiving data transmitted at a different transmission rate each time, and the subsequent available bandwidth determination uses results of the reception rate observation to determine the available bandwidth for VNF(A).

Subsequently, the representative measuring unit 140 makes effective use of the available bandwidth measuring result obtained in the preceding time slot to thereby perform the available bandwidth measuring of the next time slot. For example, the representative measuring unit 140 selects the available bandwidth obtained as the measuring result in the latest Time slot(n−2) as the initial transmission rate S of Time slot(n−1), rather than making a random selection. This reduces the amount of observation time and the number of packets involved compared to the case where the initial transmission rate S is randomly selected. For example, if the first data transmission using the available bandwidth measured in the preceding time slot as its initial transmission rate S1 results in "transmission rate≤reception rate", the current time slot may give the same measuring result as that of the preceding time slot. In this case, the representative measuring unit 140 may set a transmission rate higher than the transmission rate S1 by only the search termination threshold as the transmission rate S2 for the second data transmission. If the second data transmission results in "transmission rate>reception rate", the representative measuring unit 140 determines that the available bandwidth of the current time slot is the same as that obtained in the preceding time slot.

In the case of making effective use of measuring results of preceding time slots, the duration of each of the second and subsequent time slots may be set shorter than that of the first time slot. If the available bandwidth measuring is completed within the current time slot, the representative measuring unit 140 moves to the available bandwidth measuring of the next time slot even if the duration of the current time slot has not expired.

Note that the representative measuring unit 140 may utilize the maximum value amongst already measured available bandwidth values, instead of the measuring result of the latest Time slot(n−2). That is, the maximum value amongst already measured available bandwidth values is thought of as the available bandwidth obtained when no bandwidth limit is imposed. Therefore, if a next measuring target VNF is not subject to a bandwidth limit, using the maximum value amongst already measured available bandwidth values as the initial transmission rate for the next time slot leads to a reduction in the measurement time.

The available bandwidth measuring of the representative measuring units 140 and 240 is performed according to instructions from the VNF bandwidth limiting unit 130. For example, a transmission schedule is given by the VNF bandwidth limiting unit 130 to the representative measuring unit 140. The transmission schedule designates available bandwidth measuring target VNFs and specifies the way to divide the entire measurement time into time slots. The VNF bandwidth limiting unit 130 creates a transmission schedule upon determining that it is time for an available bandwidth check, and transmits the transmission schedule to the representative measuring unit 140. Note that the VNF bandwidth limiting unit 130 determines that it is time for an available bandwidth check, for example, upon receiving an available bandwidth check request from a VNF. In addition, the VNF bandwidth limiting unit 130 may determine that it is time for an available bandwidth check when a predetermined amount of time has elapsed after a previous available bandwidth check.

Figure 9:
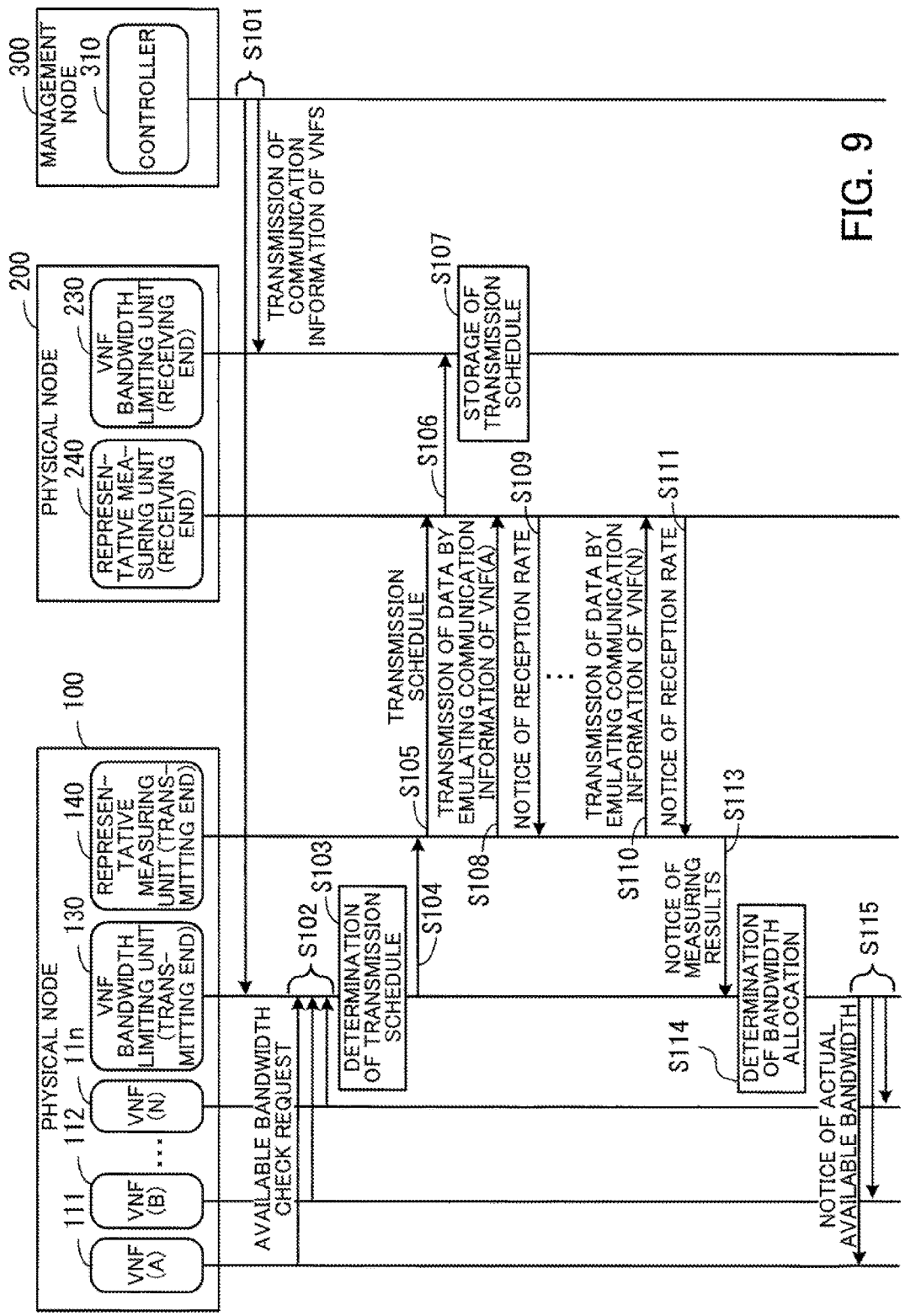
FIG. 9 is a sequence diagram illustrating an example of an available bandwidth measuring process performed at request of VNFs.

FIG. 9 is a sequence diagram illustrating an example of an available bandwidth measuring process performed at the request of VNFs. Prior to an available bandwidth check, the controller 310 of the management node 300 transmits, to the individual physical nodes 100 and 200, communication information sets of the individual VNFs running on the physical nodes 100 and 200 (step S101).

Subsequently, in the example of FIG. 9, the VNFs 111, 112, ..., and 11n on the physical node 100 output available bandwidth check requests (step S102). The available bandwidth check requests are transmitted to the VNF bandwidth limiting unit 130. Upon receiving, for example, the first available bandwidth check request, the VNF bandwidth limiting unit 130 waits for another available bandwidth check request for a predetermined time. Then, after the predetermined time has elapsed, the VNF bandwidth limiting unit 130 determines a transmission schedule for processing the available bandwidth check request received first and subsequent available bandwidth check requests received while waiting (step S103). The transmission schedule indicates the available bandwidth measuring order of VNFs. The VNF bandwidth limiting unit 130 transmits the determined transmission schedule to the representative measuring unit 140 (step S104). The representative measuring unit 140 transmits the received transmission schedule to the representative measuring unit 240 of the physical node 200 (step S105). In the physical node 200, the representative measuring unit 240 having received the transmission schedule transmits the transmission schedule to the VNF bandwidth limiting unit 230 (step S106). The VNF bandwidth limiting unit 230 stores the received transmission schedule in a storage medium such as memory (step S107).

Subsequently, the transmitting-end representative measuring unit 140 transmits data at a transmission rate determined according to a binary search procedure by emulating the communication information set of the first VNF indicated in the transmission schedule (step S108). The receiving-end representative measuring unit 240 notifies the transmitting-end representative measuring unit 140 of the reception rate of the transmitted data (step S109). Subsequently, the data transmission by the transmitting-end representative measuring unit 140 and the reception rate notification by the receiving-end representative measuring unit 240 are repeated. In this manner, the available bandwidth measuring for each VNF is carried out in the order specified by the transmission schedule. Eventually, the representative measuring unit 140 performs data transmission emulating the last measuring target VNF (step S110), and the representative measuring unit 240 gives notice of the reception rate of the transmitted data (step S111). Hereby, the available bandwidth measuring with respect to each of the VNFs 111, 112, ..., and 11n is completed.

Note that, during the data transmission emulating each VNF, the representative measuring unit 140 stops the VNFs having issued the available bandwidth check requests from transmitting data to the physical node 200. Herewith, it is possible to prevent, during the available bandwidth measuring with the data transmission emulating each VNF, data transmission of the VNFs from exerting changes to the available bandwidth.

When the available bandwidth measuring is completed, the representative measuring unit 140 notifies the VNF bandwidth limiting unit 130 of the measuring results (step S113). Based on the results of the available bandwidth measuring for each of the VNFs 111, 112, ..., and 11n, the VNF bandwidth limiting unit 130 determines bandwidth to be allocated to each of the VNFs 111, 112, ..., and 11n (step S114). For example, if all the VNFs 111, 112, ..., and 11n share the same available bandwidth measurement (i.e., the same measured value), the VNF bandwidth limiting unit 130 determines a value obtained by dividing the available bandwidth measurement by the number of VNFs as the bandwidth to be allocated to each of the VNFs 111, 112, ..., and 11n. The VNF bandwidth limiting unit 130 notifies each of the VNFs 111, 112, ..., and 11n of the bandwidth determined to be allocated as the actual available bandwidth of the VNF (step S115). After receiving the notice, each of the VNFs 111, 112, ..., and 11n performs, from this point forward, data transmission at a transmission rate with the bandwidth being the upper limit.

Figure 10:
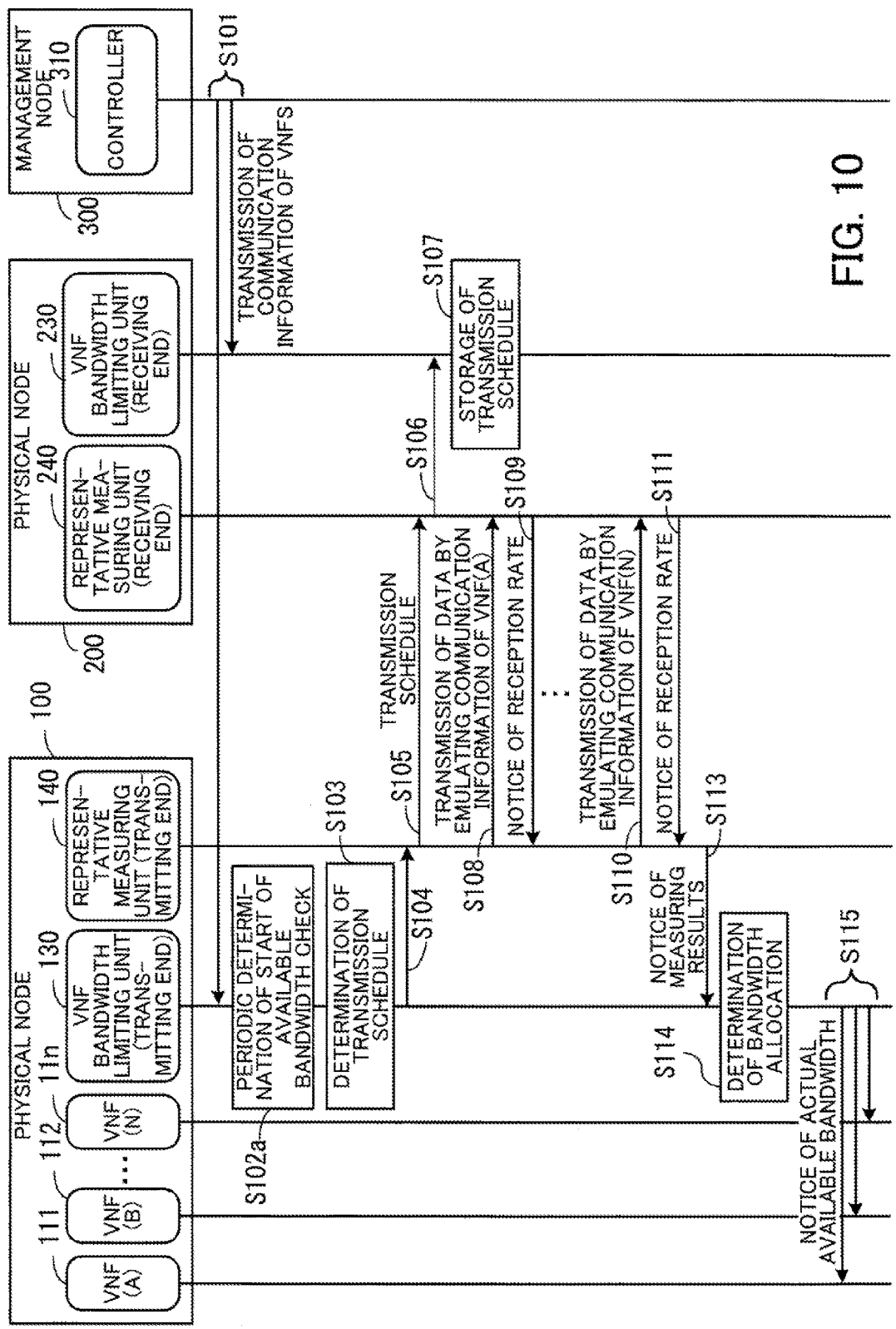
FIG. 10 is a sequence diagram illustrating an example of an available bandwidth measuring process performed on a periodic basis.

FIG. 10 is a sequence diagram illustrating an example of an available bandwidth measuring process performed on a periodic basis. In FIG. 10, the same step numbers are given to steps with processing details that are common to those of FIG. 9. According to the process of FIG. 10, in place of step S102 of FIG. 9, the VNF bandwidth limiting unit 130 periodically determines the start of an available bandwidth check (step S102a). In this case, at a predetermined time to start an available bandwidth check, the VNF bandwidth limiting unit 130 starts the available bandwidth measuring targeted for all the VNFs 111, 112, ..., and 11n on the physical node 100. Note that, during the data transmission emulating each VNF, the representative measuring unit 140 stops all the VNFs from transmitting data to the physical node 200.

Thus, the available bandwidth measuring is implemented by cooperation among the VNF bandwidth limiting units 130 and 230 and the representative measuring units 140 and 240 of the physical nodes 100 and 200, respectively, at both the transmitting and receiving ends. The VNF bandwidth limiting units 130 and 230 and the representative measuring units 140 and 240 are provided, for example, in host operating systems of the physical nodes 100 and 200, respectively.

Figure 11:
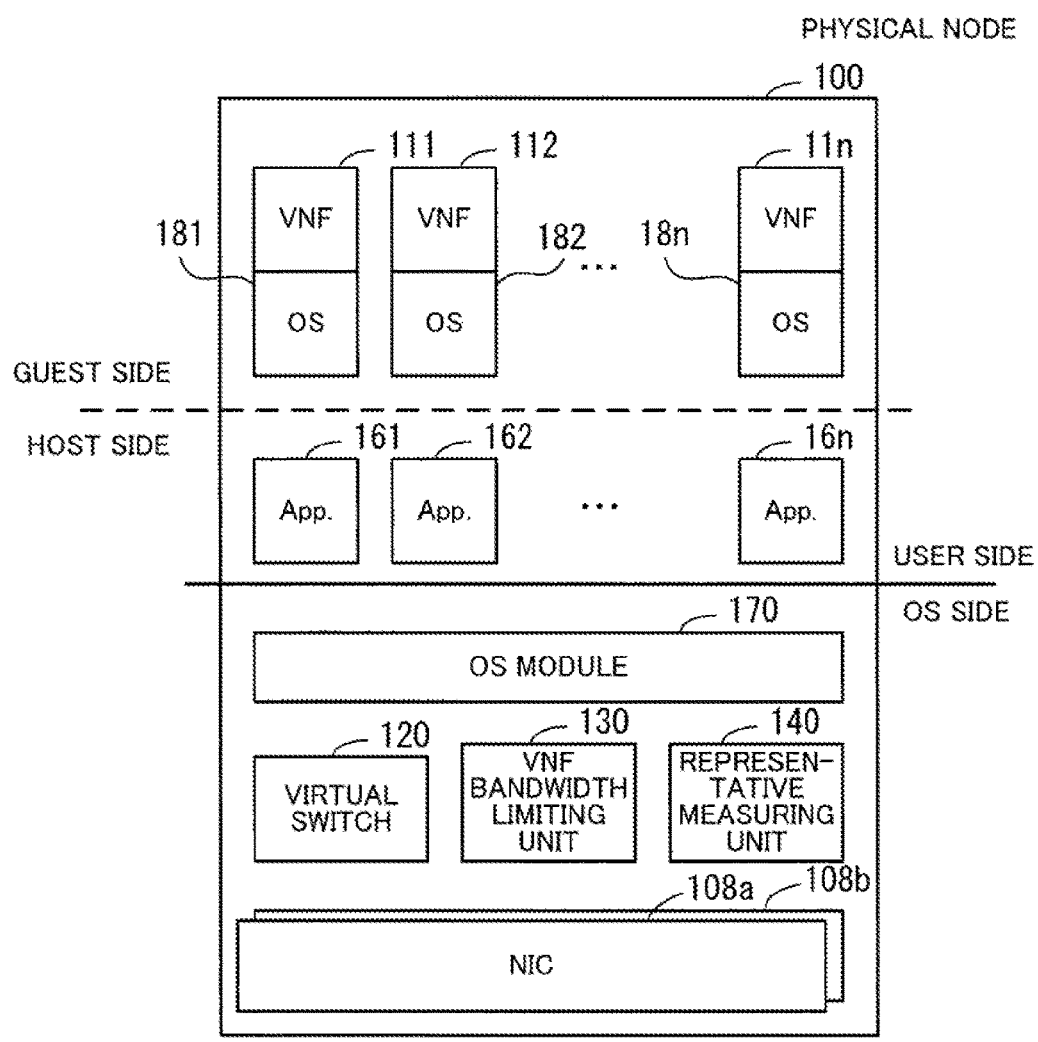
FIG. 11 illustrates an example of software implementation of the physical node.

FIG. 11 illustrates an example of software implementation of a physical node. Software implemented on the physical node 100 to run the VNFs is divided into operating system-side software for controlling the hardware of the physical node 100 and user-side software including software managed on the operating system. The operating system-side software implements the virtual switch 120, the VNF bandwidth limiting unit 130, the representative measuring unit 140, and an operating system module 170. The operating system-side software uses the NICs 108a and 108b to perform communication via the network 20. The user-side software is further divided into host-side and guest-side software. The host-side software includes a plurality of applications (App.) 161, 162, ..., and 16n. The guest-side software implements functions of a plurality of operating systems 181, 182, ..., and 18n and the VNFs 111, 112, ..., and 11n running on the operating systems 181, 182, ..., and 18n, respectively. FIG. 11 illustrates the software implementation example of the physical node 100; however, the same software implementation is also applied to the physical node 200.

Figure 12:
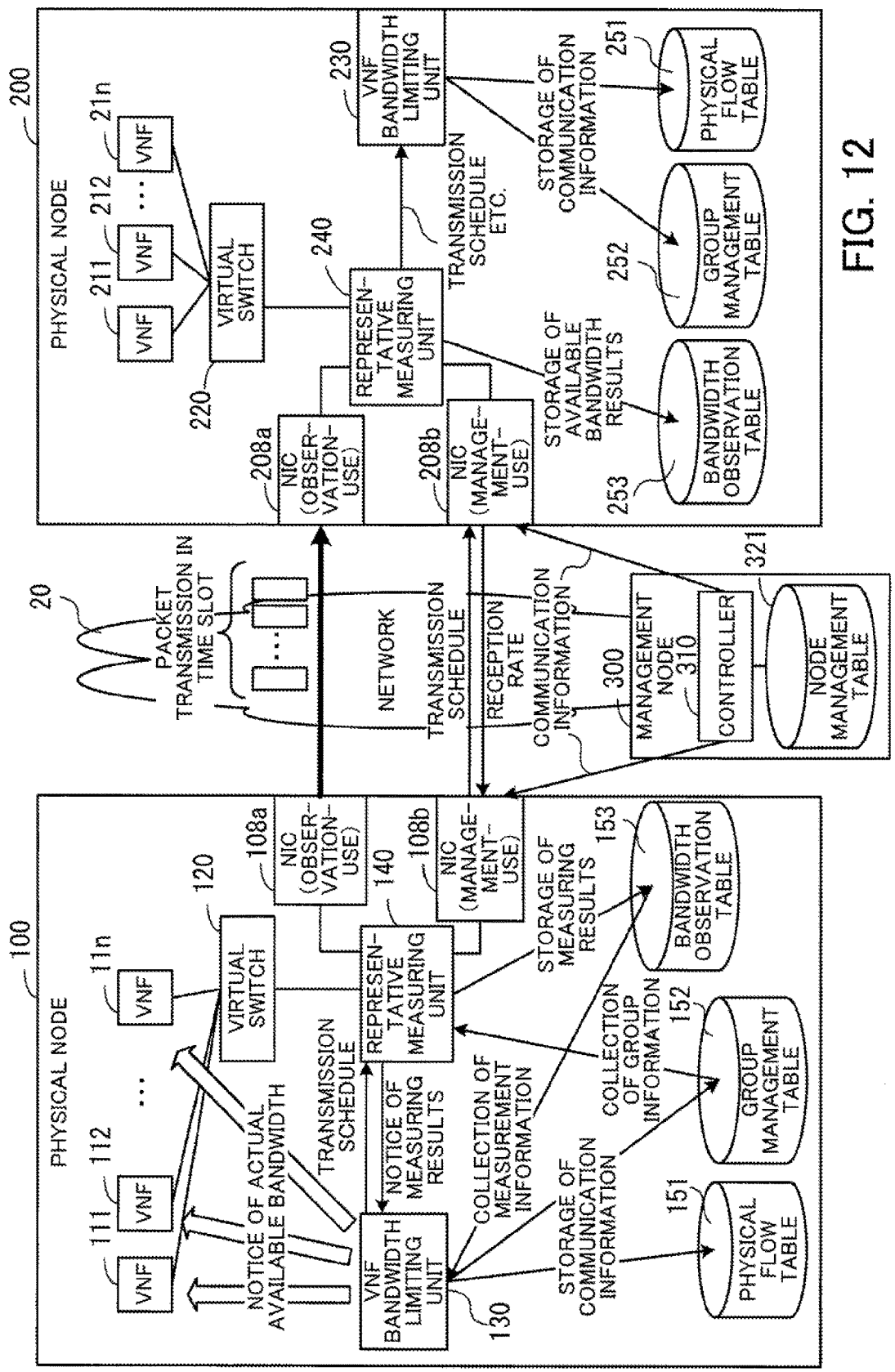
FIG. 12 illustrates information exchanged between components of the individual nodes.

Next described is information exchanged among components of the individual nodes in order to set bandwidth limits on the VNFs 111, 112, ..., and 11n on the physical node 100. FIG. 12 illustrates information exchanged among components of individual nodes. Note that FIG. 12 depicts only part of the information exchanged among the components, and information other than that of FIG. 12 is also exchanged. The storing unit 320 (see FIG. 6) of the management node 300 stores a node management table 321. The node management table 321 is a data table for storing communication information sets of individual components performing communication in the system. The node management table 321 stores, as communication information sets, information to be used by each of all the physical nodes 100 and 200 of the system for its communication. The communication information sets stored in the node management table 321 include those used for communication of the physical nodes 100 and 200 and those used for communication of the VNFs on the physical nodes 100 and 200.

The storing unit 110 (see FIG. 6) of the physical node 100 stores therein a physical flow table 151, a group management table 152, and a bandwidth observation table 153. The physical flow table 151 is a data table for storing information on communication connections (physical flows) between the virtual switches 120 and 220 of the physical nodes 100 and 200, respectively. The group management table 152 is a data table for storing information on VNF groups, each of which includes VNFs on the physical node 100 communicating with VNFs on a single physical node. The VNF groups are generated based on the communication information sets of the VNFs. The bandwidth observation table 153 is a data table for storing information on bandwidth available (available bandwidth) to each VNF. The available bandwidth of each VNF is calculated from available bandwidth measuring results.

The storing unit 210 (see FIG. 6) of the physical node 200 also stores a physical flow table 251, a group management table 252, and a bandwidth observation table 253. The physical flow table 251, the group management table 252, and the bandwidth observation table 253 contain information similar to that contained in the physical flow table 151, the group management table 152, and the bandwidth observation table 153, respectively.

Each of the NICs 108a and 108b of the physical node 100 is used for a dedicated purpose, with the NIC 108a being an observation NIC while the NIC 108b being a management NIC. The observation NIC 108a is used for packet transmission associated with available bandwidth measuring. The management NIC 108b is used in exchanging information needed to maintain cooperation with the physical node 200 in association with VNF bandwidth limiting, such as transmitting transmission schedules and receiving reception rates. Each of NICs 208a and 208b of the physical node 200 is also used for a dedicated purpose, with the NIC 208a being an observation NIC while the NIC 208b being a management NIC. The observation NIC 208a is used for packet transmission associated with available bandwidth measuring. The management NIC 208b is used in exchanging information needed to maintain cooperation with the physical node 100 in association with VNF bandwidth limiting, such as transmitting transmission schedules and receiving reception rates.

The controller 310 of the management node 300 acquires communication information sets from the node management table 321 and then transmits the communication information sets to the physical nodes 100 and 200. The communication information sets are received by the management NICs 108b and 208b. The received communication information sets are transferred to the VNF bandwidth limiting units 130 and 230 via the representative measuring units 140 and 240, respectively. The VNF bandwidth limiting units 130 and 230 store at least part of the received communication information sets in the physical flow tables 151 and 251 or the group management tables 152 and 252.

When having determined a transmission schedule, the VNF bandwidth limiting unit 130 of the physical node 100 transmits the transmission schedule to the representative measuring unit 140. The representative measuring unit 140 collects group information from the group management table 152, and makes sure that VNFs targeted for available bandwidth measuring, appearing in the transmission schedule belong to the same group. In addition, the representative measuring unit 140 transmits the transmission schedule to the physical node 200 via the NIC 108b. The transmission schedule is then received by the representative measuring unit 240 via the NIC 208b of the physical node 200. The representative measuring unit 240 transmits the received transmission schedule to the VNF bandwidth limiting unit 230. Upon receiving the transmission schedule, the VNF bandwidth limiting unit 230 makes sure that, for example, communication partners appearing in the transmission schedule are VNFs on the physical node 200.

Upon receiving the transmission schedule, the representative measuring unit 140 divides a period of time for the available bandwidth measuring into a plurality of time slots, and transmits, during each of the time slots, packets emulating the communication information set of one of the VNFs 111, 112, . . . , and 11n via the NIC 108a. The packets are transmitted to the physical node 200 via the network 20. Then, the packets are received by the representative measuring unit 240 of the physical node 200. The representative measuring unit 240 measures the packet reception rate based on the received packets. The representative measuring unit 240 transmits the measured reception rate to the physical node 100 via the NIC 208b.

The reception rate is received by the representative measuring unit 140 of the physical node 100. Each time acquiring the reception rate of data transmitted by emulating one of the VNFs 111, 112, . . . , and 11n, the representative measuring unit 140 measures the available bandwidth and stores the measured available bandwidth in the bandwidth observation table 153.

When the available bandwidth measuring is completed, the representative measuring unit 140 notifies the VNF bandwidth limiting unit 130 of the measuring results. Based on the measuring results, the VNF bandwidth limiting unit 130 determines bandwidth available (actual available bandwidth) to each of the VNFs 111, 112, and 11n. Note that the VNF bandwidth limiting unit 130 is able to collect detailed information about the measuring results, for example, from the bandwidth observation table 153. The VNF bandwidth limiting unit 130 notifies each of the VNFs 111, 112, . . . , and 11n of its determined actual available bandwidth.

Figure 13:
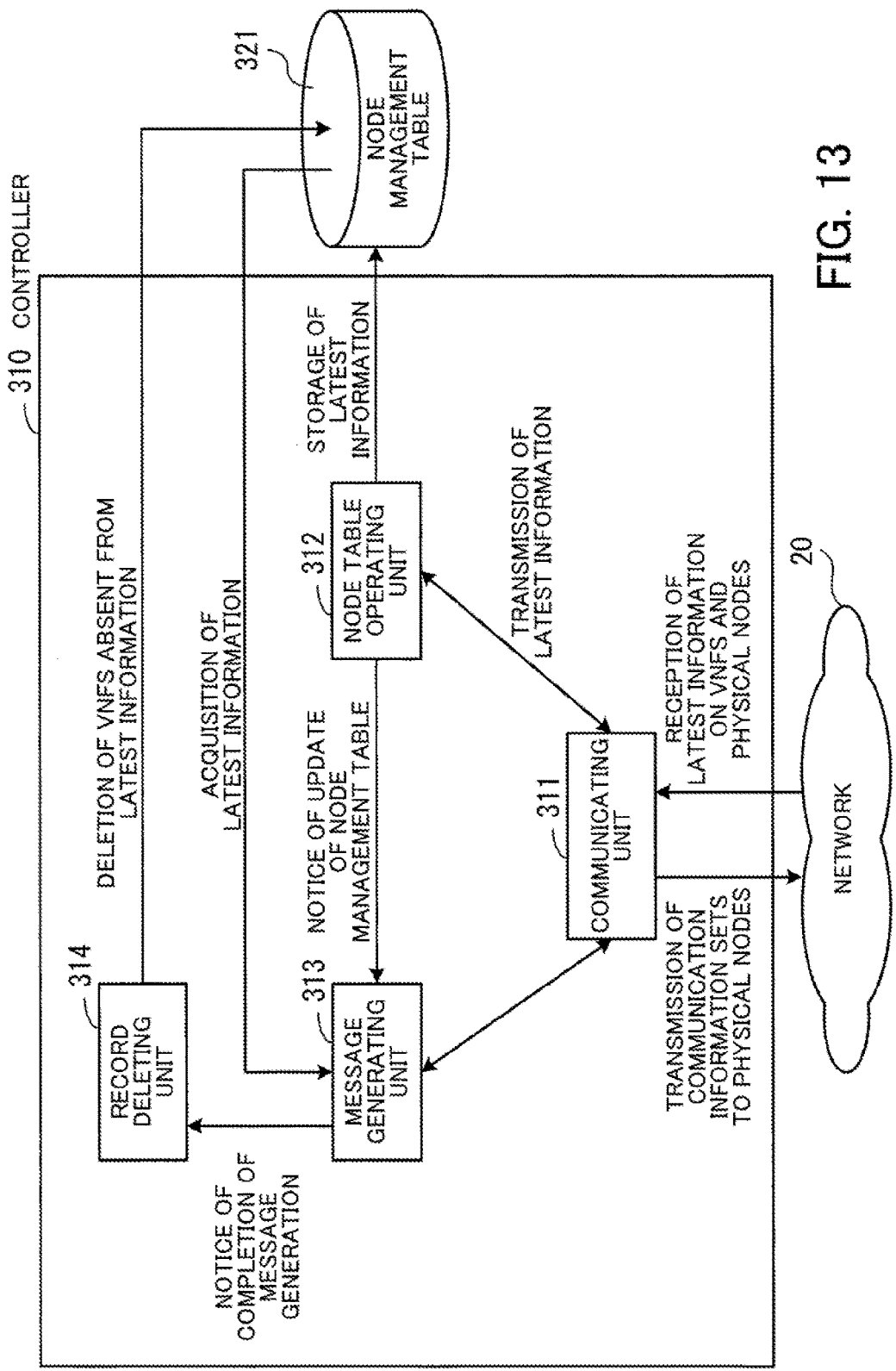
FIG. 13 is a block diagram illustrating functions of a controller of a management node.

Next described are further details of functions included in each node. First, functions of the controller 310 of the management node 300 are explained in detail. FIG. 13 is a block diagram illustrating functions of the controller of the management node. The controller 310 includes a communicating unit 311, a node table operating unit 312, a message generating unit 313, and a record deleting unit 314.

The communicating unit 311 transmits and receives communication messages between the physical nodes 100 and 200 and the controller 310. For example, the communicating unit 311 receives the latest information on VNFs and physical nodes via the network 20. More specifically, the communicating unit 311 receives the communication information sets of the currently operating physical nodes 100 and 200 and the communication information sets of VNFs running on the physical nodes 100 and 200. The communicating unit 311 transmits the received latest information to the node table operating unit 312.

The node table operating unit 312 checks flags in messages sent from the physical nodes 100 and 200 and uses the node management table 321 to manage the physical nodes and their VNFs. Each message about a VNF, received from the physical node 100 or 200 includes, for example, a flag with a value of "D (Delete)", "U (Update)", or "I (Insert)". "D" indicates that the corresponding VNF has been deleted. "U" indicates that information on the corresponding VNF has been updated. "I" indicates that the corresponding VNF has been added. For example, the node table operating unit 312 stores the received latest information in the node management table 321. In addition, after updating the node management table 321, the node table operating unit 312 notifies the message generating unit 313 of the update.

Upon receiving notice of an information update from the node table operating unit 312, the message generating unit 313 generates a message used to pass the updated information on to the individual physical nodes 100 and 200, and gives the message to the communicating unit 311. For example, when an update is made to the node management table 321, the message generating unit 313 acquires the latest information from the node management table 321. Based on the acquired information, the message generating unit 313 generates a message used to transmit the latest communication information sets on a physical node and its VNFs to the individual physical nodes 100 and 200. Then, the message generating unit 313 transmits the generated message to the physical nodes 100 and 200 via the communicating unit 311. In addition, after completing the generation of the message, the message generating unit 313 notifies the record deleting unit 314 of the completion of the message generation. After the message generating unit 313 finishes generating a message, the record deleting unit 314 deletes, from the node management table 321, information on VNFs absent from the latest information. For example, the record deleting unit 314 deletes records each with the flag set to "D" from the node management table 321.

Figure 14:
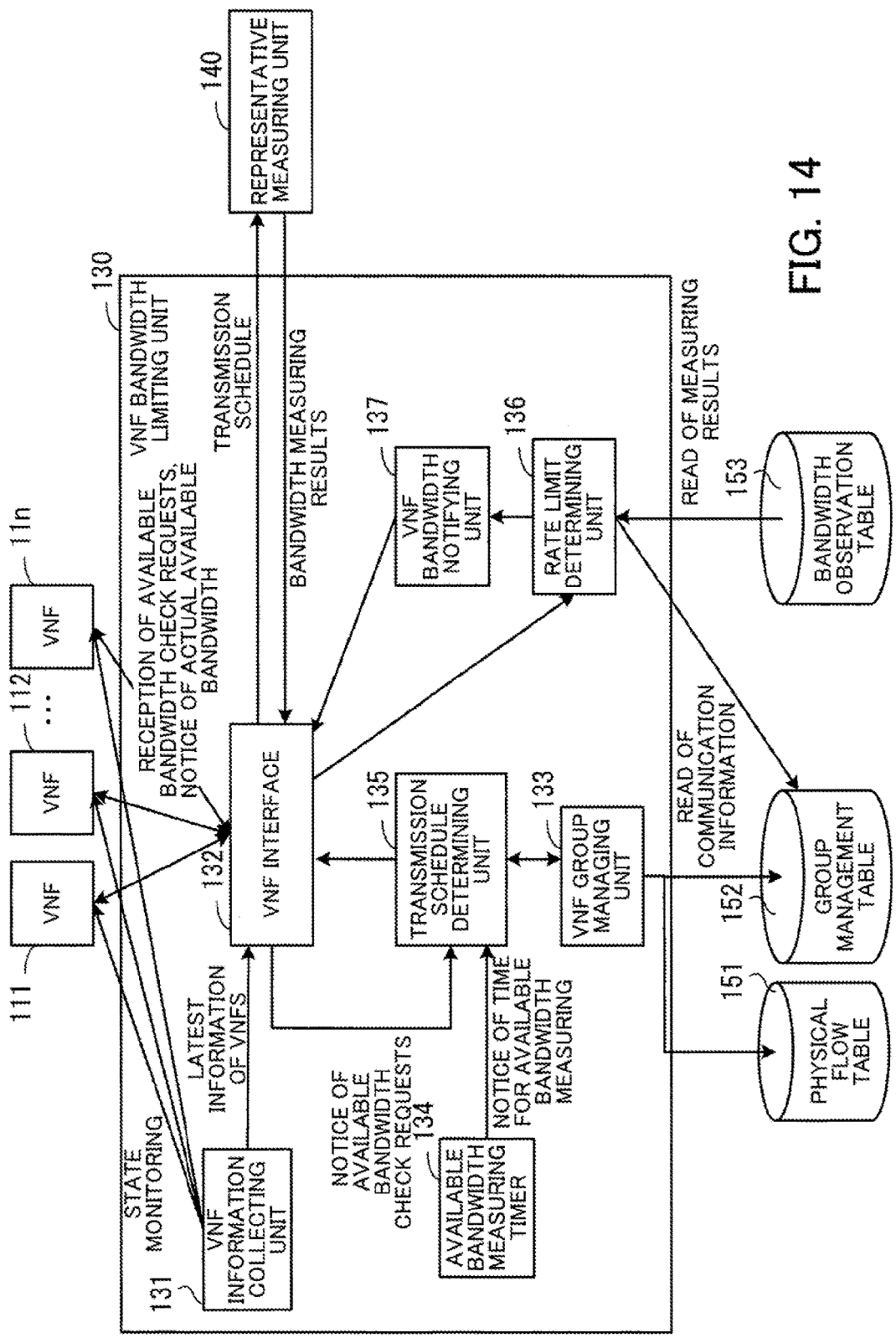
FIG. 14 is a block diagram illustrating functions of a VNF bandwidth limiting unit at a transmitting end.

Next, functions of the VNF bandwidth limiting unit 130 of the physical node 100 at the transmitting end are explained in detail. FIG. 14 is a block diagram illustrating functions of the VNF bandwidth limiting unit at the transmitting end. The VNF bandwidth limiting unit 130 includes a VNF information collecting unit 131, a VNF interface 132, a VNF group managing unit 133, an available bandwidth measuring timer 134, a transmission schedule determining unit 135, a rate limit determining unit 136, and a VNF bandwidth notifying unit 137. The VNF information collecting unit 131 monitors the states of the VNFs 111, 112, . . . , and 11n. Upon an update of the state of a VNF, the VNF information collecting unit 131 generates a packet of update information. The generated packet includes a flag indicating the updated state of the VNF. For example, in the case where the VNF has been deleted, the VNF information collecting unit 131 sets the flag to "D (Delete)". In the case where the state of the VNF has been updated, the VNF information collecting unit 131 sets the flag to "U (Update)". In the case where the VNF has been newly added, the VNF information collecting unit 131 sets the flag to "I (Insert)". The VNF information collecting unit 131 transmits the generated message to the controller 310 via the VNF interface 132.

The VNF interface 132 exchanges messages with the representative measuring unit 140. For example, the VNF interface 132 transmits a transmission schedule to the representative measuring unit 140. In addition, the VNF interface 132 receives bandwidth measuring results from the representative measuring unit 140. The VNF group managing unit 133 acquires communication information sets of VNFs sent from the controller 310 and groups together VNFs using the same physical flow. Then, the VNF group managing unit 133 stores, in the group management table 152, the generated group and information on the VNFs belonging to the group. The available bandwidth measuring timer 134 is a timer for timing an available bandwidth measuring interval in the case of carrying out available bandwidth measuring on a periodic basis. For example, the available bandwidth measuring timer 134 starts timing after implementation of available bandwidth measuring, and notifies the transmission schedule determining unit 135 that it is time to start available bandwidth measuring when the time measured reaches a predetermined value.

Based on the communication information sets of VNFs belonging to the same group, the transmission schedule determining unit 135 determines the sequence of the VNFs for the available bandwidth search according to the time slot order. Then, the transmission schedule determining unit 135 transmits, to the representative measuring unit 140 via the VNF interface 132, the determined sequence as a transmission schedule. The rate limit determining unit 136 detects, from available bandwidth measuring results, the flow of each VNF subject to a bandwidth limit set by the bandwidth limit mechanism. The rate limit determining unit 136 transmits information indicating VNFs subject to bandwidth limits to the VNF bandwidth notifying unit 137. Based on available bandwidth measuring results, the VNF bandwidth notifying unit 137 determines, with respect to each of the VNFs 111, 112, . . . , and 11n, bandwidth available to the VNF as the actual available bandwidth of the VNF. Then, the VNF bandwidth notifying unit 137 notifies each of the VNFs 111, 112, . . . , and 11n of the actual available bandwidth via the VNF interface 132.

Figure 15:
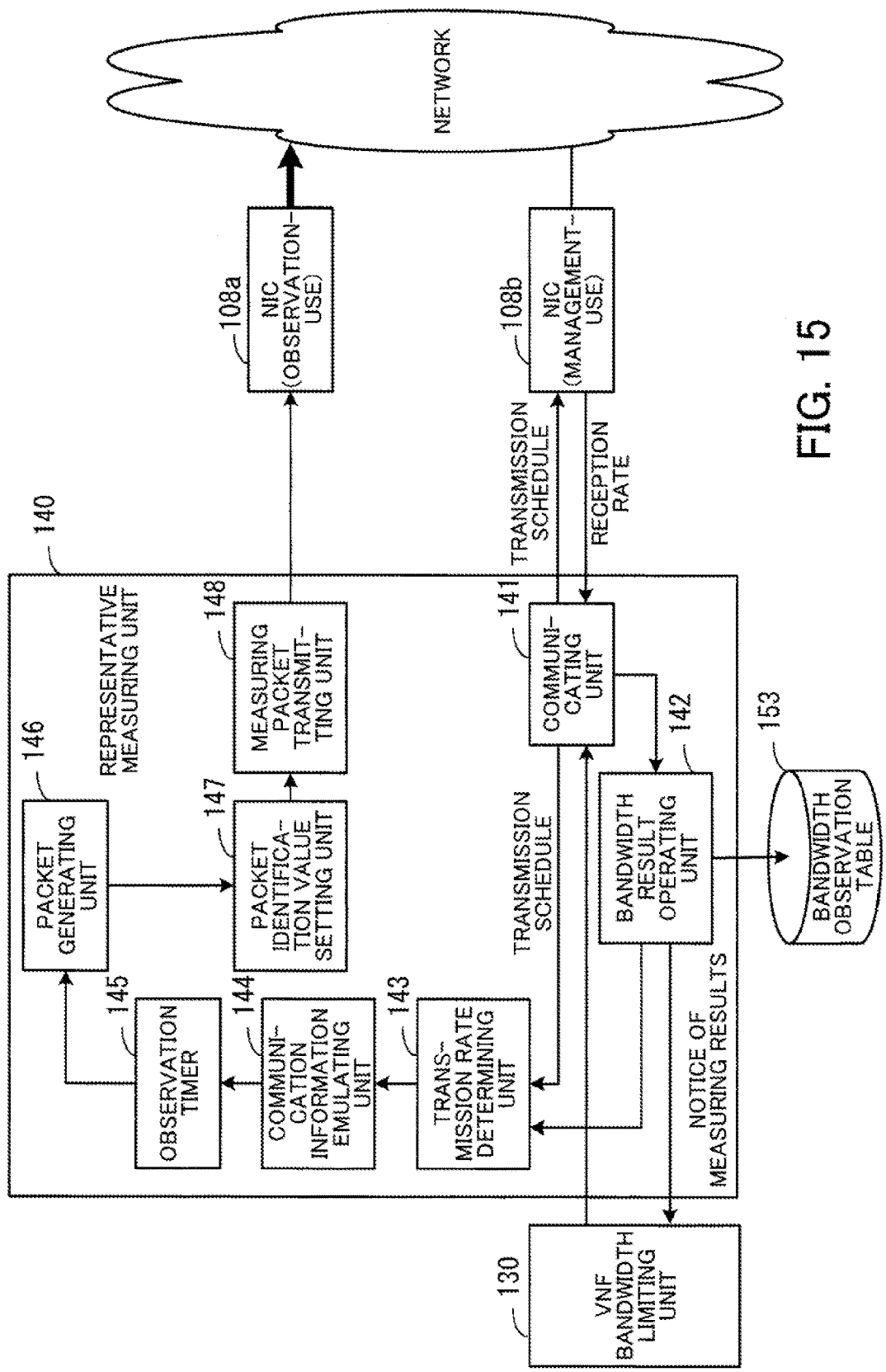
FIG. 15 is a block diagram illustrating functions of a representative measuring unit at the transmitting end.

Next, functions of the representative measuring unit 140 of the transmitting-end physical node 100 are explained in detail. FIG. 15 is a block diagram illustrating functions of the representative measuring unit at the transmitting end. The representative measuring unit 140 includes a communicating unit 141, a bandwidth result operating unit 142, a transmission rate determining unit 143, a communication information emulating unit 144, an observation timer 145, a packet generating unit 146, a packet identification value setting unit 147, and a measuring packet transmitting unit 148. The communicating unit 141 communicates with the representative measuring unit 240 of the receiving-end physical node 200. For example, the communicating unit 141 transmits a transmission schedule sent from the VNF bandwidth limiting unit 130 to the representative measuring unit 240 via the NIC 108b. In addition, the communicating unit 141 also transmits the transmission schedule to the transmission rate determining unit 143. Upon receiving a reception rate from the receiving-end representative measuring unit 240, the communicating unit 141 transmits the reception rate to the bandwidth result operating unit 142.

The bandwidth result operating unit 142 measures the available bandwidth based on a reception rate sent from the receiving-end physical node 200, and stores the available bandwidth measuring result in the bandwidth observation table 153. In addition, the bandwidth result operating unit 142 transmits the reception rate to the transmission rate determining unit 143. Further, when the available bandwidth measuring for all the measuring target VNFs is completed, the bandwidth result operating unit 142 transmits the measuring results to the VNF bandwidth limiting unit 130.

The transmission rate determining unit 143 determines the transmission rate for the next data transmission based on the reception rate sent from the bandwidth result operation unit 142. The transmission rate determining unit 143 transmits the determined transmission rate to the communication information emulating unit 144.

The communication information emulating unit 144 converts a communication information set to be set in each packet into the communication information set of a VNF currently targeted for the available bandwidth measuring. The communication information emulating unit 144 transmits the communication information set to be set in each packet and information designating the transmission rate to the observation timer 145. The observation timer 145 is a timer for time-divided time slots. The observation timer 145 measures the time from the start of a time slot allocated to the VNF currently targeted for the available bandwidth measuring, and ends the available bandwidth measuring for the VNF when the time measured reaches a time designated in the transmission schedule.

The packet generating unit 146 generates packets each emulating a communication information set. The packet generating unit 146 transmits the generated packets to the packet identification value setting unit 147. The packet identification value setting unit 147 sets, in each packet, the identification value serving as an indication of an available bandwidth measuring packet. For example, the packet identification value setting unit 147 sets a predetermined identification value in the Differentiated Services Code Point (DSCP) or Class of Service (CoS) field of the packet. The measuring packet transmitting unit 148 transmits available bandwidth measuring packets at the transmission rate determined by the transmission rate determining unit 143.

Figure 16:
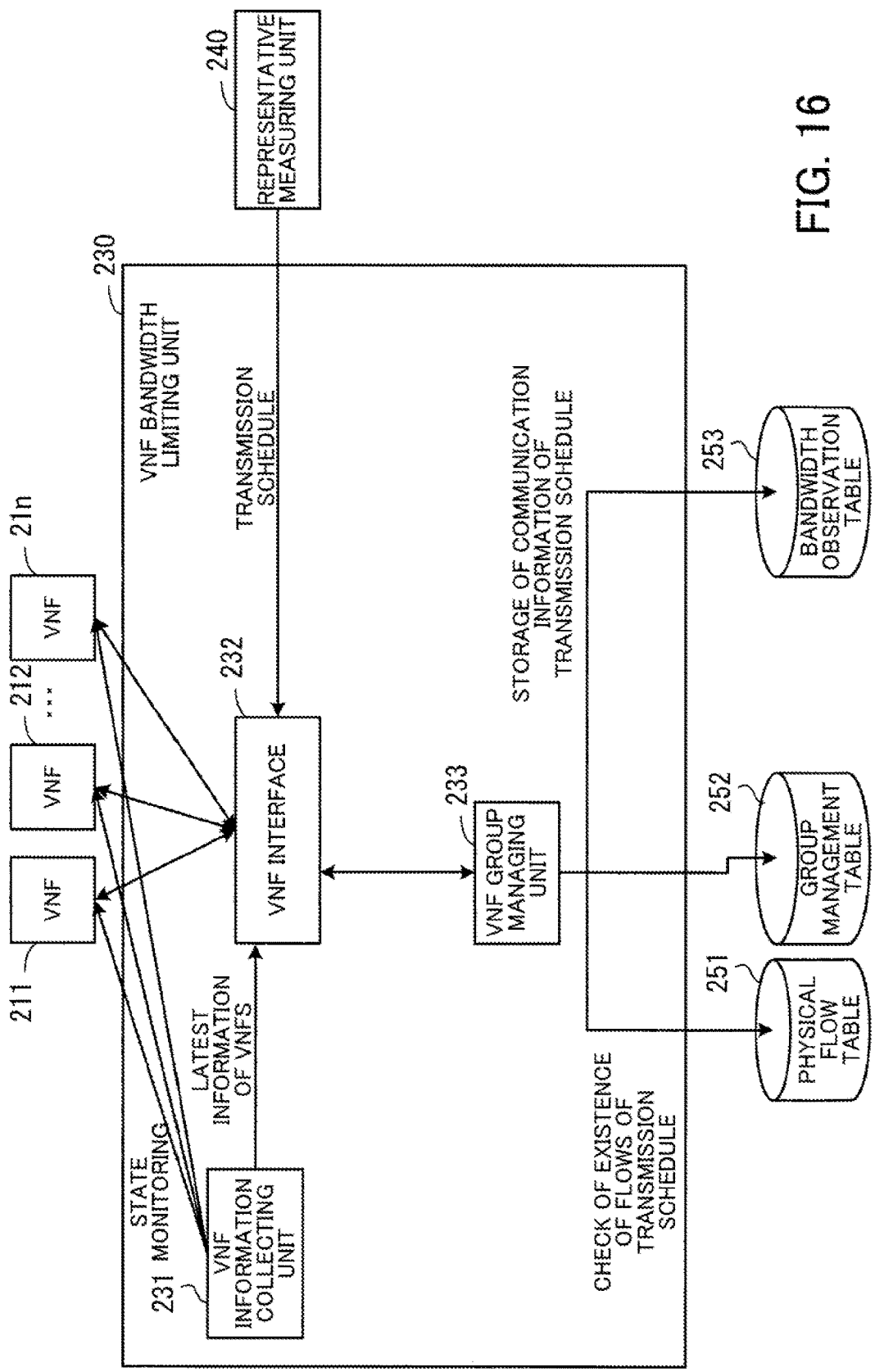
FIG. 16 is a block diagram illustrating functions of a VNF bandwidth limiting unit at a receiving end.

Next described are functions of the VNF bandwidth limiting unit 230 of the receiving-end physical node 200. FIG. 16 is a block diagram illustrating functions of the VNF bandwidth limiting unit at the receiving end. The VNF bandwidth limiting unit 230 includes a VNF information collecting unit 231, a VNF interface 232, and a VNF group managing unit 233. The individual components in the VNF bandwidth limiting unit 230 have the same functions as those with the same names in the VNF bandwidth limiting unit 130 at the transmitting end.

Figure 17:
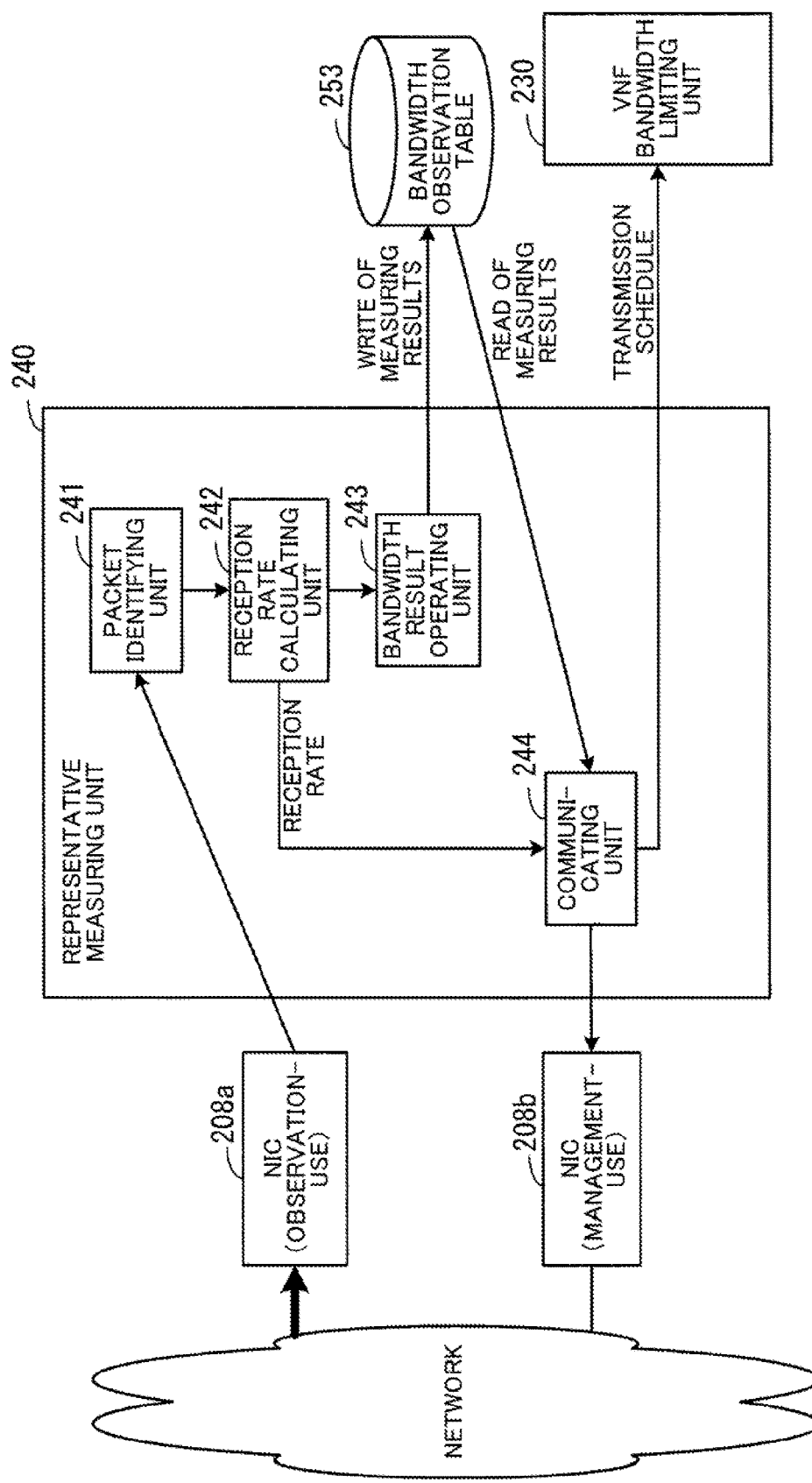
FIG. 17 is a block diagram illustrating functions of a representative measuring unit at the receiving end.

Next described are functions of the representative measuring unit 240 of the receiving-end physical node 200. FIG. 17 is a block diagram illustrating functions of the representative measuring unit at the receiving end. The representative measuring unit 240 includes a packet identifying unit 241, a reception rate calculating unit 242, a bandwidth result operating unit 243, and a communicating unit 244. The packet identifying unit 241 identifies an available bandwidth measuring packet. For example, the packet identifying unit 241 identifies a received available bandwidth measuring packet by whether an identification value indicating that it is an available bandwidth measuring packet is set in the DSCP or CoS field of the packet. The reception rate calculating unit 242 counts the number of packets received per unit of time to thereby calculate the reception rate. The reception rate calculating unit 242 notifies the bandwidth result operating unit 243 and the communicating unit 244 of the calculated reception rate.

Based on the acquired reception rate, the bandwidth result operating unit 243 measures the available bandwidth, and stores the available bandwidth measuring result in the bandwidth observation table 253. In the case of making the available bandwidth measuring at the receiving end, the bandwidth result operating unit 243 regards, for example, the maximum reception rate of data received in a single time slot as the available bandwidth for a measuring target VNF in the time slot. The communicating unit 244 transmits the reception rate acquired from the reception rate calculating unit 242 to the physical node 100. In addition, in the case of having made the available bandwidth measuring at the receiving end, the communicating unit 244 reads the measuring result from the bandwidth observation table 253 and transmits the measuring result to the physical node 100. Upon receiving a transmission schedule sent from the transmitting end, the communicating unit 244 transmits the transmission schedule to the VNF bandwidth limiting unit 230.

In each of FIGS. 13 to 17, lines connecting the individual components represent a part of communication paths, and communication paths other than those illustrated in the figure are also configurable. Note that the function of each component illustrated in the individual FIGS. 13 to 17 is implemented by causing the physical node 100 or 200 or the management node 300 to execute a program module corresponding to the component.

Next, data tables held by the individual nodes are explained in detail with reference to FIGS. 18 to 21. FIG. 18 illustrates an example of the node management table. The node management table 321 stores information on connection ports used for communication between individual virtual switches as communication information sets. For example, the node management table 321 includes node-specific tables 321a, 321b, . . . , and 321n provided for respective physical nodes. Each of the tables 321a, 321b, . . . , and 321n includes columns of the following items: ID; TYPE; S_IP; R_IP; S_PORT; R_PORT; PROTOCOL; and FLAG. The ID column contains identifiers (IDs) of communication information sets. The TYPE column contains values each indicating whether the corresponding communication information set is associated with physical interface communication or VNF communication. If the communication information set is associated with physical interface communication, "PHY" is set in the field. If the corresponding communication information set is associated with VNF communication, "VNF" is set in the field. The S_IP column contains IP addresses of transmitting ends. The R_IP column contains IP addresses of receiving ends. The S_PORT column contains port numbers of transmitting ends. The R_PORT column contains port numbers of receiving ends.

The PROTOCOL column contains values each indicating a communication protocol used for communication. For example, in the case of using the User Datagram Protocol (UDP), a value of "17" indicating the UDP is set in the field. The FLAG column contains flags each indicating the latest state of the corresponding communication information set. For example, in the case where a VNF associated with the communication information set becomes non-existent, "D" is then set in the field. In the case where the communication information set of the associated VNF is updated, "U" is then set in the field. Further, in the case where the associated VNF is newly added, "I" is then set in the field. A set of values in a row with the multiple fields in the S_IP, R_IP, S_PORT, R_PORT, PROTOCOL, and FLAG columns corresponds to a communication information set associated with communication identified by the corresponding ID.

FIG. 19 illustrates an example of the physical flow table. The physical flow table 151 stores information on physical connection ports used for communication between individual virtual switches as communication information sets. The physical flow table 151 includes columns of the following items: PHY_ID; PHY_S_IP; PHY_R_IP; PHY_S_PORT; PHY_R_PORT; and PHY_PROTOCOL. The PHY_ID column contains identifiers of records each indicating a communication information set between physical ports. The PHY_S_IP column contains IP addresses of transmitting ends. The PHY_R_IP column contains IP addresses of receiving ends.

The PHY_S_PORT column contains port numbers of transmitting ends. The PHY_R_PORT column contains port numbers of receiving ends. The PHY_PROTOCOL column contains values each indicating a communication protocol used for communication. For example, in the case of using the User Datagram Protocol (UDP), a value of "17" indicating the UDP is set in the field. A set of values in a row with the multiple fields in the PHY_S_IP, PHY_R_IP, PHY_S_PORT, PHY_R_PORT, and PHY_PROTOCOL columns corresponds to a communication information set (physical communication information set) associated with inter-physical port communication identified by the corresponding ID.

FIG. 20 illustrates an example of the group management table. The group management table 152 stores communication information sets each indicating a communication flow between VNFs and information on groups to which individual communication flows belong. The group management table 152 includes columns of the following items: Group_ID; VNF_ID; PHY_ID; Actual_BW; VNF_S_IP; VNF_R_IP; VNF_S_PORT; VNF_R_PORT; and VNF_PROTOCOL. The Group_ID column contains group identifiers for identifying groups each composed of VNFs using the same physical flow. In the example of FIG. 20, the second and third communication information sets from the top indicate that the corresponding communication flows belong to the same group. Because communication flows belonging to the same group use a common physical flow, communication information sets with the same group identifier have the same value set in the PHY_ID column. The VNF_ID column contains identifiers assigned to individual VNFs. The PHY_ID column contains identifiers of records each indicating a communication information set between physical ports. The Actual_BW column contains actual available bandwidth values which corresponding VNFs are notified of.

The VNF_S_IP column contains IP addresses of transmitting ends. The VNF_R_IP column contains IP addresses of receiving ends. The VNF_S_PORT column contains port numbers of transmitting ends. The VNF_R_PORT column contains port numbers of receiving ends. The VNF_PROTOCOL column contains values each indicating a communication protocol used for communication. For example, in the case of using the User Datagram Protocol (UDP), a value of "17" indicating the UDP is set in the field. A set of values in a row with the multiple fields in the VNF_S_IP, VNF_R_IP, VNF_S_PORT, VNF_R_PORT, and VNF_PROTOCOL columns corresponds to a communication information set indicating a communication flow between VNFs.

FIG. 21 illustrates an example of the bandwidth observation table. The bandwidth observation table 153 stores available bandwidth measuring results of individual VNF flows. The bandwidth observation table 153 includes columns of the following items: Time slot; Time; FLOW_ID; PACKET_ID; and ABW. The Time slot column contains identification numbers of time slots. The Time column contains observation dates and times, with up to microsecond precision. The FLOW_ID column contains VNF IDs for identifying flows. The PACKET_ID column contains values of DSCP or CoS, each assigned to the corresponding time slot. The ABW column contains available bandwidth measuring results for the corresponding VNF flows.

The individual data tables of FIGS. 18 to 21 are used in the available bandwidth measuring for VNFs and determination of the actual available bandwidth of each VNF based on the measuring results.

Figure 22:
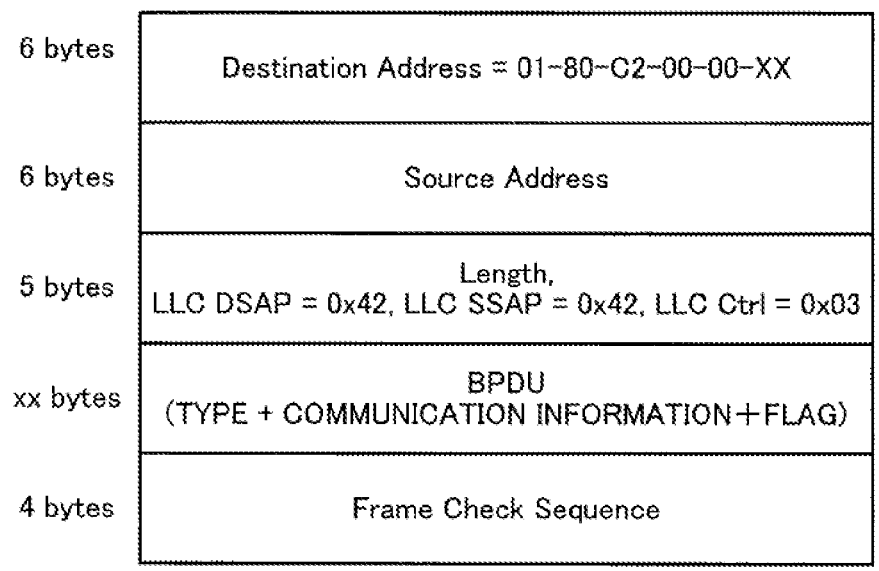
FIG. 22 illustrates an example of a packet format used by physical nodes to transmit a communication information set.

Note that communication information sets associated with communication performed by each of the physical nodes 100 and 200 are first collected together in the management node 300. For example, packets including the latest communication information sets are transmitted from each of the physical nodes 100 and 200 to the management node 300. FIG. 22 illustrates an example of the packet format used by the physical nodes to transmit a communication information set. The packet includes fields of the following items: Destination Address; Source Address; Length; Bridge Protocol Data Unit (BPDU); and Frame Check Sequence. The physical nodes 100 and 200 individually transmit, to the management node 300, each packet in which communication TYPE (PHY or VNF), a communication information set, and FLAG are set in the BPDU field, for example.

Figure 23:
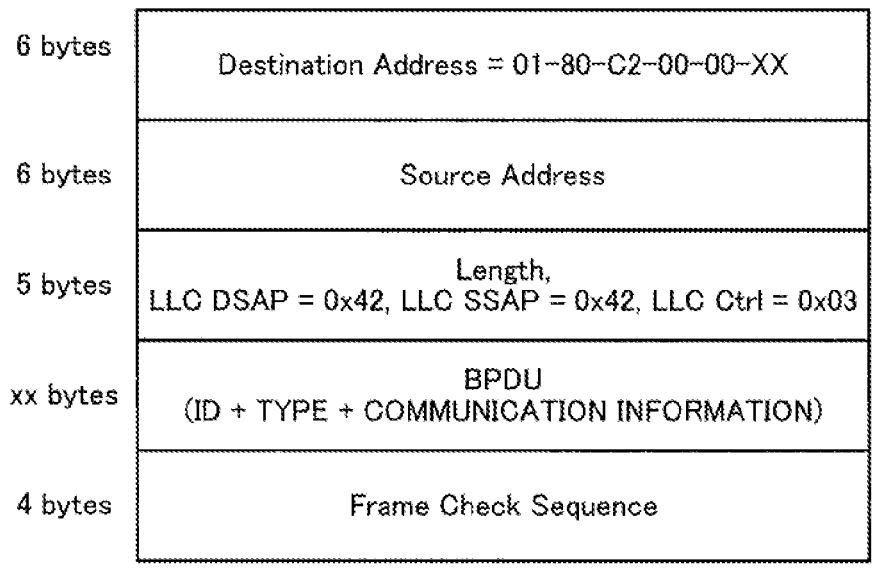
FIG. 23 illustrates an example of a packet format used by the management node to transmit the communication information set.

Communication information sets collected by the management node 300 are managed in the node management table 321 of FIG. 18. Then, the communication information sets are distributed from the management node 300 to each of the physical nodes 100 and 200. FIG. 23 illustrates an example of the packet format used by the management node to transmit a communication information set. The packet format configuration used by the management node here is the same as that illustrated in FIG. 22. The management node 300 transmits, to the physical nodes 100 and 200, each packet in which communication TYPE (PHY or VNF) and a communication information set are set in the BPDU field, for example.

The distribution of communication information sets to the physical nodes 100 and 200 allows the physical nodes 100 and 200 to maintain the latest communication information sets. Then, the physical nodes 100 and 200 carry out available bandwidth measuring by emulating communication information sets of VNFs at a predetermined timing. The available bandwidth measuring is performed according to a transmission schedule. The transmission schedule is generated by the transmitting-end physical node 100 and then sent to the receiving-end physical node 200. This allows both the physical nodes 100 and 200 engaged in the available bandwidth measuring to share the transmission schedule.

FIG. 24 illustrates an example of the transmission schedule. A transmission schedule 31 includes columns of the following items: Group_ID; DSCP (or CoS); VNF_S_IP; VNF_R_IP; VNF_S_PORT; VNF_R_PORT; and VNF_PROTOCOL, and each entry corresponds to one measuring target VNF. Each field in the Group_ID column contains the group identifier of a group to which the corresponding measuring target VNF belongs. Each field in the DSCP column contains the value of DSCP in each packet to be transmitted in the available bandwidth measuring for the corresponding VNF. Each field in the VNF_S_IP column contains the IP address of a transmitting-end VNF. Each field in the VNF_R_IP column contains the IP address of a receiving-end VNF. Each field in the VNF_S_PORT contains the port number of a transmitting-end VNF. Each field in the VNF_R_PORT contains the port number of a receiving-end VNF. Each field in the VNF_PROTOCOL column contains the value indicating a communication protocol used by the corresponding VNFs for their communication.

Figure 25:
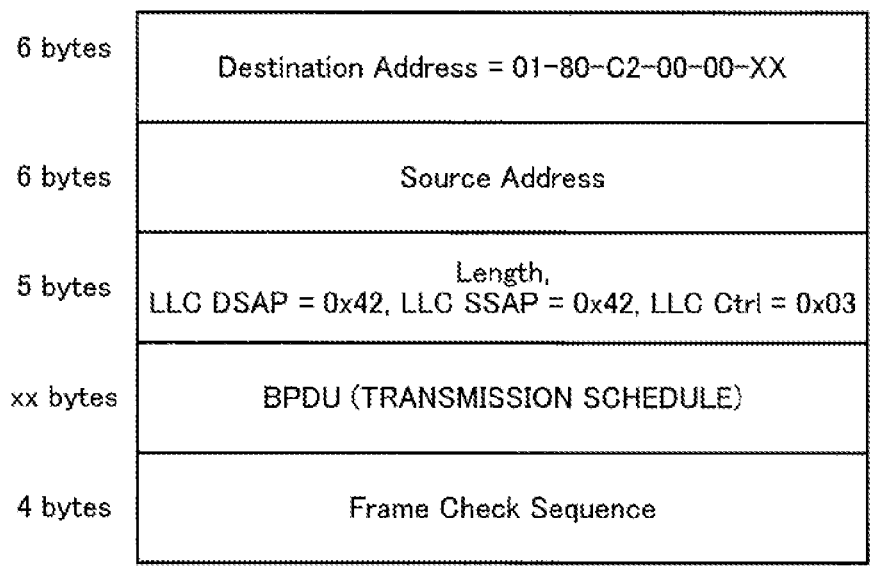
FIG. 25 illustrates an example of a packet format used to transmit the transmission schedule.

The physical node 100 transmits a packet including a transmission schedule like the one illustrated in FIG. 24 to the physical node 200. FIG. 25 illustrates an example of the packet format used to transmit a transmission schedule. The packet format configuration used here is the same as that illustrated in FIG. 22. The transmitting-end physical node 100 transmits, to the receiving-end physical node 200, a packet in which a transmission schedule is set in the BPDU field, for example.

Figure 26:
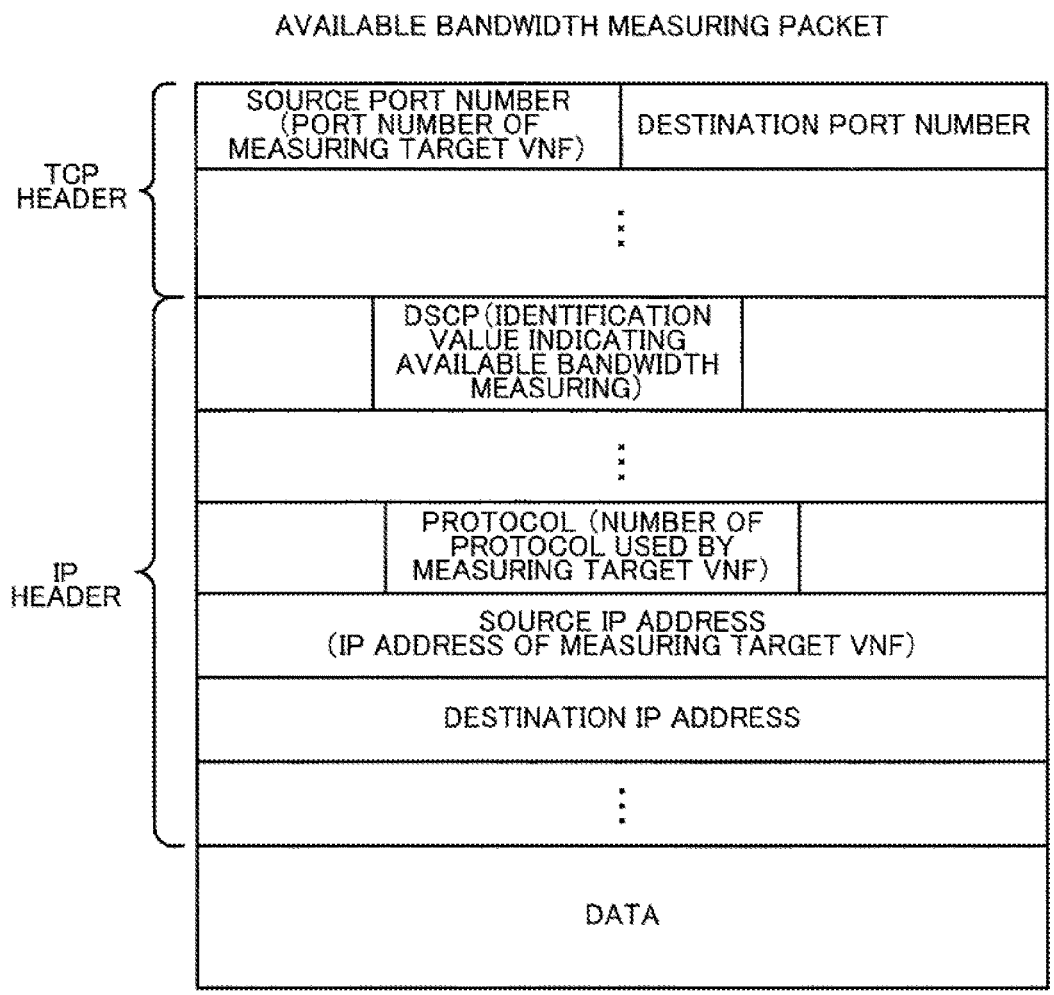
FIG. 26 illustrates an example of an available bandwidth measuring packet.
Figure 27:
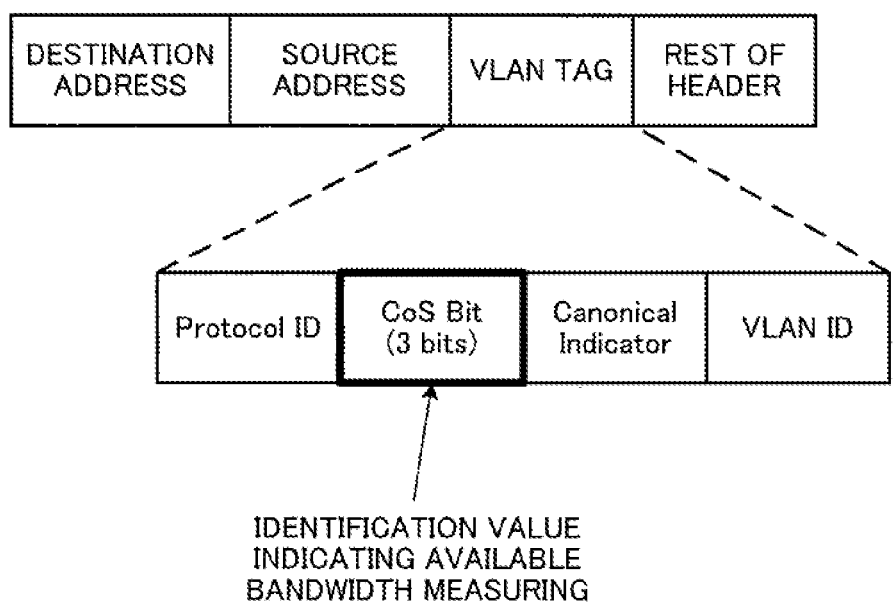
FIG. 27 illustrates an example of setting, in CoS field, an identification value serving as an indication of the available bandwidth measuring packet.

After transmitting the transmission schedule, the physical node 100 transmits packets emulating the communication information set of each VNF for available bandwidth measuring. FIG. 26 illustrates an example of the available bandwidth measuring packet. Each available bandwidth measuring packet includes a TCP header and an IP header. A source port number field of the TCP header contains the port number of a measuring target VNF. A DSCP field of the IP header contains the identification value indicating available bandwidth measuring for the measuring target VNF. A protocol field of the IP header contains the number of a protocol used by the measuring target VNF for its communication. A source IP address field of the IP header contains the IP address of the measuring target VNF. In the physical node 100, the representative measuring unit 140 generates packets like the one illustrated in FIG. 26, which allows communication emulating the measuring target VNF. As a result, in the case where the VNF is subject to a bandwidth limit on the network 20, the communication emulating the measuring target VNF is also subject to the bandwidth limit.

Note that the identification value serving as an identification of an available bandwidth measuring packet may be set in the CoS field instead of the DSCP field. FIG. illustrates an example of setting, in the CoS field, the identification value serving as an identification of an available bandwidth measuring packet. For example, in the case of using a VLAN (virtual LAN) tag, a VLAN tag field is placed in a frame for transmitting packets. The field includes 3-bit CoS. In this 3-bit field, the identification value serving as an identification of available bandwidth measuring is contained.

Figure 28:
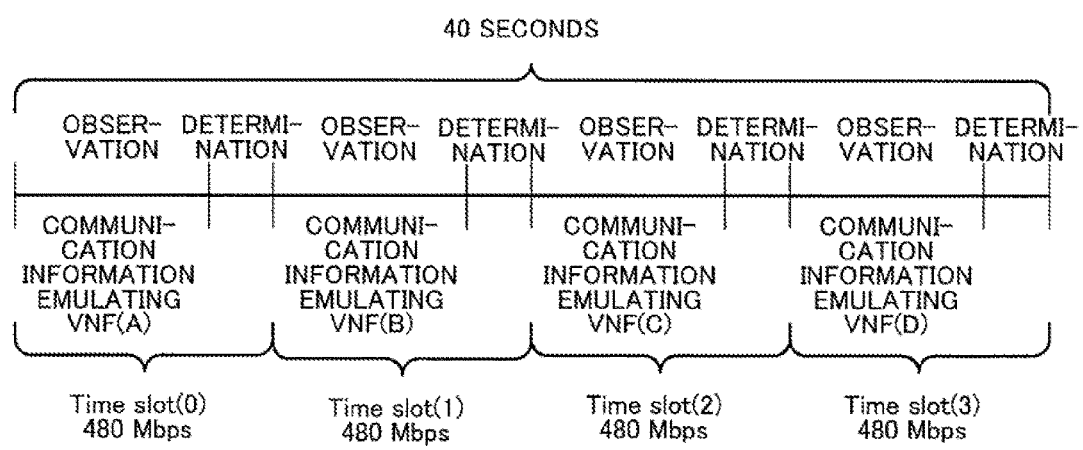
FIG. 28 illustrates available bandwidth measuring results obtained when no VNFs are subject to bandwidth limits.

The physical node 100 repeats transmission of packets like the one illustrated in FIG. 26, for example, with changing the transmission rate. Then, the receiving-end physical node 200 calculates the reception rate, and the physical node 100 compares the transmission rate and the reception rate to thereby determine the available bandwidth for each measuring target VNF. Next described is an example of available bandwidth measuring when no VNFs are subject to bandwidth limits, with reference to FIGS. 28 and 29. FIG. 28 illustrates available bandwidth measuring results obtained when no VNFs are subject to bandwidth limits. Assume in the example of FIG. 28 that the VNF bandwidth limiting unit 130 has received available bandwidth check requests from VNFs(A), (B), (C), and (D). In addition, assume that VNFs(A), (B), (C), and (D) perform communication with VNFs all running on the same physical node 200. In this case, the VNF group managing unit 133 of the VNF bandwidth limiting unit 130 puts VNFs(A), (B), (C), and (D) into the same group.

Subsequently, the transmission schedule determining unit 135 allocates time slots (Time slot(0) to Time slot(3)) to the individual VNFs(A), (B), (C), and (D) to determine a transmission schedule. According to the example of FIG. 28, the entire available bandwidth measurement time is 40 seconds, and the transmission schedule is constructed by dividing the entire available bandwidth measurement time by four. Then, according to the transmission schedule, communication emulating each of the VNFs is performed to measure the available bandwidth. In the example of FIG. 28, an available bandwidth of 480 Mbps is obtained for all the VNFs.

Figure 29:
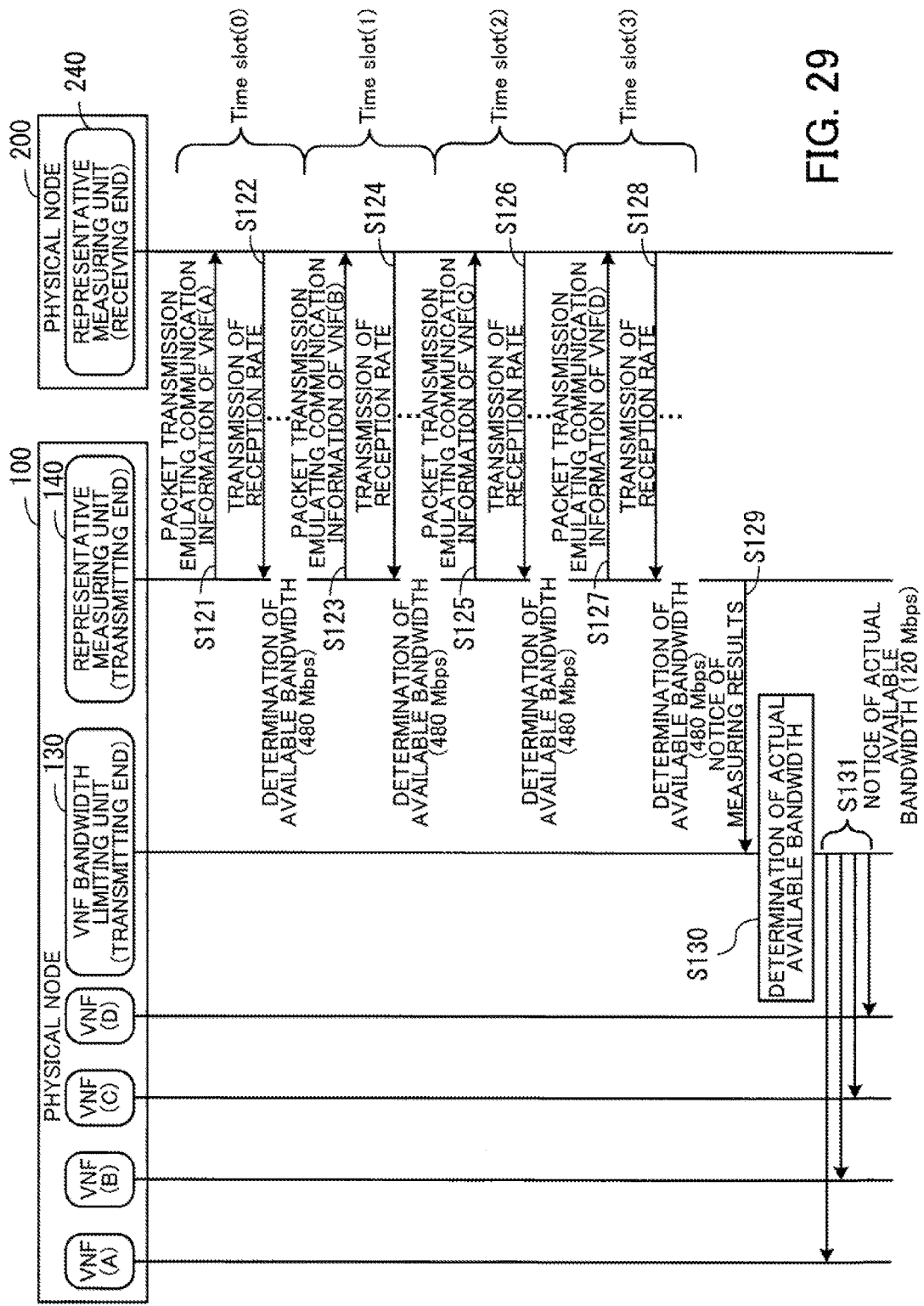
FIG. 29 is a sequence diagram illustrating a procedure of the available bandwidth measuring when no VNFs are subject to bandwidth limits.

FIG. 29 is a sequence diagram illustrating a procedure of available bandwidth measuring when no VNFs are subject to bandwidth limits. Note that FIG. 29 omits processing preceding the start of the available bandwidth measuring process because the processing is the same as described in steps S101 to S107 of FIG. 9 or FIG. 10. The representative measuring unit 140 carries out available bandwidth measuring by emulating the communication information set of each measuring target VNF according to the transmission schedule. In the example of FIG. 29, in the first time slot, "Time slot(0)", the representative measuring unit 140 transmits packets emulating the communication information set of VNF(A) to the physical node 200 (step S121). Then, the representative measuring unit 240 of the physical node 200 transmits the reception rate of the packets to the physical node 100 (step S122). By repetition of these operations, the available bandwidth for VNF(A) (480 Mbps) is obtained by a binary search.

Next, in "Time slot(1)", the representative measuring unit 140 transmits packets emulating the communication information set of VNF(B) to the physical node 200 (step S123). Then, the representative measuring unit 240 of the physical node 200 transmits the reception rate of the packets to the physical node 100 (step S124). By repetition of these operations, the available bandwidth for VNF(B) (480 Mbps) is obtained by a binary search. Next, in "Time slot(2)", the representative measuring unit 140 transmits packets emulating the communication information set of VNF(C) to the physical node 200 (step S125). Then, the representative measuring unit 240 of the physical node 200 transmits the reception rate of the packets to the physical node 100 (step S126). By repetition of these operations, the available bandwidth for VNF(C) (480 Mbps) is obtained by a binary search. Lastly, in "Time slot(3)", the representative measuring unit 140 transmits packets emulating the communication information set of VNF(D) to the physical node 200 (step S127). Then, the representative measuring unit 240 of the physical node 200 transmits the reception rate of the packets to the physical node 100 (step S128). By repetition of these operations, the available bandwidth for VNF(D) (480 Mbps) is obtained by a binary search.

The representative measuring unit 140 notifies the VNF bandwidth limiting unit 130 of the available bandwidth measuring results for the individual VNFs(A), (B), (C), and (D) (step S129). Based on the measuring results, the VNF bandwidth limiting unit 130 determines the actual available bandwidth of each of VNFs(A), (B), (C), and (D) (step S130). In the example of FIG. 29, because the same available bandwidth is measured for all the VNFs, the VNF bandwidth limiting unit 130 distributes the available bandwidth to the four VNFs(A), (B), (C), and (D) evenly, thus determining the actual available bandwidth of each VNF to be "120 Mbps". Subsequently, the VNF bandwidth limiting unit 130 notifies the individual VNFs(A), (B), (C), and (D) of the actual available bandwidth "120 Mbps" (step S131).

In the above-described manner, the available bandwidth measuring is made with respect to each of VNFs(A), (B), (C), and (D), and the actual available bandwidth of the individual VNFs is determined based on the measuring results. From this point forward, VNFs(A), (B), (C), and (D) individually perform data transmission at a communication speed within the determined actual available bandwidth, which facilitates efficient communication.

Figure 30:
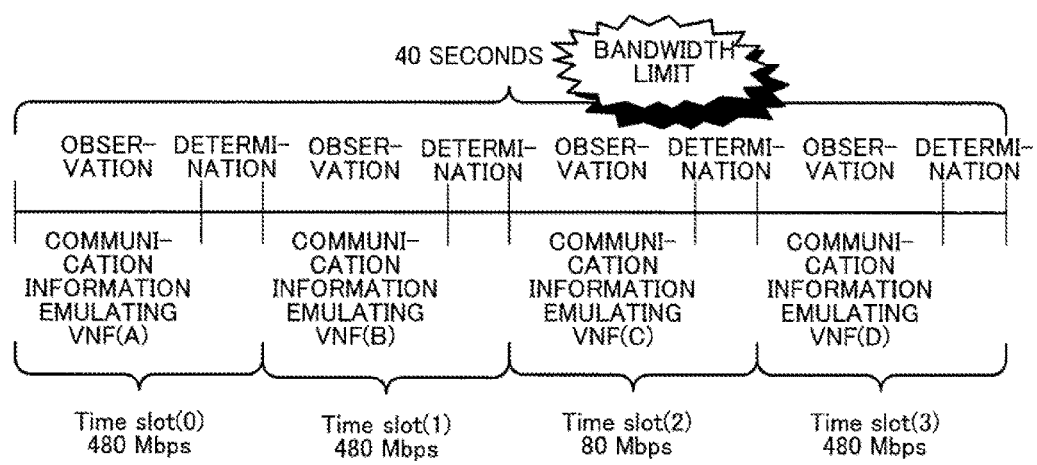
FIG. 30 illustrates available bandwidth measuring results obtained when a VNF is subject to a bandwidth limit.
Figure 31:
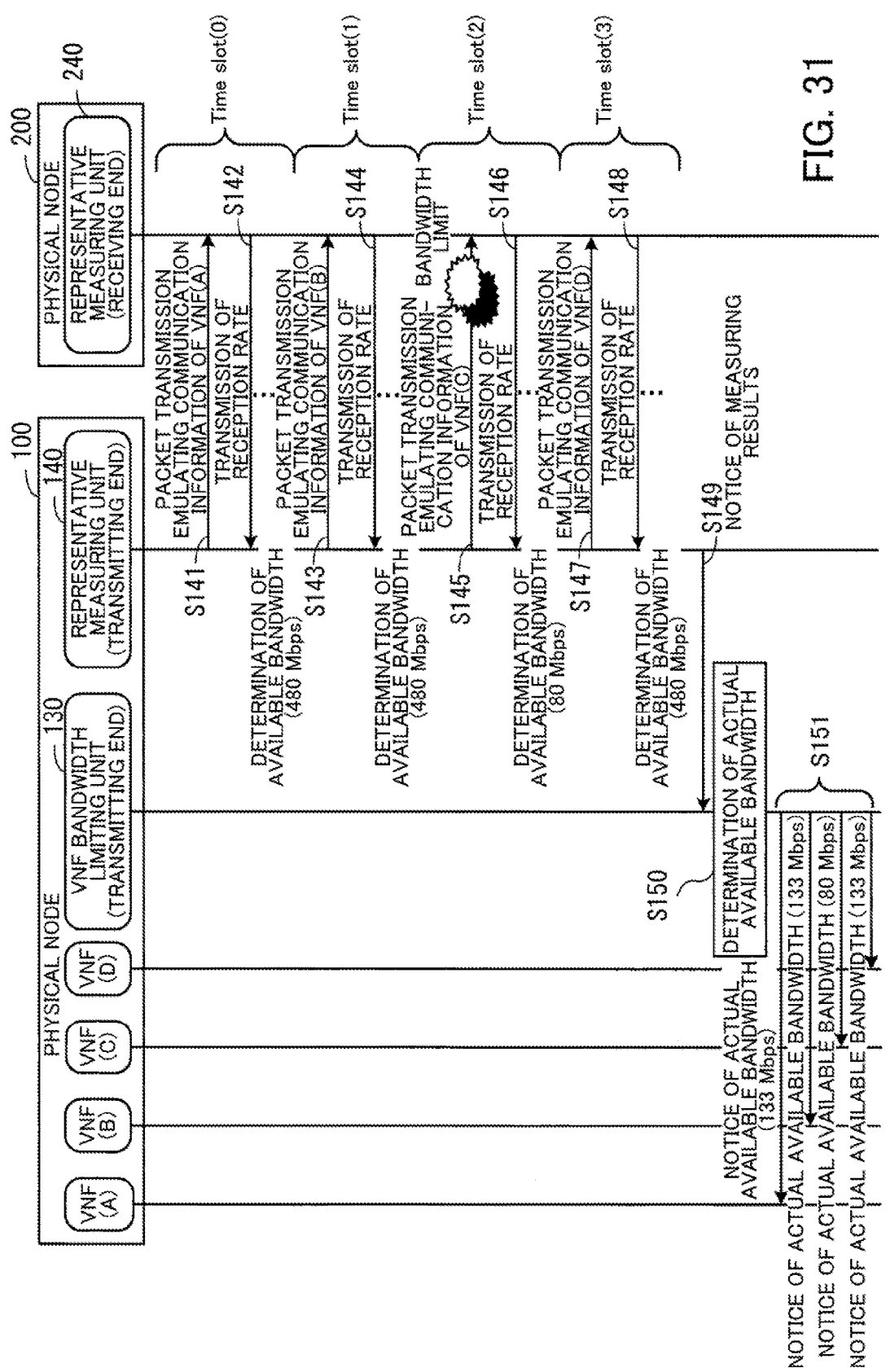
FIG. 31 is a sequence diagram illustrating a procedure of the available bandwidth measuring when a VNF is subject to a bandwidth limit.

Next described is an example of available bandwidth measuring when some VNFs (one or more VNFs) are subject to bandwidth limits, with reference to FIGS. 30 and 31. FIG. 30 illustrates available bandwidth measuring results obtained when a VNF is subject to a bandwidth limit. In the example of FIG. 30, as for VNF(C) amongst the measuring target VNFs(A), (B), (C), and (D), the bandwidth limit mechanism limits the bandwidth available to VNF(C) to 80 Mbps at some point in the network 20. Assume here that the remaining VNFs(A), (B), and (D) are not subject to bandwidth limits, as in the case of FIGS. 28 and 29. In the example of FIG. 30, an available bandwidth of 80 Mbps is detected with respect to VNF(C) while an available bandwidth of 480 Mbps is detected with respect to each of VNFs(A), (B), and (D).

FIG. 31 is a sequence diagram illustrating a procedure of the available bandwidth measuring when a VNF is subject to a bandwidth limit. Note that FIG. 31 omits processing preceding the start of the available bandwidth measuring process because the processing is the same as described in steps S101 to S107 of FIG. 9 or FIG. 10. The representative measuring unit 140 carries out available bandwidth measuring by emulating the communication information set of each measuring target VNF according to the transmission schedule. In the example of FIG. 31, in the first time slot, "Time slot(0)", the representative measuring unit 140 transmits packets emulating the communication information set of VNF(A) to the physical node 200 (step S141). Then, the representative measuring unit 240 of the physical node 200 transmits the reception rate of the packets to the physical node 100 (step S142). By repetition of these operations, the available bandwidth for VNF(A) (480 Mbps) is obtained by a binary search.

Next, in "Time slot(1)", the representative measuring unit 140 transmits packets emulating the communication information set of VNF(B) to the physical node 200 (step S143). Then, the representative measuring unit 240 of the physical node 200 transmits the reception rate of the packets to the physical node 100 (step S144). By repetition of these operations, the available bandwidth for VNF(B) (480 Mbps) is obtained by a binary search. Next, in "Time slot(2)", the representative measuring unit 140 transmits packets emulating the communication information set of VNF(C) to the physical node 200 (step S145). The packet transmission is subject to a bandwidth limit, and the reception rate therefore does not exceed 80 Mbps. Then, the representative measuring unit 240 of the physical node 200 transmits the reception rate of the packets to the physical node 100 (step S146). By repetition of these operations, the available bandwidth for VNF(C) (80 Mbps) is obtained by a binary search. Lastly, in "Time slot(3)", the representative measuring unit 140 transmits packets emulating the communication information set of VNF(D) to the physical node 200 (step S147). Then, the representative measuring unit 240 of the physical node 200 transmits the reception rate of the packets to the physical node 100 (step S148). By repetition of these operations, the available bandwidth for VNF(D) (480 Mbps) is obtained by a binary search.

The representative measuring unit 140 notifies the VNF bandwidth limiting unit 130 of the available bandwidth measuring results for the individual VNFs(A), (B), (C), and (D) (step S149). Based on the measuring results, the VNF bandwidth limiting unit 130 determines the actual available bandwidth of each of VNFs(A), (B), (C), and (D) (step S150). In the example of FIG. 31, because VNF(C) is subject to a bandwidth limit, the VNF bandwidth limiting unit 130 allocates a bandwidth of 80 Mbps to the VNF(C). Then, the VNF bandwidth limiting unit 130 allocates the remaining bandwidth (400 Mbps), obtained by subtracting the bandwidth allocated to the VNF(C) from the available bandwidth obtained when no bandwidth limits are placed (480 Mbps), to the three VNFs(A), (B) and (D) evenly. As a result, the actual available bandwidth of each of VNF(A), (B) and (D) is determined to be "133 Mbps". Subsequently, the VNF bandwidth limiting unit 130 notifies VNF(C) of the actual available bandwidth "80 Mbps" while notifying the individual VNFs(A), (B), and (D) of the actual available bandwidth "133 Mbps" (step S151).

Herewith, accurate available bandwidth measuring is made for VNF(C) so that VNF(C) is able to perform efficient communication within the available bandwidth. In addition, VNFs(A), (B), and (D) make effective use of the bandwidth not available to VNF(C) and are therefore able to achieve faster communication than in the case of FIGS. 28 and 29.

Next, processes performed by each node for VNF bandwidth management are explained in detail. A communication information management process is explained first. The communication information management process includes a process of transmitting the latest communication information sets from the physical nodes 100 and 200 to the management node 300; and a process of distributing communication information sets by the controller 310 of the management node 300 to each of the physical nodes 100 and 200.

Figure 32:
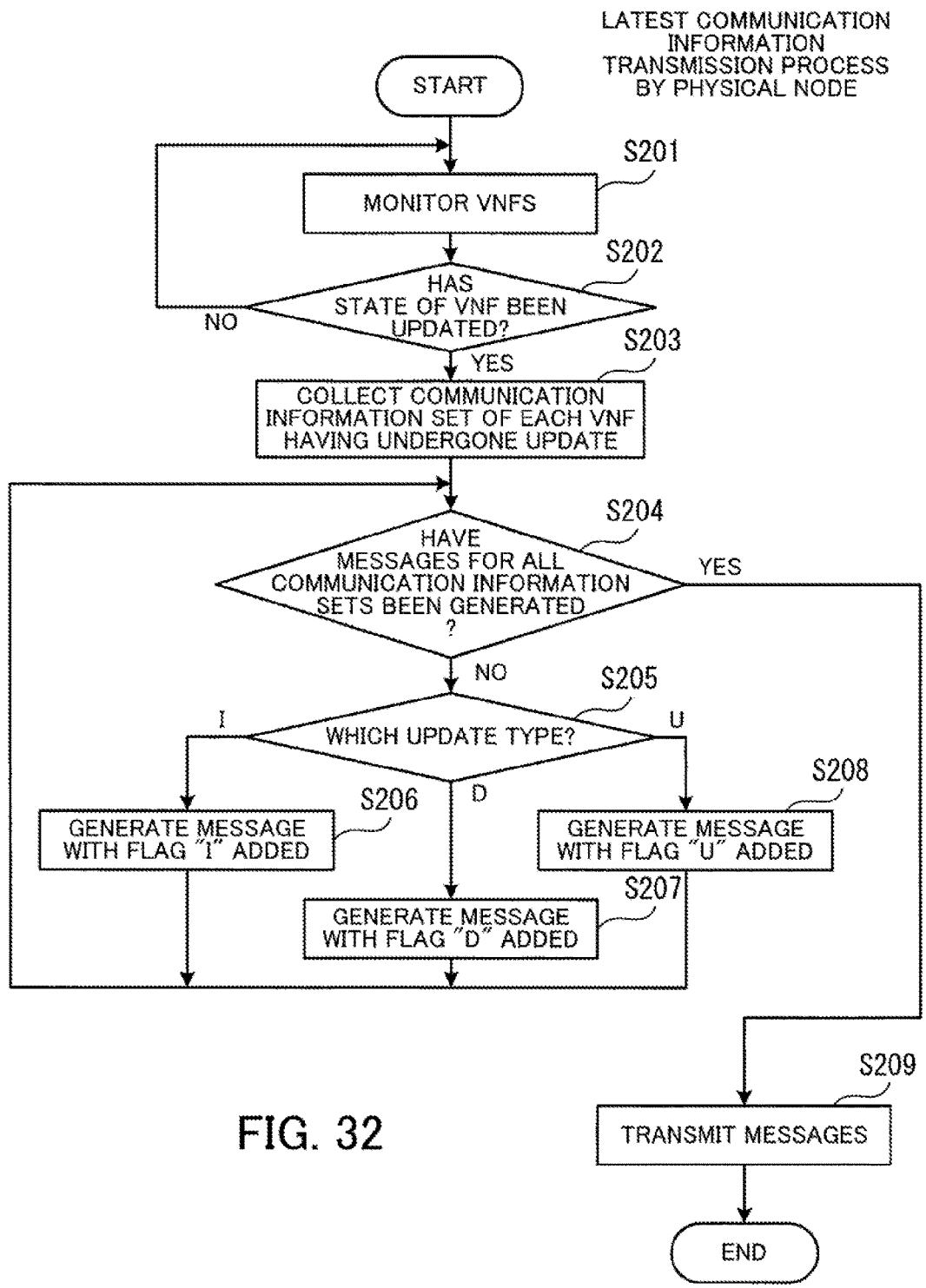
FIG. 32 is a flowchart illustrating an example of a procedure for transmitting latest communication information sets by a physical node.

FIG. 32 is a flowchart illustrating an example of a procedure for transmitting the latest communication information sets by a physical node. The example of FIG. 32 depicts the case where the physical node 100 transmits the latest communication information sets. The process of FIG. 32 is described according to the step numbers in the flowchart. Note that the physical node 200 also transmits its latest communication information sets by the same procedure performed by the physical node 100.

[Step S201] The VNF information collecting unit 131 monitors the states of the VNFs 111, 112, . . . , and 11n.

[Step S202] The VNF information collecting unit 131 determines whether the state of at least one VNF has been updated. If there is a VNF whose state has been updated, the process moves to step S203. If there is no VNF whose state has been updated, the process moves to step S201.

[Step S203] The VNF information collecting unit 131 collects, from each of the one or more VNFs whose state has been updated, the communication information set of the VNF.

[Step S204] The VNF information collecting unit 131 determines, for each of all the collected communication information sets, whether to have generated a message including the communication information set. If the VNF information collecting unit 131 have generated the messages for all the collected communication information sets, the process moves to step S209. If there is one or more communication information sets for which messages have yet to be generated, the process moves to step S205.

[Step S205] The VNF information collecting unit 131 determines the update type of a communication information set concerned. If the update type is "I (Insert)", the process moves to step S206. If the update type is "D (Delete)", the process moves to step S207. If the update type is "U (Update)", the process moves to step S208.

[Step S206] The VNF information collecting unit 131 generates a message by adding FLAG "I" to the communication information set. Subsequently, the process moves to step S204.

[Step S207] The VNF information collecting unit 131 generates a message by adding FLAG "D" to the communication information set. Subsequently, the process moves to step S204.

[Step S208] The VNF information collecting unit 131 generates a message by adding FLAG "U" to the communication information set. Subsequently, the process moves to step S204.

[Step S209] The VNF information collecting unit 131 transmits the generated messages to the controller 310 via the VNF interface 132.

In the above-described manner, the latest communication information sets are transmitted from the physical node 100 to the controller 310. In a similar manner, the physical node 200 transmits its latest communication information sets to the controller 310. This allows the management node 300 to maintain the latest communication information sets.

Figure 33:
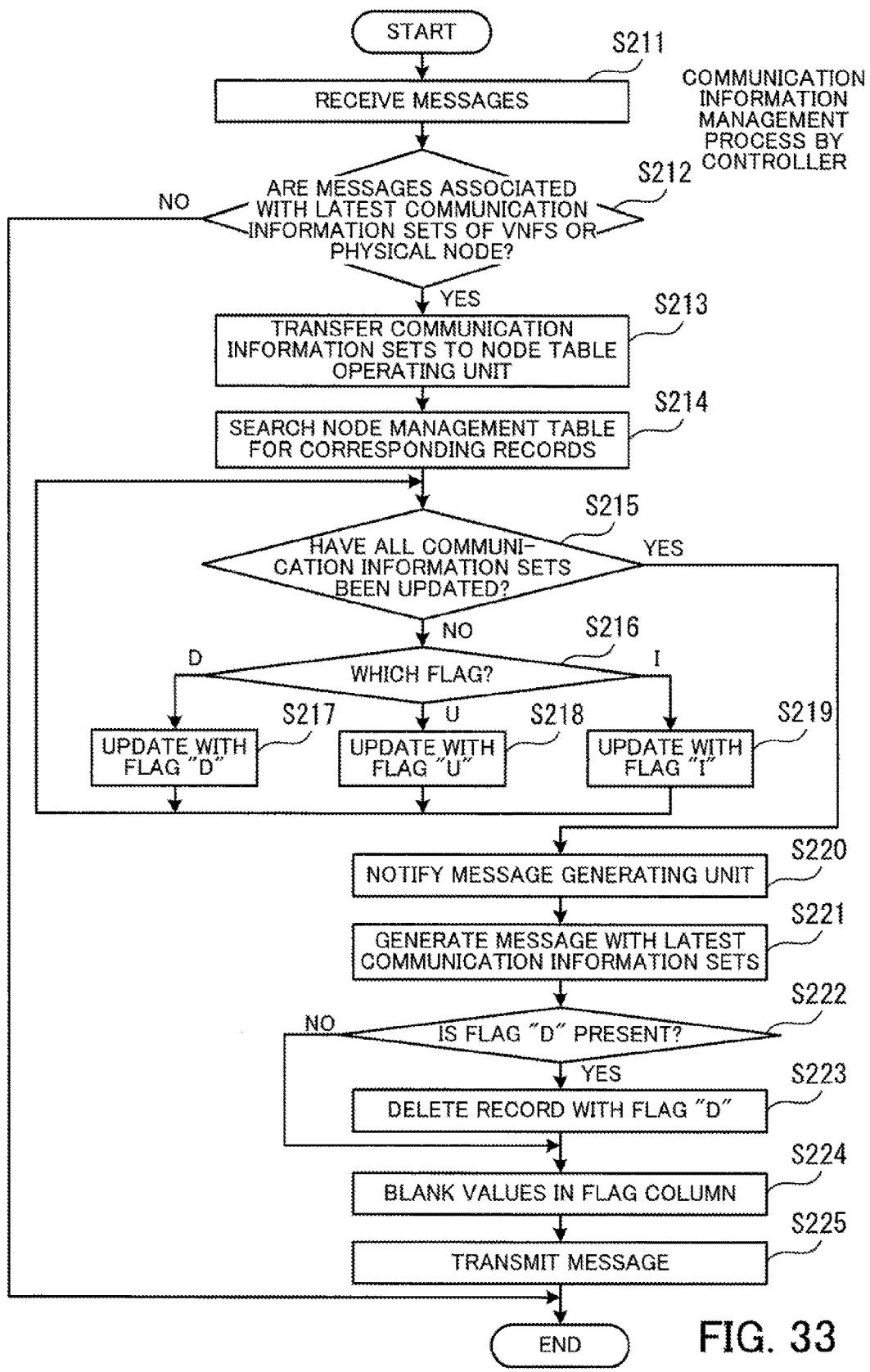
FIG. 33 is a flowchart illustrating a procedure of a communication information management process performed by the controller.

Next, a communication information management process performed by the controller is explained in detail. FIG. 33 is a flowchart illustrating a procedure of the communication information management process performed by the controller. The process of FIG. 33 is described according to the step numbers in the flowchart.

[Step S211] The communicating unit 311 receives messages from the physical nodes 100 and 200.

[Step S212] The communicating unit 311 determines whether the received messages are associated with the latest communication information sets of VNFs or a physical node. For example, if the messages include communication information sets each with FLAG "U", "I", or "D" set in the BPDU field of the packet, the communicating unit 311 determines that the received messages are associated with the latest communication information sets. If the messages are associated with the latest communication information sets, the process moves to step S213. If the messages are not associated with the latest communication information sets, the process ends.

[Step S213] The communicating unit 311 transfers the communication information sets to the node table operating unit 312.

[Step S214] The node table operating unit 312 searches the node management table 321 for records corresponding to the acquired communication information sets.

[Step S215] The node table operating unit 312 determines, for each of all the received communication information sets, whether to have updated a record within the node management table 321, corresponding to the communication information set. If there is one or more communication information sets for which updates have not been applied, the process moves to step S216. If updates of all the communication information sets have been completed, the process moves to step S220.

[Step S216] The node table operating unit 312 selects one untreated communication information set, and identifies the value of FLAG attached to the communication information set. If FLAG is "D", the process moves to step S217. If FLAG is "U", the process moves to step S218. If FLAG is "I", the process moves to step S219.

[Step S217] The node table operating unit 312 sets, within the node management table 321, "D" in the FLAG field of a record corresponding to the selected communication information set. Subsequently, the process moves to step S215.

[Step S218] The node table operating unit 312 updates, within the node management table 321, the content of a record corresponding to the selected communication information set with the selected communication information set. Then, the node table operating unit 312 sets "U" in the FLAG field of the record. Subsequently, the process moves to step S215.

[Step S219] The node table operating unit 312 adds a record including the selected communication information set to the node management table 321. Then, the node table operating unit 312 sets "I" in the FLAG field of the added record. Subsequently, the process moves to step S215.

[Step S220] The node table operating unit 312 notifies the message generating unit 313 that the node management table 321 has been updated.

[Step S221] The message generating unit 313 generates a message with the latest communication information sets, to be transmitted to the physical nodes 100 and 200.

[Step S222] The record deleting unit 314 determines whether one or more records with FLAG set to "D" is present in the node management table 321. If there is one or more records with FLAG set to "D", the process moves to step S223. If there is no record with FLAG set to "D", the process moves to step S224.

[Step S223] The record deleting unit 314 deletes each record with FLAG set to "D" from the node management table 321.

[Step S224] The record deleting unit 314 blanks all the values in the FLAG column within the node management table 321.

[Step S225] The message generating unit 313 transmits the generated message to each of the physical nodes 100 and 200 via the communicating unit 311.

In the above-described manner, the controller 310 distributes the latest communication information sets to the physical nodes 100 and 200.

Figure 34:
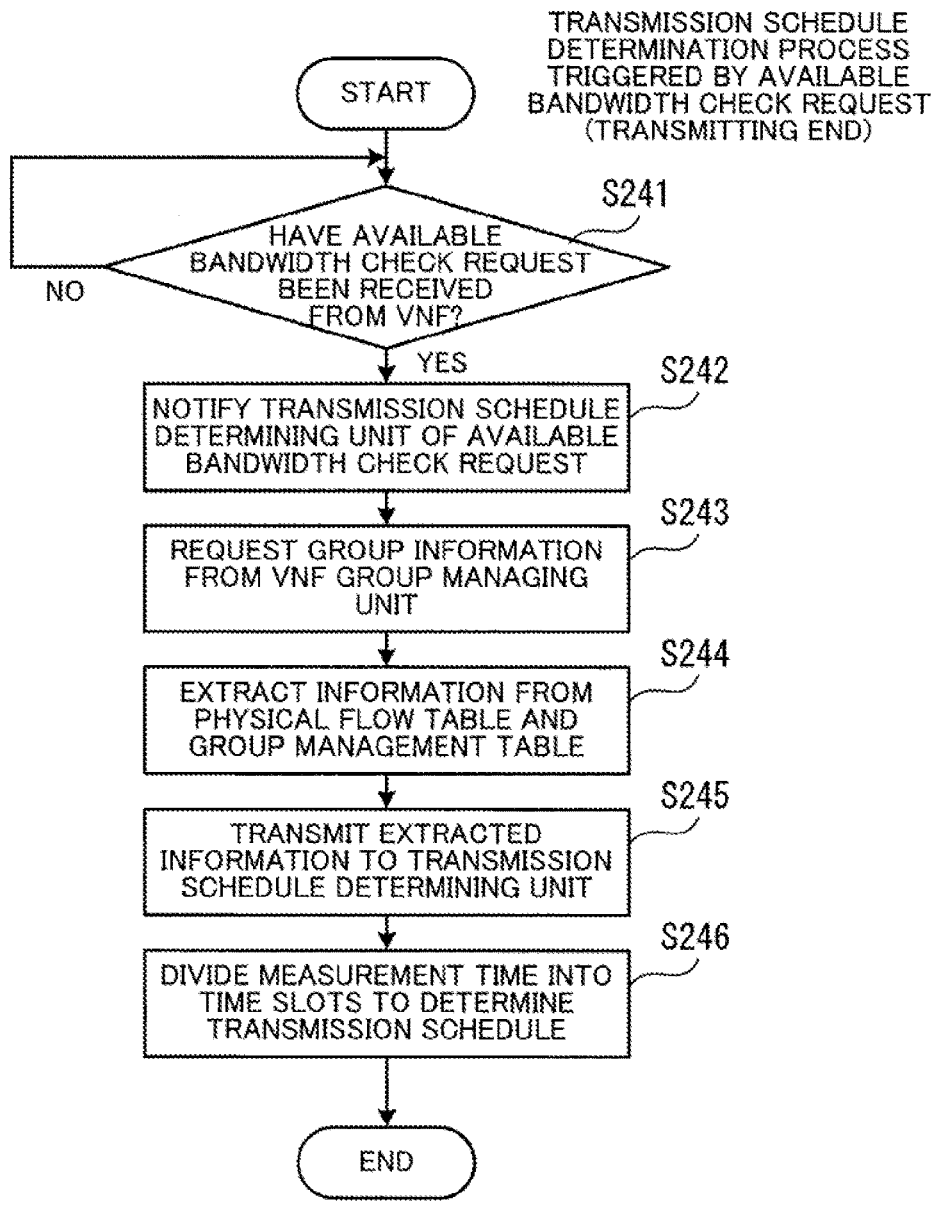
FIG. 34 is a flowchart illustrating an example of a procedure of a transmission schedule determination process triggered by a measuring request.

Next described is a transmission schedule determination process performed by the physical nodes 100 and 200. Determination of a transmission schedule is implemented at request of VNFs as well as in the case when it is determined that a periodic available bandwidth measuring timing has come. FIG. 34 is a flowchart illustrating an example of a procedure of a transmission schedule determination process triggered by an available bandwidth check request. The process of FIG. 34 is described according to the step numbers in the flowchart.

[Step S241] The VNF interface 132 determines whether to have received an available bandwidth check request from a VNF. If the VNF interface 132 has received an available bandwidth check request, the process moves to step S242. If the VNF interface 132 has received no available bandwidth check request, step S241 is repeated.

[Step S242] The VNF interface 132 notifies the transmission schedule determining unit 135 of the available bandwidth check request. The notice includes the identification information of the VNF having transmitted the available bandwidth check request.

[Step S243] In order to determine a transmission schedule, the transmission schedule determining unit 135 requests information on the group of the VNF from the VNF group managing unit 133.

[Step S244] The VNF group managing unit 133 extracts, from the physical flow table 151 and the group management table 152, communication information sets associated with the VNF having transmitted the available bandwidth check request.

[Step S245] The VNF group managing unit 133 transmits the extracted communication information sets to the transmission schedule determining unit 135.

[Step S246] The transmission schedule determining unit 135 divides the entire available bandwidth measurement time into time slots as many as the number of measuring target VNFs to thereby determine a transmission schedule.

In the above-described manner, the transmission schedule is determined.

Figure 35:
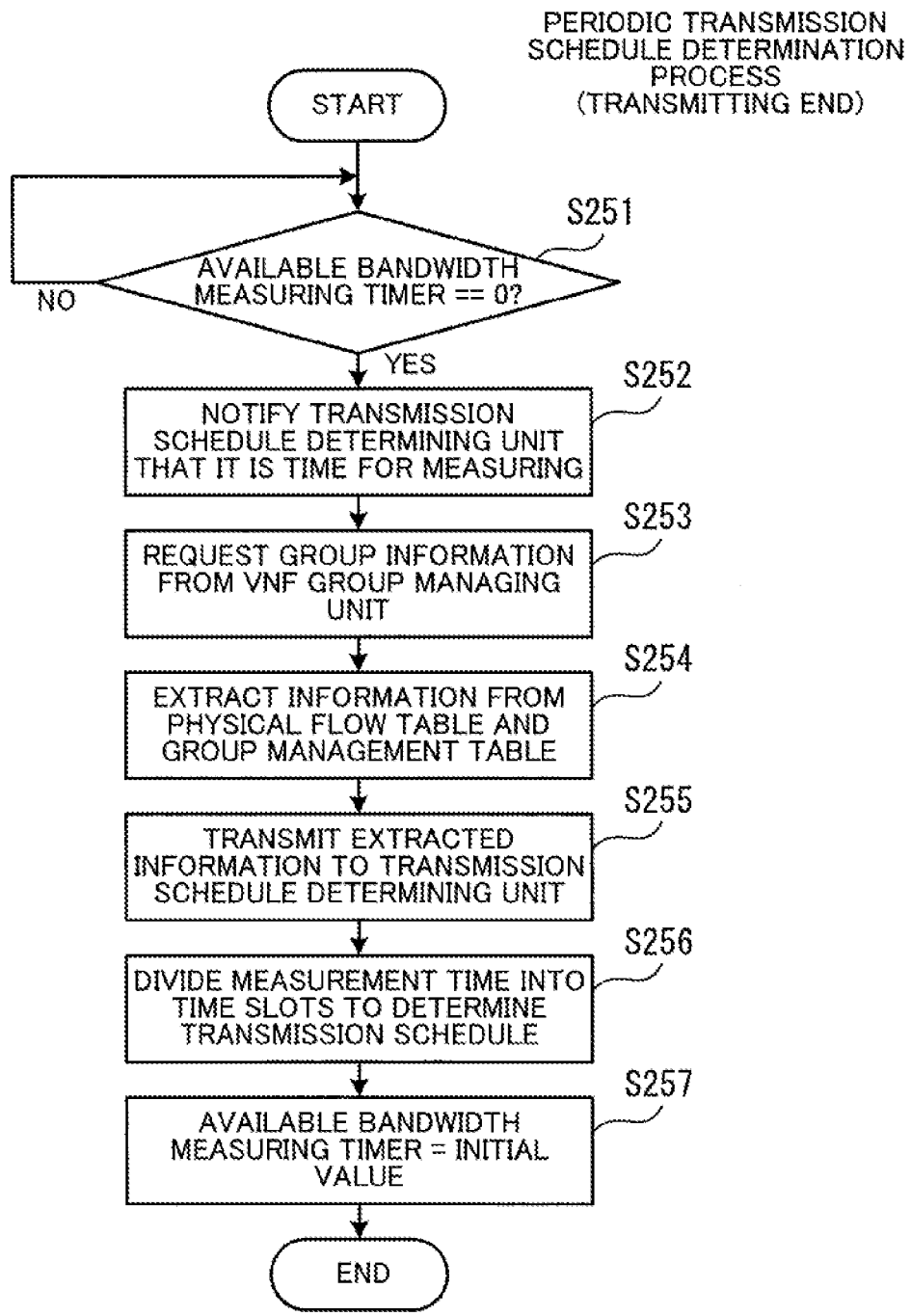
FIG. 35 is a flowchart illustrating an example of a procedure of a periodic transmission schedule determination process.

FIG. 35 is a flowchart illustrating an example of a procedure of a periodic transmission schedule determination process. The process of FIG. 35 is described according to the step numbers in the flowchart.

[Step S251] The available bandwidth measuring timer 134 determines whether it has a value of 0. The available bandwidth measuring timer 134 is a countdown timer, and indicates the remaining time which is obtained by subtracting the length of time that has elapsed since the time at which an initial value of the timer is set from the initial value. If the available bandwidth measuring timer 134 reaches 0, the process moves to step S252. If the available bandwidth measuring timer 134 has a value other than 0, step S251 is repeated.

[Step S252] The available bandwidth measuring timer 134 notifies the transmission schedule determining unit 135 that it is time for available bandwidth measuring.

[Step S253] The transmission schedule determining unit 135 requests information on a group of VNFs concerned from the VNF group managing unit 133 in order to determine a transmission schedule.

[Step S254] The VNF group managing unit 133 extracts communication information sets of all the VNFs from the physical flow table 151 and the group management table 152.

[Step S255] The VNF group managing unit 133 transmits the extracted communication information sets to the transmission schedule determining unit 135.

[Step S256] While designating all the VNFs 111, 112, ..., and 11n as the measuring targets, the transmission schedule determining unit 135 divides the entire available bandwidth measurement time into time slots as many as the number of measuring target VNFs to thereby determine a transmission schedule.

[Step S257] The available bandwidth measuring timer 134 resets its value to a predetermined initial value.

Figure 36:
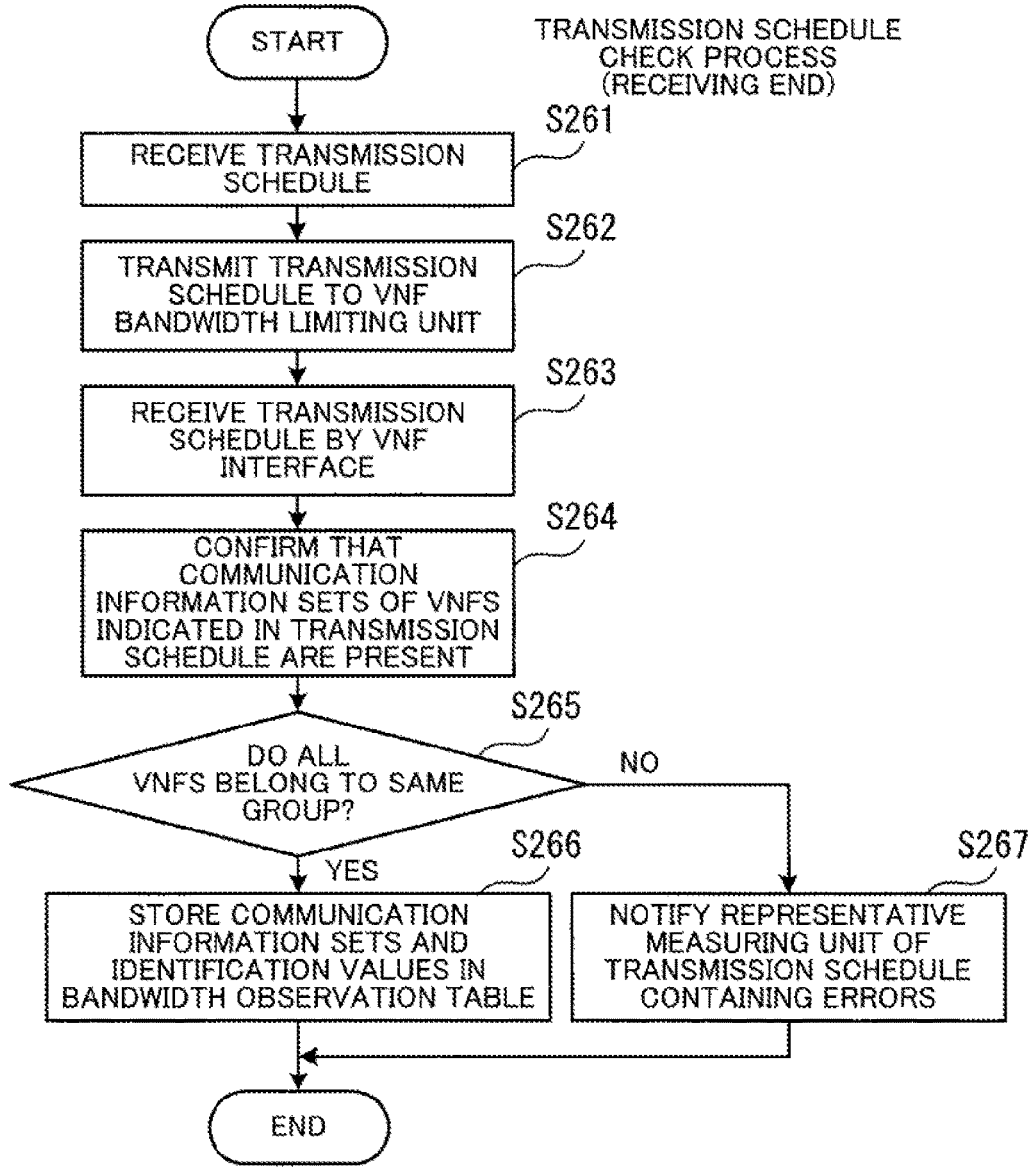
FIG. 36 is a flowchart illustrating an example of a procedure of a transmission schedule check process.

A transmission schedule is periodically determined in the above-described manner so that available bandwidth measuring is implemented. The determined transmission schedule is transmitted to the receiving-end physical node 200. Upon receiving the transmission schedule, the physical node 200 checks whether the content of the transmission schedule is correct. FIG. 36 is a flowchart illustrating an example of a procedure of a transmission schedule check process. The process of FIG. is described according to the step numbers in the flowchart.

[Step S261] The communicating unit 244 of the representative measuring unit 240 receives a transmission schedule.

[Step S262] The communicating unit 244 transmits the received transmission schedule to the VNF bandwidth limiting unit 230.

[Step S263] In the VNF bandwidth limiting unit 230, the VNF interface 232 receives the transmitted transmission schedule. The VNF interface 232 passes the received transmission schedule on to the VNF group managing unit 233.

[Step S264] The VNF group managing unit 233 confirms that the communication information sets corresponding to VNFs indicated in the transmission schedule are present in the group management table 152.

[Step S265] The VNF group managing unit 233 determines whether all the VNFs indicated in the transmission schedule belong to the same group. If they belong to the same group, the process moves to step S266. If there is, amongst the VNFs indicated in the transmission schedule, at least one VNF whose communication information set is absent from the group management table 152, or if the VNFs indicated in the transmission schedule belong to different groups, the process moves to step S267.

[Step S266] The VNF group managing unit 233 stores, in the bandwidth observation table 253, the communication information set and identification value (the value in the DSCP or CoS field) of each of the VNFs indicated in the transmission schedule. Subsequently, the process ends.

[Step S267] The VNF group managing unit 233 notifies the representative measuring unit 240 that the transmission schedule contains errors. In response, the representative measuring unit 240 transmits a message indicating the presence of errors to the transmitting-end physical node 100.

Figure 37:
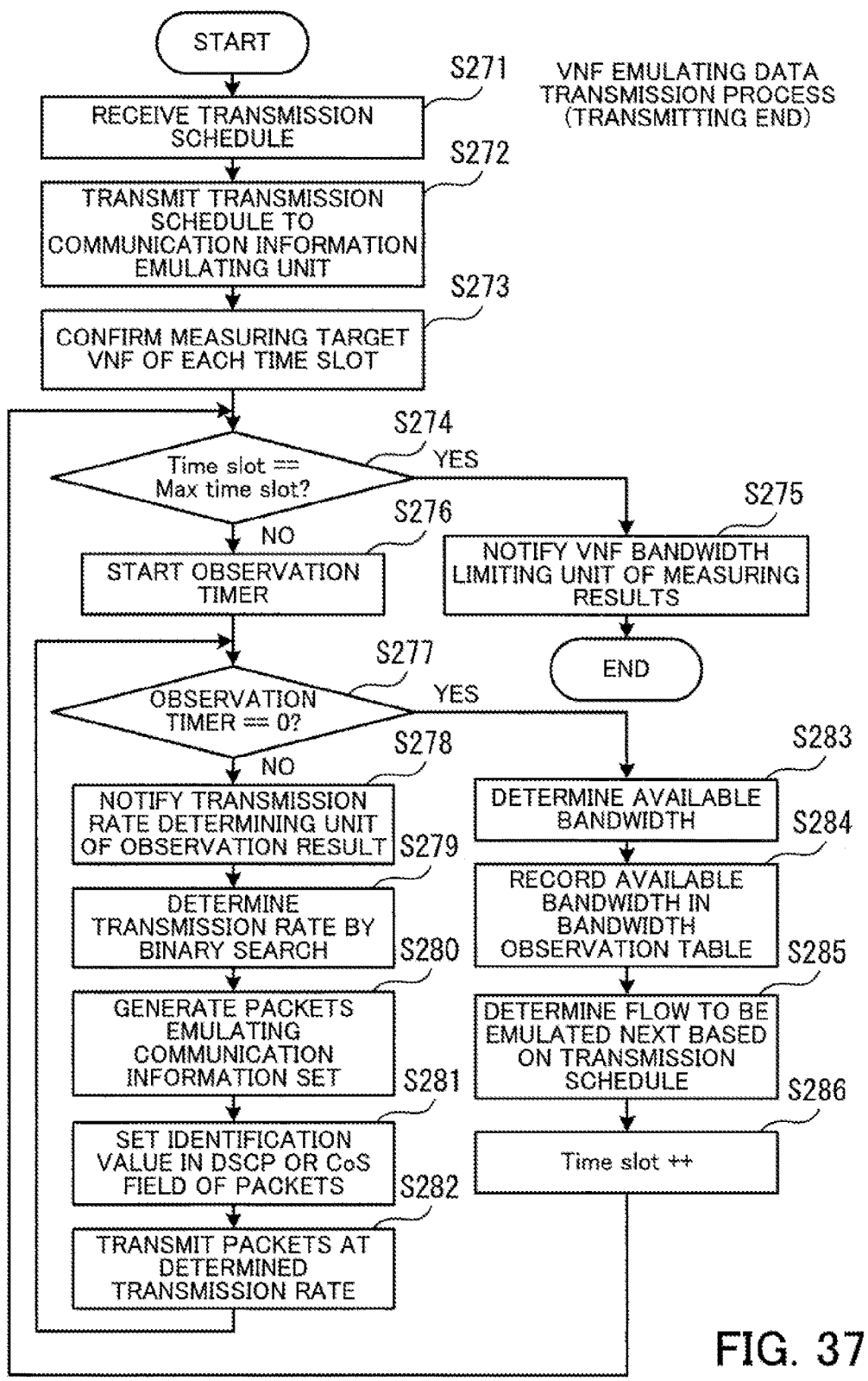
FIG. 37 is a flowchart illustrating an example of a procedure of a VNF emulating data transmission process.

If no message indicating the presence of errors is received after transmission of the transmission schedule, the transmitting-end physical node 100 starts data transmission emulating each of the VNFs according to the transmission schedule. FIG. 37 is a flowchart illustrating an example of a procedure of a VNF emulating data transmission process. The process of FIG. 37 is described according to the step numbers in the flowchart.

[Step S271] The communicating unit 141 of the representative measuring unit 140 receives a transmission schedule from the VNF bandwidth limiting unit 130.

[Step S272] The communicating unit 141 transmits the received transmission schedule to the communication information emulating unit 144 via the transmission rate determining unit 143.

[Step S273] Based on the transmission schedule, the communication information emulating unit 144 confirms a VNF targeted for available bandwidth measuring of each time slot.

[Step S274] The bandwidth result operating unit 142 determines whether the value of a variable "Time slot" which represents the current processing-target time slot number (0, 1, . . . ) matches the total number of time slots ("max time slot"). If they match each other, the process moves to step S275. If they do not match one another, the process moves to step S276.

[Step S275] The bandwidth result operating unit 142 notifies the VNF bandwidth limiting unit 130 of the available bandwidth measuring results. Subsequently, the process ends.

[Step S276] The observation timer 145 starts timing. The observation timer 145 has, as its initial value, the period of time for the current processing-target time slot, and counts down the elapsed time from the initial value. In this regard, the transmission rate determining unit 143 sets an initial value of the transmission rate. As for the available bandwidth measuring in each of the second and subsequent time slots, the transmission rate determining unit 143 uses an available bandwidth measurement obtained in the immediately preceding time slot as the initial value of the transmission rate.

[Step S277] The observation timer 145 determines whether its value is "0". If the value of the observation timer 145 is "0", the process moves to step S283. If the value of the observation timer 145 is not "0", the process moves to step S278.

[Step S278] The bandwidth result operating unit 142 notifies the transmission rate determining unit 143 of an observation result (i.e., a result obtained by comparing the transmission rate and the reception rate).

[Step S279] The transmission rate determining unit 143 determines the transmission rate for the next packet transmission according to a binary search algorithm.

[Step S280] The packet generating unit 146 generates packets each emulating the communication information set of a VNF corresponding to the current processing-target time slot indicated by the variable "Time slot".

[Step S281] The packet identification value setting unit 147 sets, in the DSCP or CoS field of the generated packets, the identification value corresponding to the measuring target VNF.

[Step S282] The measuring packet transmitting unit 148 transmits the generated packets at the transmission rate determined by the transmission rate determining unit 143. Subsequently, the process moves to step S277.

[Step S283] The bandwidth result operating unit 142 determines the available bandwidth based on the transmission rate and the reception rate of packets transmitted repeatedly. For example, in the case where the packets have repeatedly been transmitted at a different transmission rate, the bandwidth result operating unit 142 determines, as the available bandwidth, the maximum of transmission rate values observed to be less than or equal to their corresponding reception rate values (i.e., "transmission rate≤reception rate").

[Step S284] The bandwidth result operating unit 142 records the measured available bandwidth in the bandwidth observation table 153.

[Step S285] The communication information emulating unit 144 determines a flow to be emulated next based on the transmission schedule.

[Step S286] The bandwidth result operating unit 142 increases the value of the variable "Time slot" by 1. Subsequently, the process moves to step S274.

Figure 38:
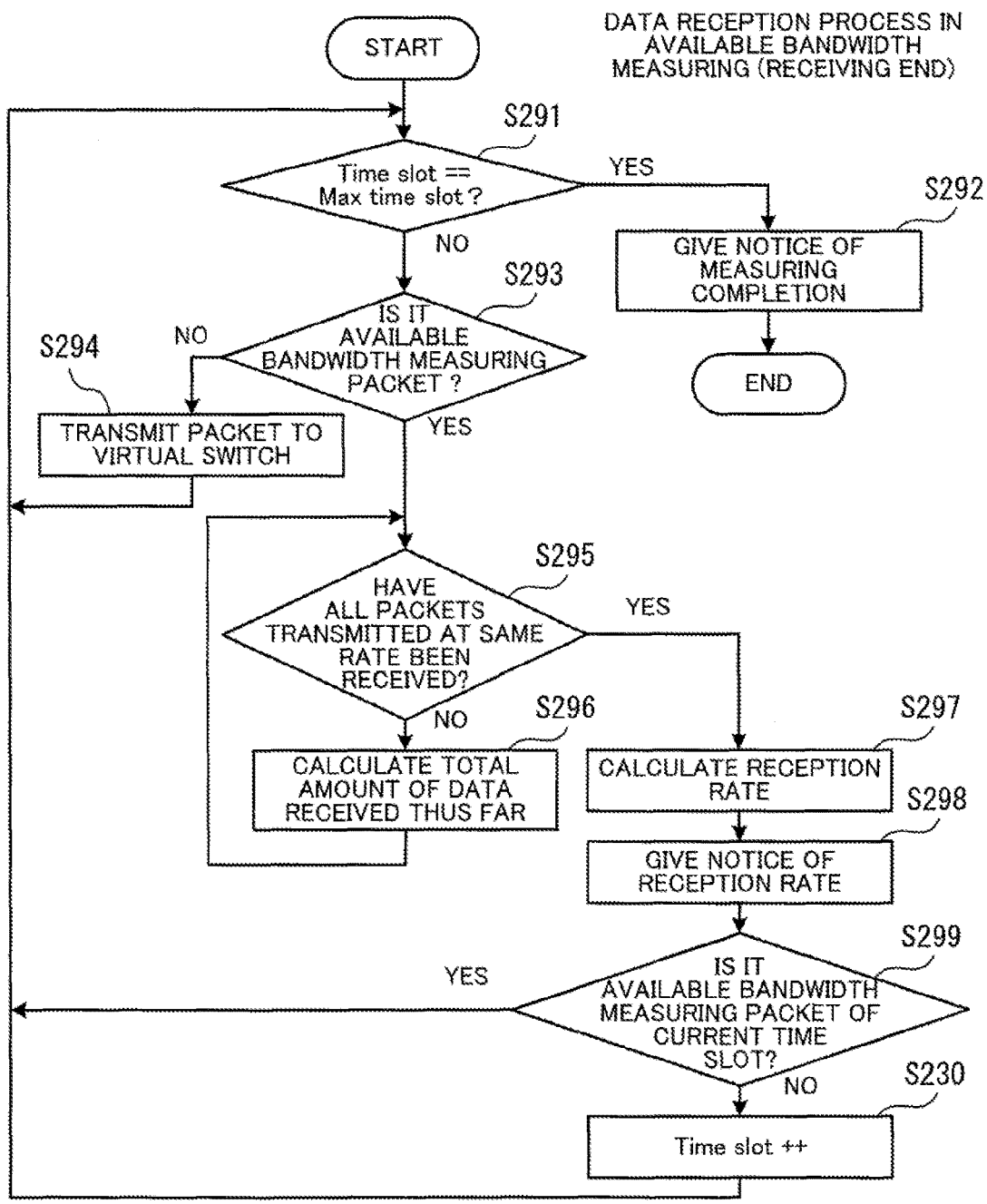
FIG. 38 is a flowchart illustrating an example of a data reception process in the available bandwidth measuring.

In the above-described manner, the available bandwidth measuring is implemented by emulating each of a plurality of VNFs. Note that the available bandwidth measuring is achieved in cooperation with the representative measuring unit 240 of the receiving-end physical node 200. FIG. 38 is a flowchart illustrating an example of a data reception process in the available bandwidth measuring. The process of FIG. 38 is described according to the step numbers in the flowchart.

[Step S291] The packet identifying unit 241 of the representative measuring unit 240 determines whether the value of the variable "Time slot", which represents the current processing-target time slot number (0, 1, . . . ), matches the total number of time slots ("max time slot"). If they match each other, the process moves to step S292. If they do not match one another, the process moves to step S293.

[Step S292] The communicating unit 275 notifies the physical node 100 of the completion of the measuring.

[Step S293] The packet identifying unit 241 determines whether each received packet is an available bandwidth measuring packet. For example, if a predetermined value is set in the DSCP field of the packet, the packet identifying unit 241 determines that it is an available bandwidth measuring packet. If the packet is not an available bandwidth measuring packet, the process moves to step S294. If it is an available bandwidth measuring packet, the process moves to step S295.

[Step S294] The packet identifying unit 241 transmits the packet to the virtual switch 220. Subsequently, the process moves to step S291.

[Step S295] The reception rate calculating unit 242 determines whether a series of packets transmitted at the same rate have been all received. For example, in the case where a message with a predetermined data amount is divided into a plurality of packets and the divided packets are transmitted at a predetermined transmission rate, the reception rate calculating unit 242 determines that a series of packets transmitted at the same rate have been all received when the reception of the message has been completed. If all the packets have been received, the process moves to step S297. If there is one or more unreceived packets, the process moves to step S296.

[Step S296] The reception rate calculating unit 242 calculates the total data amount of the packets received thus far. Subsequently, the process moves to step S295.

[Step S297] The reception rate calculating unit 242 divides the data amount of all the packets transmitted at the same rate by the reception time period to thereby calculate the reception rate.

[Step S298] The communicating unit 244 notifies the physical node 100 of the calculated reception rate.

[Step S299] Upon receiving the nest packet, the packet identifying unit 241 determines whether the received packet is an available bandwidth measuring packet of the current time slot, which is indicated by the current value of the variable "Time slot". If the packet is an available bandwidth measuring packet of the current time slot, the process moves to step S291. If the packet is not an available bandwidth measuring packet of the current time slot, the process moves to step S230.

[Step S230] The packet identifying unit 241 increases the value of the variable "Time slot" by 1. Subsequently, the process moves to step S291.

In the above-described manner, upon receiving a series of available bandwidth measuring packets, the receiving-end physical node 200 notifies the transmitting-end physical node 100 of the reception rate of the packets. This allows the transmitting-end physical node 100 to search for the available bandwidth by a binary search.

Figure 39:
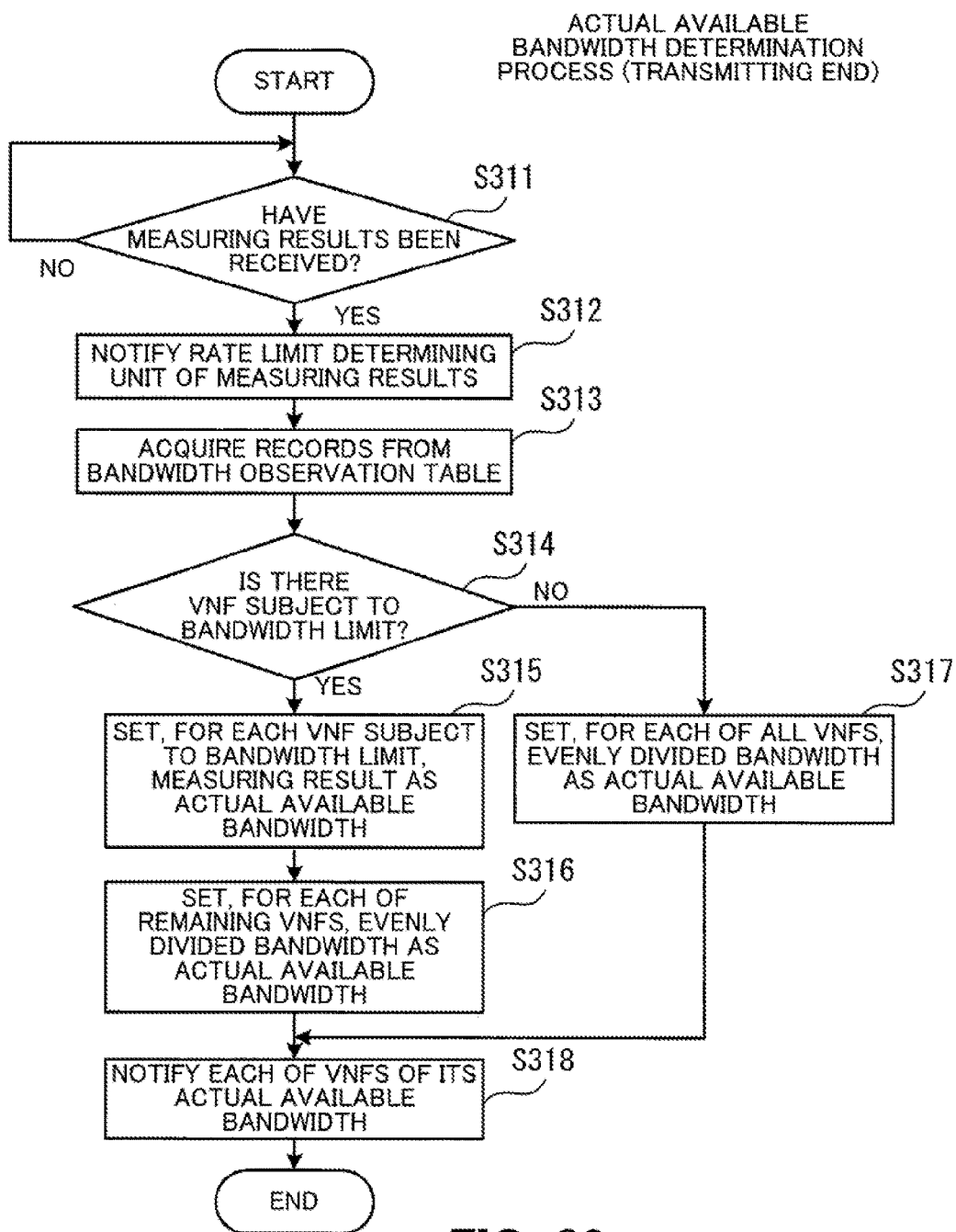
FIG. 39 is a flowchart illustrating an example of a procedure of an actual available bandwidth determination process.

After the available bandwidth is identified with respect to each VNF, the VNF bandwidth limiting unit 130 of the transmitting-end physical node 100 determines the actual available bandwidth of each VNF, and notifies each VNF of the determined actual available bandwidth. FIG. 39 is a flowchart illustrating an example of a procedure of an actual available bandwidth determination process. The process of FIG. 39 is described according to the step numbers in the flowchart.

[Step S311] The VNF interface 132 of the VNF bandwidth limiting unit 130 determines whether to have received measuring results from the representative measuring unit 140. If the VNF interface 132 has received measuring results from the representative measuring unit 140, the process moves to step S312. If the VNF interface 132 has yet to receive measuring results, step S311 is repeated.

[Step S312] The VNF interface 132 notifies the rate limit determining unit 136 of the measuring results.

[Step S313] The rate limit determining unit 136 acquires, from the bandwidth observation table 153, records indicating observation results.

[Step S314] The rate limit determining unit 136 determines whether there is one or more VNFs subject to bandwidth limits set by the bandwidth limit mechanism. For example, the rate limit determining unit 136 compares the available bandwidth measurements obtained with respect to the VNFs belonging to the same group, and determines that one or more VNFs with their available bandwidth measurements being smaller than those of the remaining VNFs are subject to bandwidth limits. If there is one or more VNFs subject to bandwidth limits, the process moves to step S315. If there is no VNF subject to a bandwidth limit, the process moves to step S317.

[Step S315] As for each of the VNFs subject to bandwidth limits, the VNF bandwidth notifying unit 137 sets, within the group management table 152, the actual available bandwidth of the VNF. Specifically, the available bandwidth measurement obtained for the VNF is set in the communication information set corresponding to the VNF as the actual available bandwidth of the VNF.

[Step S316] As for each of the remaining VNFs not subject to bandwidth limits, the VNF bandwidth notifying unit 137 sets, within the group management table 152, the actual available bandwidth of the VNF.

Subsequently, the process moves to step S318. Specifically, a value obtained by evenly dividing the remaining available bandwidth among the remaining VNFs is set in the communication information set corresponding to the VNF as the actual available bandwidth of the VNF.

[Step S317] As for each of all the VNFs in the same group, the VNF bandwidth notifying unit 137 sets, within the group management table 152, the actual available bandwidth of the VNF. Specifically, a value obtained by evenly dividing the available bandwidth among all the VNFs is set in the communication information set corresponding to the VNF as the actual available bandwidth of the VNF.

[Step S318] The VNF bandwidth notifying unit 137 acquires values of the actual available bandwidth set for the individual VNFs of the same group via the rate limit determining unit 136. Then, the VNF bandwidth notifying unit 137 notifies each of the VNFs of the actual available bandwidth of the VNF via the VNF interface 132.

In the above-described manner, it is possible to efficiently measure the available bandwidth with respect to each of a plurality of VNFs and then notify each of the VNFs of the actual available bandwidth of the VNF based on the measuring results. In transmitting data, each of the VNFs engages in the data transmission at a transmission rate equal to or below the actual available bandwidth of the VNF. Herewith, the individual VNFs achieve efficient data transmission.

Next described is an available bandwidth measuring error likely to arise in the case where each VNF independently makes available bandwidth measuring within a predetermined measurement time frame. Assume here that, in the available bandwidth measuring, each VNF is allowed to have, for example, a reduced observation time for the purpose of putting the network under equivalent load. However, with the reduced observation time, it is not possible to reach an accurate measuring result. Let us consider a case where the entire measurement time is 40 seconds, the number of VNFs is 10, the maximum bandwidth of a communication channel is 1 Gbps, and the available bandwidth is 480 Mbps. In this case, each VNF is allowed to have on average 4 seconds for its available bandwidth measuring. For example, in the case of using software called "Pathload", it takes 2 seconds to obtain the reception rate in response to data transmission at a transmission rate. In a binary search, data transmission is repeated with changing the transmission rate each time, and the reception rate is measured for each data transmission. In the case where each VNF makes the available bandwidth measuring, the available 4 seconds allows the VNF to measure the reception rate of data transmitted at only two different transmission rates. For example, the transmission rate is changed from 500 Mbps to 250 Mbps, and then the available bandwidth measurement time for the VNF expires. In this case, although the actual available bandwidth is 480 Mbps, the measuring result obtained here is 250 Mbps. That is, the measurement error is calculated as: 480−250=230 Mbps.

Thus, individual VNFs independently carrying out the available bandwidth measuring leads to large measurement errors. Note that accurate measuring is possible by increasing the available bandwidth measurement time. This, however, results in a prolonged period of transmission of available bandwidth measuring packets, which in turn puts extra load on the network. As a result, the use efficiency of the system is reduced.

On the other hand, according to the second embodiment, an accurate available bandwidth search is performed, for example, in the first time slot over sufficient time. For example, data transmission is repeatedly performed with changing the transmission rate as follows: 500 Mbps→250 Mbps→375 Mbps→437.5 Mbps→468.75 Mbps→484.375 Mbps→476.575 Mbps→480.475 Mbps→ . . . →480.0 Mbps. Thus, the second embodiment offers an accurate available bandwidth measuring result with no error. In each of the second and subsequent time slots, an available bandwidth search is started with the transmission rate "480.0 Mbps", which facilitates a quick search result. This leads to efficient and highly accurate available bandwidth measuring for a plurality of VNFs.

While, as described above, the embodiments have been exemplified, the configurations of individual portions illustrated in the embodiments may be replaced with others having the same functions. In addition, another constituent element or process may be added thereto. Furthermore, two or more compositions (features) of the embodiments may be combined together.

According to one aspect, it is possible to perform efficient available bandwidth measuring.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure comprising:

classifying a plurality of virtual machines deployed on the computer into one group, the virtual machines communicating with a physical node connected to the computer via a network;

obtaining available bandwidth measurements with respect to the virtual machines by transmitting, to the physical node, measuring packets emulating each of the virtual machines, the available bandwidth measurements representing available bandwidth of a communication channel opened with the physical node, available when each of the virtual machines performs data transmission to the physical node in a different time slot;

determining, based on the obtained available bandwidth measurements, actual available bandwidth of each of the virtual machines, to be used when the virtual machines perform data transmission to the physical node in a same time slot; and notifying each of the virtual machines of the actual available bandwidth determined for said each virtual machine.

2. The non-transitory computer-readable storage medium according to claim 1, wherein:

the obtaining includes employing information on a first available bandwidth measurement already obtained with respect to a first virtual machine, to obtain a second available bandwidth measurement with respect to a second virtual machine by transmitting the measuring packets emulating the second virtual machine to the physical node.

3. The non-transitory computer-readable storage medium according to claim 2, wherein:
the obtaining includes setting, to the first available bandwidth, an initial transmission rate used to obtain the second available bandwidth measurement by a binary search.

4. The non-transitory computer-readable storage medium according to claim 1, wherein:
the determining includes determining, when all the available bandwidth measurements with respect to the virtual machines indicate same available bandwidth, a value obtained by dividing the same available bandwidth by a count of the virtual machines as the actual available bandwidth of each of the virtual machines.

5. The non-transitory computer-readable storage medium according to claim 1, wherein:
the determining includes determining, when a third available bandwidth measurement obtained with respect to a third virtual machine is smaller than a value obtained by dividing a maximum amongst the available bandwidth measurements with respect to the virtual machines by a count of the virtual machines, the third available bandwidth measurement as the actual available bandwidth of the third virtual machine and a division result as the actual available bandwidth of each of the virtual machines except for the third virtual machine, the division result being obtained by dividing, by the count of the virtual machines except for the third virtual machine, a value obtained by subtracting the third available bandwidth from the maximum.

6. An available bandwidth measuring method comprising:
classifying, by a processor, a plurality of virtual machines deployed on a computer including the processor into one group, the virtual machines communicating with a physical node connected to the computer via a network;
obtaining, by the processor, available bandwidth measurements with respect to the virtual machines by transmitting, to the physical node, measuring packets emulating each of the virtual machines, the available bandwidth measurements representing available bandwidth of a communication channel opened with the physical node, available when each of the virtual machines performs data transmission to the physical node in a different time slot;
determining, by the processor, based on the obtained available bandwidth measurements, actual available bandwidth of each of the virtual machines, to be used when the virtual machines perform data transmission to the physical node in a same time slot; and
notifying each of the virtual machines of the actual available bandwidth determined for said each virtual machine.

7. An available bandwidth measuring apparatus comprising:
a memory; and
a processor connected to the memory and configured to perform a procedure including:
classifying a plurality of virtual machines deployed on the available bandwidth measuring apparatus into one group, the virtual machines communicating with a physical node connected to the available bandwidth measuring apparatus via a network,
obtaining available bandwidth measurements with respect to the virtual machines by transmitting, to the physical node, measuring packets emulating each of the virtual machines, the available bandwidth measurements representing available bandwidth of a communication channel opened with the physical node, available when each of the virtual machines performs data transmission to the physical node in a different time slot,
determining, based on the obtained available bandwidth measurements, actual available bandwidth of each of the virtual machines, to be used when the virtual machines perform data transmission to the physical node in a same time slot, and
notifying each of the virtual machines of the actual available bandwidth determined for said each virtual machine.

* * * * *